United States Patent [19]

Berenguel et al.

[11] Patent Number: 5,884,093

[45] Date of Patent: Mar. 16, 1999

[54] HARD DISK CACHE FOR CD-ROM AND OTHER SLOW ACCESS TIME DEVICES

[75] Inventors: Leo P. Berenguel, Fremont; James E. Korpi, Santa Clara; Connie Lin, Pleasanton, all of Calif.

[73] Assignee: Rock Solid Systems, Inc., Fremont, Calif.

[21] Appl. No.: 512,860

[22] Filed: Aug. 7, 1995

Related U.S. Application Data

[63] Continuation-in-part of Ser. No. 300,372, Sep. 2, 1994, abandoned.

[51] Int. Cl.[6] .............................. G06F 13/00; G06F 12/08
[52] U.S. Cl. ..................... 395/821; 395/842; 395/843; 395/847; 711/117; 711/118
[58] Field of Search ............................. 395/445, 481, 395/842, 843, 847, 821; 711/117, 118

[56] References Cited

U.S. PATENT DOCUMENTS

| | | | |
|---|---|---|---|
| 5,029,125 | 7/1991 | Sciupac ................................. | 364/900 |
| 5,218,685 | 6/1993 | Jones .................................... | 395/425 |
| 5,247,618 | 9/1993 | Davis et al. .......................... | 395/275 |
| 5,257,367 | 10/1993 | Goodlander et al. ................. | 395/600 |
| 5,261,072 | 11/1993 | Siegel .................................... | 395/600 |
| 5,261,872 | 11/1993 | Siegel .................................... | 395/425 |
| 5,293,590 | 3/1994 | Keener et al. ........................ | 395/325 |
| 5,297,258 | 3/1994 | Hale et al. ............................ | 395/275 |
| 5,353,460 | 10/1994 | Lautzenheiser ...................... | 395/425 |
| 5,371,861 | 12/1994 | Keener et al. ........................ | 395/325 |

*Primary Examiner*—Emanuel T. Voeltz
*Assistant Examiner*—Kakali Chaki
*Attorney, Agent, or Firm*—Robert Charles Hill

[57] ABSTRACT

A controller system for a CD-ROM drive or other slow access device such as a magneto-optical device using a conventional hard disk drive as a cache memory. In some embodiments, the hard disk cache is partitioned to use a portion thereof to clone the most often used data blocks on the CD-ROM disk such as the directory/file allocation table, while the balance of the hard disk is used to cache some or all of the balance of the CD-ROM disk using conventional cache memory least recently used rules. Three bus controllers for the host computer, CD-ROM drive and the hard disk cache are controlled by a microprocessor which runs a control program that implements the cloning and cache rules. The three bus controllers are connected by a DMA bus for faster transfer of data. The microprocessor controls the directions of the DMA transfers by data written to a control register.

11 Claims, 57 Drawing Sheets

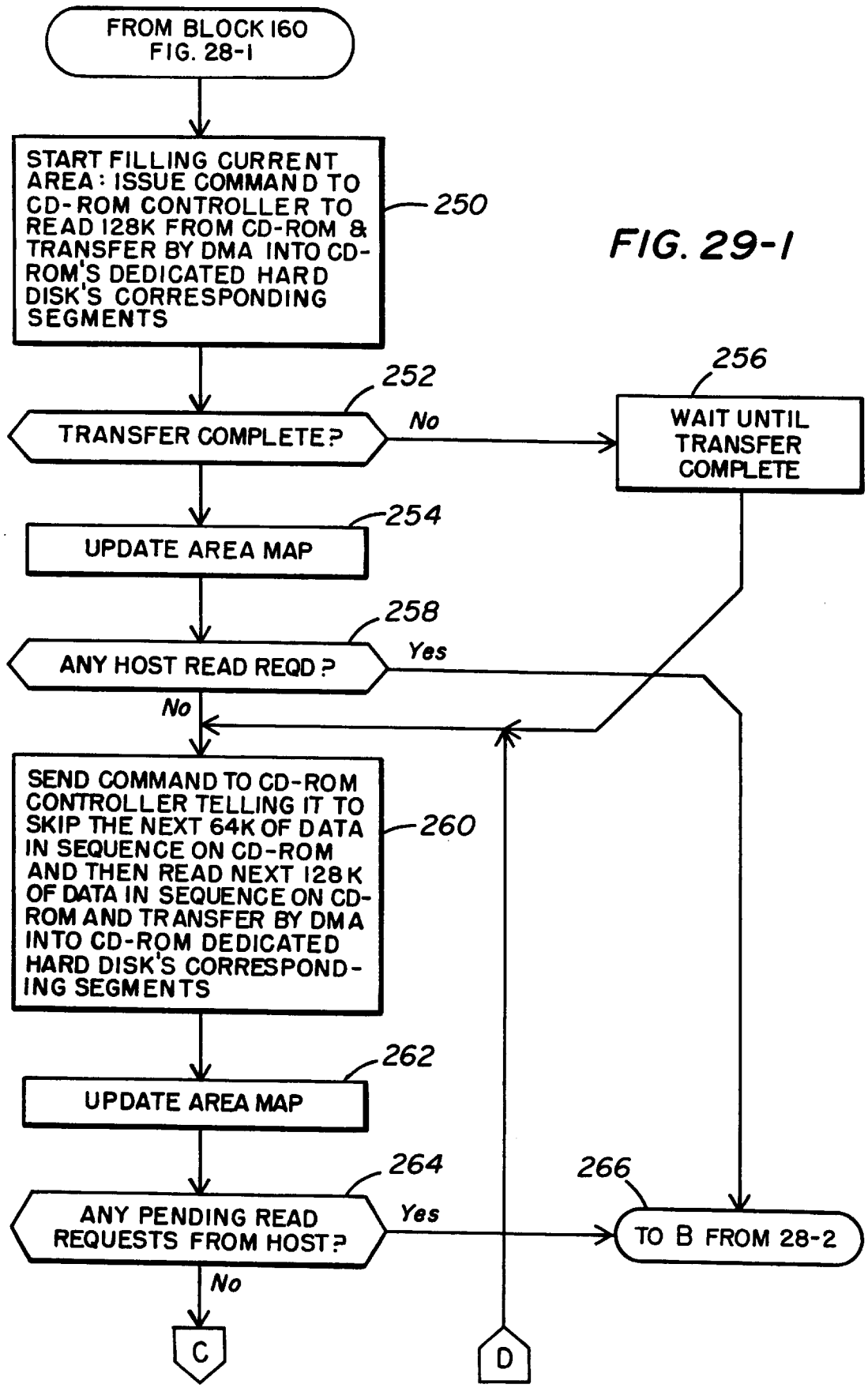

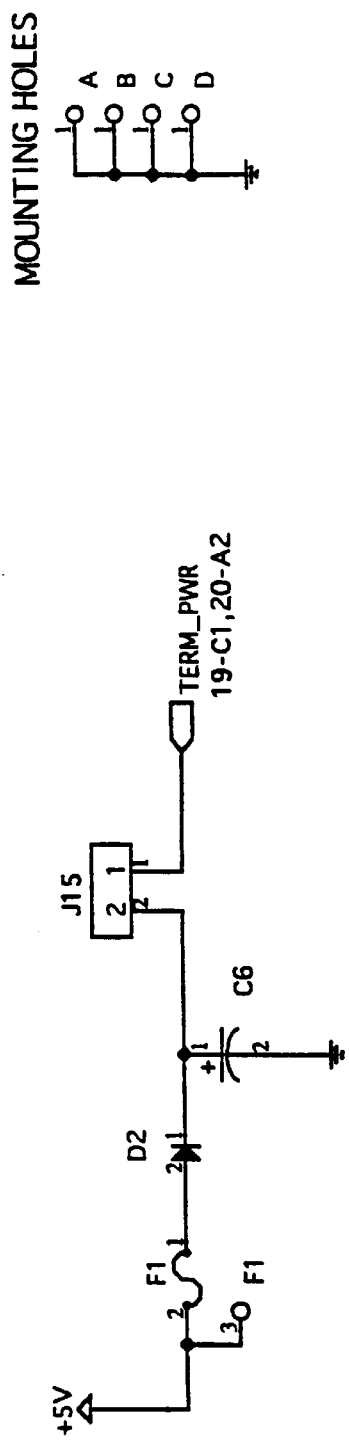
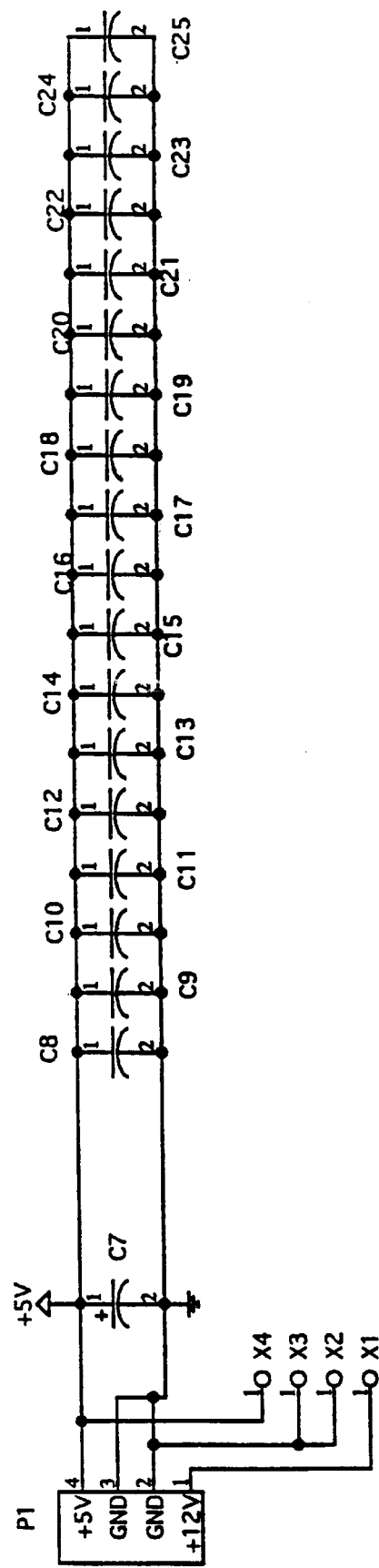
FIG. 53

HARD DISK CACHE FOR CD-ROM AND OTHER SLOW ACCESS TIME DEVICES

This is a file wrapper continuation-in-part under 37 C.F.R. §1.62, of U.S. patent application Ser. No. 08/300,372, filed Sep. 2, 1994, now abandoned. (Attorney Docket PLI-005), entitled HARD DISK CACHE FOR CD-ROM AND OTHER SLOW ACCESS TIME DEVICES.

BACKGROUND OF THE INVENTION

The invention pertains to the field of performance enhancing devices for CD-ROM devices and other slow access memory devices.

CD-ROM devices, and other devices like magneto-optical disk drives and tape drives are notoriously slow in accessing data. For example, in so called 1X CD-ROM devices typical access times are 390 milliseconds (hereafter msec) and data transfer rates are typically 150 kilobytes/second (hereafter KB/sec). Even so called 2X CD-ROM drives are not much faster, averaging 200–290 msec access times and 300 KB/sec transfer rates, and 4X devices average 190 msec access time and 600 KB/sec transfer rates.

In an attempt to alleviate this problem, manufacturers of CD-ROM devices have been incorporating random access memory into their devices to help speed up access.

The random access memory is managed as a cache. Typical cache sizes of up to 256 kilobytes of random access memory have been used. The problem with this approach is that the capacity for data storage in CD-ROM devices is so huge, that a 256 kilobyte (hereafter KB) cache does not significantly speed up access. For example, typical data transfer rates for a 1X CD-ROM with a 256 KB cache are only speeded up to 170–180 KB/sec and 4X device have their data transfer rates speeded up to only 700 KB/sec.

In another approach to solving this problem, some manufacturers such as Insignia Software Solutions, with its RapidCD software product, have introduced drivers for CD ROM devices which use the hard disk and RAM of the host computer as look-ahead cache memory. Another example of this type of product is the CD-ROM Toolkit by FWB Software, Inc. The problem with this approach (which will be called the software cache approach herein) is that using part of the host hard disk and RAM for cache purposes for the CD-ROM device lowers the capacity of the host hard disk and RAM for other purposes such as storing application programs and data. In many cases, especially where a multitasking environment is in effect such as in Windows and Macintosh environments, the remaining space on the host hard disk and RAM is insufficient to support all necessary operations. Further, although a program may initially run, it may ultimately crash as more demands on the host RAM and hard disk for storage are made. This can lead to loss of whatever data is currently displayed which has not yet been saved to hard disk.

The software cache approach also requires that the host CPU be used to manage the cache such as reading the least recently used table, storing data into the cache, intercepting read requests and examining the cache map and extracting data from the software cache or from the CD-ROM as appropriate.

The software cache approach also utilizes the file operating system of the host. Typically, such operating system functions require a fairly large amount of overhead even for a simple data transfer.

Also, software cache operation is not universally compatible with all operating systems and hardware platforms.

The software cache approach is also not terribly efficient, because to store data in the host hard disk cache area, the data is first transferred from the CD-ROM into the host RAM, and from there into the host hard disk cache area. This two step process involves overhead for each of the two storage transactions and ties up the host CPU, the host RAM and the host hard disk thereby precluding these assets from being used for other multitasking purposes during the transactions.

Accordingly, a need has arisen for a method and apparatus to vastly speed up access times and data transfer rates for slow access time rotating media bulk storage memory devices which solves the above noted problems and is completely transparent to the host computer.

SUMMARY OF THE INVENTION

According to the teachings of the invention, there is disclosed herein a controller for a slow access time rotating media bulk storage memory devices such as a CD-ROM drive or magneto-optical read/write drive which uses a conventional large-capacity, rotating-magnetic-media type hard disk as a cache.

The bulk memory storage device controller system comprises the following elements in combination. A first bus controller for the rotating media bulk storage memory device is located within the controller and is coupled to an external rotating media bulk storage memory device via a first bus and a first bus port. In some embodiments, the rotating media bulk storage memory device may be integrated within the same housing which contains the bulk memory storage device controller system.

Typically, the rotating media bulk storage memory device is coupled to the first bus controller by a SCSI bus but the bus can be any known bus or any bus developed in the future. The first bus controller serves to manage data transfers to and from said rotating media bulk storage memory device in the manner said data transfers are normally accomplished over the first bus.

A second bus controller is located within the controller system and is coupled to a second bus port. A conventional large-capacity, rotating-magnetic-media type hard disk is coupled to the second bus controller via the second bus port and a second bus. This conventional large-capacity, rotating-magnetic-media type hard disk may be integrated within the bulk memory storage device controller system or may be external to it.

A third bus controller is located within the controller system and is coupled to a third bus port. A conventional host computer such as a PC, Macintosh etc. is coupled to the third bus controller via the third bus port. The function of the third bus controller is to control data transfers back and forth between the host computer and the controller system via the third bus and to present to the host computer a conventional CD-ROM etc. interface. That is, if the bulk storage device is a CD-ROM, the third bus controller serves to present a conventional CD-ROM interface to the host computer such that the fact that a hard disk cache is used is transparent to the host computer in the sense that the CD-ROM driver software need not include any instructions or commands that accommodate the presence of the hard disk cache. To the host computer CD-ROM driver software, the controller system according to the invention looks simply like a CD-ROM drive except it is faster.

A memory within the system controller stores program instructions and data needed by the microprocessor to be described next. In most embodiments, the program instructions are stored in non-volatile memory such as EPROM, and the data is stored in volatile static RAM. In alternative embodiments, the program may be stored on the conventional rotating-magnetic-media type hard disk and read out and stored in the RAM at power-up.

A microprocessor is coupled to the memory and the first, second and third bus controllers via data, control and address buses and serves to execute the program instructions stored in the memory. The program controls the microprocessor to manage the controller system such that the conventional rotating-magnetic-media type hard disk implements a cache memory function for the conventional rotating media bulk storage memory device. The program controls the microprocessor to copy at least some of the data from said rotating media bulk storage memory device to said conventional rotating-magnetic-media type hard disk whenever a new rotating media is inserted into said rotating media bulk storage memory device. The program also controls the microprocessor to keep a record in said memory of what blocks of data from said rotating media bulk storage memory device have been stored in said rotating-magnetic-media type hard disk and the addresses thereof in the rotating-magnetic-media type hard disk. In the preferred embodiment, the hard disk cache has one area devoted to cloning, i.e., making a duplicate of all or some subset of the blocks of data on a CD-ROM disk, and has another area managed as a cache memory. In such an embodiment, there is a clone map which consists of approximately 1400 bytes in a table (big enough to clone an entire CD-ROM disk), each bit of which maps to one page of data on the CD-ROM disk. When the bit is on, the corresponding page is stored in the clone area of the hard disk. Another table is stored in RAM as a cache map. The cache map contains data indicating which pages of data from the CD-ROM disk are stored on the hard disk and the recency of use of each page stored in the hard disk cache area. The program also controls the microprocessor to intercept read requests from the host computer, and, if the requested data has previously been stored in the rotating-magnetic-media type hard disk, the requested data is retrieved from said rotating-magnetic-media type hard disk and transmitted to host computer. If, however, the requested data has not been previously stored in the rotating-magnetic-media type hard disk, the requested data is retrieved from said rotating media bulk storage memory device and transmitted to said host computer. The program also controls the microprocessor so as to cause the data just retrieved from the rotating media bulk storage memory device to be stored in said rotating-magnetic-media type hard disk. The cache map, i.e., the record stored in the memory of what data is stored in the rotating-magnetic-media type hard disk is then updated by the microprocessor to reflect the fact that new data has been stored in the rotating-magnetic-media type hard disk and the address or addresses thereof in said rotating-magnetic-media type hard disk are recorded. In the preferred embodiment, the cache map (and clone area map in some embodiments) are periodically copied to the hard disk 22 as a back-up in case of power failure or normal shutdown. In some embodiments, this backup process can be performed each time the cache map or clone map is updated. Where this causes too much overhead however, the backup process to the hard disk can be performed less frequently such as every four times the cache area map is updated and every four updates of the clone area map during the cloning process to fill up the clone area of the hard disk.

In the preferred embodiment, an indication is kept in the cache map of the recency of use of various blocks of data stored in the rotating-magnetic-media type hard disk. This allows flushing of enough least recently used data to make room for a whole new page of data whenever a read request is received for a block of data not currently stored in the rotating-magnetic-media type hard disk cache. Then, when a read request for a block of data not currently stored in the cache is received, the whole page on which the requested data is stored is copied to the cache. When the requested data has been read, it is transmitted to the host computer and subsequent blocks on the same page are continuously copied to the cache until the entire page has been copied to the cache.

In the preferred embodiment, a direct-memory-access bus is also used coupling the first, second and third bus controllers to each other. This allows any of the first, second or third controllers to transfer data directly to one another without the involvement of said microprocessor thereby speeding up transfers of data. In the preferred embodiment, a data transceiver is also used coupling the data bus to the direct-memory-access bus thereby providing a data path by which said first, second or third bus controllers can transmit data on said data bus to the microprocessor, and the microprocessor can transmit data on said direct-memory-access bus into the buffer memories of the controllers.

In the preferred embodiment, the program controls the microprocessor to intercept eject commands thereby determining when the rotating media has been ejected and replaced with another rotating media. When such an event occurs, the microprocessor checks whether the new rotating media is the same rotating media as previously was present and which previously had at least some of its, data copied to said rotating-magnetic-media type hard disk. This is done by checking data from the beginning, middle and end tracks of the new rotating media against the corresponding locations, if any, in the rotating-magnetic-media hard disk type device as reflected in the cache map. If the data matches, the new rotating media is assumed to be the same rotating media as was previously present, and no new data copying process is initiated. If there is no match, the new rotating media is assumed to be a different rotating media. In this case, the program controls the microprocessor to initiate the process of copying at least some of the data stored thereon to the rotating-magnetic-media type hard disk such that the data stored in the rotating-magnetic-media type hard disk acting as a cache memory matches at least some of the data stored on said rotating media bulk storage memory device.

In the preferred embodiment, the process of cloning the most recently used part of the CD-ROM to one part of the dedicated hard disk and caching parts of the CD-ROM to another part of the hard disk utilizes a "striping" storage scheme so that the entire CD-ROM does not have to be read. In this scheme, during the cloning process or during the initial filling of the cache area, the system controller reads an initial 128 kbyte block from the CD-ROM and stores it to the hard disk clone area. Then, the next 64 kbyte block is skipped and not copied to the hard disk. Next, the next sequential 128 kbyte block following the skipped 64 kbyte block is read from the CD-ROM and stored to the hard disk. This process is continued until the entire clone area of the hard disk is filled.

Then the process is repeated for the cache area of the dedicated hard disk.

When a read request from the host occurs which spans blocks on the CD-ROM which have been copied to the hard disk and blocks that have not, simultaneous commands are sent by the cache controller to the dedicated hard disk and the CD-ROM so that both can start their seek movements simultaneously. If the hard disk blocks are first, they are sent to the host. While this is happening, the CD-ROM gets its data and stores it in its own dedicated RAM cache. After the transfer from the dedicated hard disk is complete, the data retrieved from the CD-ROM is retrieved from the CD-ROM's dedicated RAM cache and sent to the host computer. This way, all data read is read from fast sources in a way that is transparent to the host.

The advantages of the invention are that it does not utilize any of the host computer's hardware or processing capacity thereby preserving these assets for use in the multitasking environment. All the processing power needed to manage the cache function is performed by a dedicated microprocessor in the cache controller, and the bulk storage needed is provided by a dedicated hard disk. The invention reduces the time needed to cache 100% of the CD-ROM since there is no operating system overhead. Further, compatibility among all operating systems and hardware platforms is assured since the cache function is entirely transparent to the host. In other words, the host does not have to have any built in dependencies on the peculiarities of the cache system and all it needs to do is issue a standard read request as if the only hardware to which it was connected is a standard CD-ROM drive. Further, there is no bottleneck created as is the case with the I/O channel to the CD-ROM in the software cache approach since all data transfers involved in the cache, operating are by DMA channels within the cache controller which is external to the host.

BRIEF DESCRIPTION OF THE DRAWINGS

FIGS. 5-1 and 5-2 are a flow chart of the preferred embodiment of the control program wherein the hard disk is partitioned into a clone area and a cache area where the clone area contains an identical copy of all pages of data from an often used portion of the CD-ROM disk, and the cache area contains selected pages of the balance of, or some portion of the balance of, the CD-ROM disk, and wherein all stacked host read requests are completely filled before returning to the process of filling the clone area and the cache area.

FIGS. 28-1 and 28-2 are a flow chart of the process carried out by the cache controller of the invention using a clone area and a cache area of the dedicated hard disk and using the striped initial fill of the clone and cache areas of the dedicated hard disk.

FIGS. 29-1 and 29-2 are a flow chart of the striped fill process used to initially fill the clone and cache areas of the dedicated hard disk.

FIGS. 31-1 and 31-2 are a flow chart of an improved cache management process using a striped fill process for initial fill and using dead time after the initial fill and between read requests from the host to complete the cloning process and complete filling the cache area of the dedicated hard disk.

FIGS. 33–53 are schematic diagrams of another version of the invention.

DETAILED DESCRIPTION OF THE PREFERRED EMBODIMENT

Figure 1:
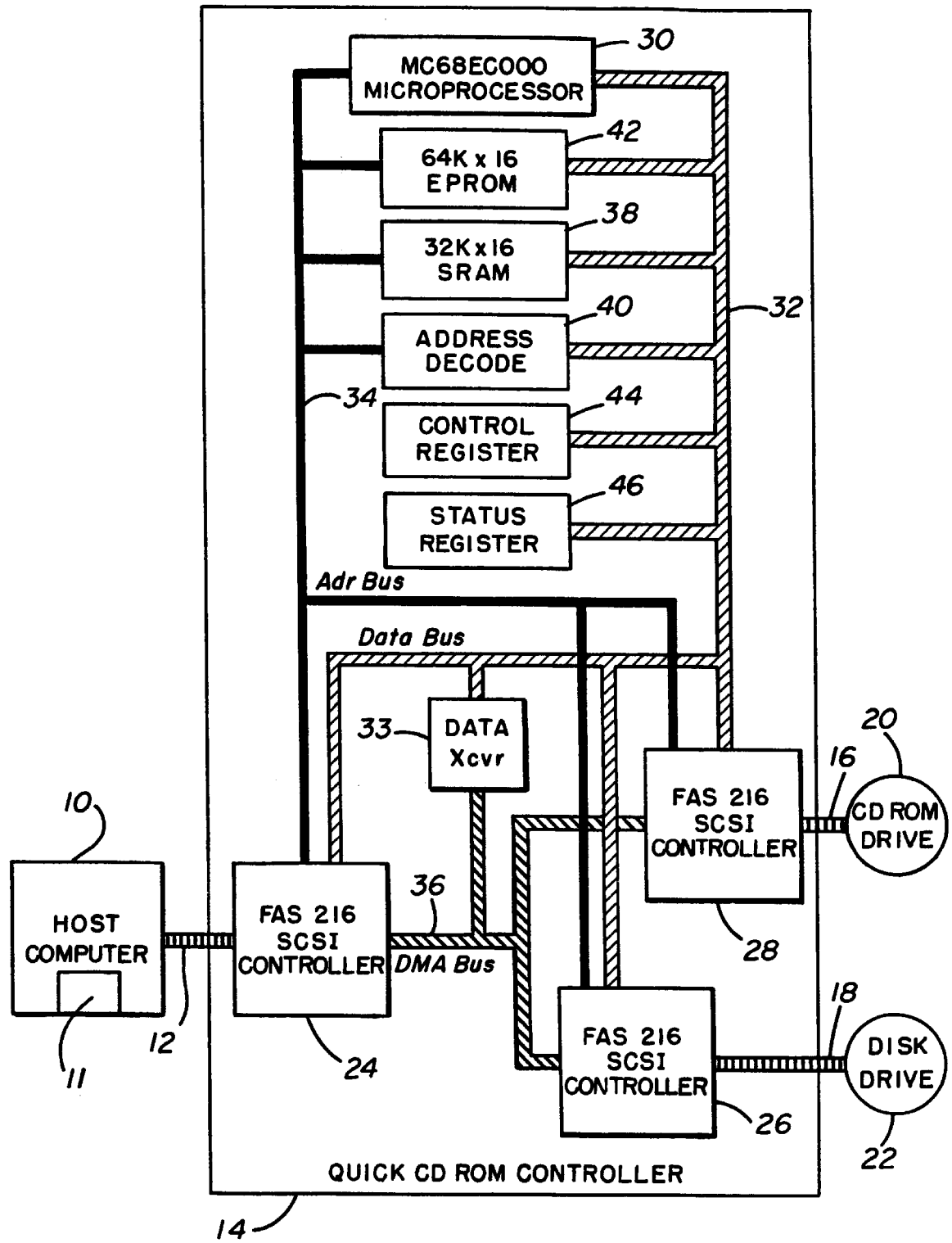
FIG. 1 is a block diagram of a controller system according to the teachings of the invention for using a conventional hard disk as a cache for a slower access time bulk storage memory device such a s CD-ROM or magneto-optical device.

Referring to FIG. 1, there is shown a block diagram of the circuitry of the preferred embodiment according to the teachings of the invention. A host computer 10, having an internal hard disk 11 and internal random access memory (RAM) 13, is coupled by a bus 12, typically but not necessarily a SCSI bus, to a controller system 14 for a slow access time device such as a CD-ROM device 20. Device 20 can also be any other slow-access-time, rotating-media, bulk-storage memory device such as a magnetoptical disk drive, tape drive etc. In the appended claims, device 20 is referred to as a conventional rotating media bulk storage memory device. For convenience hereafter, device 20 will be referred to as a CD-ROM device as that is the preferred application for the controller system according to the teachings of the invention.

For convenience herein, subsequent discussions will assume that all of buses 12, 16 and 18 are SCSI buses and the bus controllers 24, 26 and 28 are known types of SCSI bus controllers and that data is stored on the CD-ROM drive 20 and hard disk 22 as blocks with the block number serving as its address. However, the teachings of the invention are equally applicable to non-SCSI environments where different types of bus controllers are used, the basic unit of data is something other than a block, e.g., a sector, and that suitable conversions are carried out from SCSI block addresses and SCSI commands to whatever types of addresses and CD-ROM and hard disk control commands are used in the environment in which the teachings of the invention are being applied.

The teachings of the invention are also equally applicable to the environment wherein the hard disk 22 is the hard disk of the host computer 10, bus controller 26 is the hard disk controller within the host computer 10 and microprocessor 30 has external access to the bus controller 26 and can store data from the CD-ROM onto the hard disk 22.

The controller system 14 is coupled to the CD-ROM 20 via a bus 16, typically, but not necessarily, a SCSI bus. The controller system 14 is also coupled to a conventional hard disk drive 22 referred to in the claims as a rotating-magnetic-media type hard disk.

Each of buses 12, 16 and 18 is coupled to a bus controller which serves to manage data transfers back and forth of the bus with whatever device is coupled to the device. Bus controller 24 serves to present the host computer 10 with a conventional interface for the type of device coupled to bus 16. Thus, for example, if device 20 is a CD-ROM device, bus controller 24 presents a "transparent" CD-ROM interface to host computer 10. Transparent, as that term is used herein, means that the host computer 10 need not know that the controller system 14 actually includes a hard disk type cache memory or adjust operations in any way for that fact. In other words, bus controller 24 35 responds to typical CD-ROM type read requests and other commands as if the disk drive 22 and its bus controller 26 was not present. This renders the bus controller 14 "plug compatible" with existing host computers and existing CD-ROM driver software on these host computers without necessitating changes in either to accommodate the use of a conventional hard disk as a cache memory for a CD-ROM drive 20.

Bus controller 28 controls data transfers with the CD-ROM 20 over bus 16.

Each of the bus controllers 24, 26 and 28 are coupled to a microprocessor 30 which controls operations of the controller system 14 by a data bus 32 and an address bus 34. Each of the bus controllers 24, 26 and 28 are coupled to each other by a DMA bus 36. The DMA bus 36 allows rapid data transfers between the bus controllers without the need for involvement of the microprocessor 30. The DMA bus 36 helps to speed the process of retrieving data from the CD-ROM 20 by the host computer 10 and helps the process of copying data from the CD-ROM 20 to the disk drive 22 to implement the cache memory. The data bus 32 allows the microprocessor 30 to write control bytes to the bus controllers 24, 28 and 26 to help control operations thereof. The microprocessor 30 can address any of the circuits shown in FIG. 1 by writing the address of the circuit to which the microprocessor wishes to communicate on the address bus. An address decoder 40 then reads the address, decodes it and activates a chip select line (not shown) coupled to the chip select input of the circuit to be addressed. This activates the device's data bus ports and couples them to the data bus 32 so that the microprocessor 30 can send whatever data bytes need to be sent to the activated device to control it, or read the device's status.

The program which controls operations of the microprocessor 30 is stored in EPROM memory 42. The microprocessor can control various circuits in the controller 14 by writing data to a control register 44. The microprocessor can also read the status of various circuits in the controller by reading data bits in a status register 46. All of the aforementioned circuits are addressed in the manner described above using the address bus 34 and address decoder 40 and data is either sent to or received from the addressed device using the data bus 32.

The microprocessor 30 controls operations of the bus controllers to use the disk drive 22 as a cache memory for the CD-ROM 20. The manner in which this is done is described in more detail below, but there follows a brief example of how the microprocessor 30 uses the bus controllers to implement the cache memory operations.

For example, when the microprocessor 30 wants to start the process of copying data from the CD-ROM 20 to the disk drive 22 to implement the cache memory, the microprocessor addresses bus controller 28 via the address bus 34 and issues a command to bus controller 28 causing the bus controller to initiate a seek by the CD-ROM 20 to the proper track and read the requested blocks of data. The microprocessor then instructs the bus controller 28 to perform a DMA transfer of the data just read from the CD-ROM drive to the bus controller 26 via the DMA bus 36. The microprocessor 30 then addresses the bus controller 26 via address bus 34 and issues appropriate commands on data bus 32 to cause the bus controller 26 to store the data received via the DMA bus 36 on the disk drive 22 at an address supplied by the microprocessor 30.

The microprocessor 30 keeps track of which data blocks from the CD-ROM 20 have been copied to the disk drive 22 and where they are stored on the disk drive 22 using a 2000 byte cache/clone map stored in static RAM 38. In the preferred embodiment, the hard disk has sufficient capacity to store all the data stored on the device 20. In these embodiments, the entire contents of the device 20 are copied to the hard disk cache in a process which will be referred to herein as cloning. In these embodiments, there is no need to manage any portion of the hard disk as a cache with least recently used tables etc. In such an embodiment, the microprocessor 30 keeps only a clone map in static RAM. In embodiments where the capacity of the hard disk is less than the capacity of the CD-ROM 20, a fixed or user-definable portion of the hard disk is used as a clone area while the balance of the hard disk capacity is used as a cache area. In such an embodiment, certain frequently used blocks such as the directory/file allocation table etc. which are constantly used are copied to the clone area of the hard disk while the remaining portion of the hard disk storage capacity is used as a cache. Typically this is done by copying some portion of the CD-ROM data to fill up the cache and starting a cache map in RAM which is separate from the clone map in RAM 38.

Typically, the data on the CD-ROM is stored in pages, each of which is typically 128 blocks in length. The cache map and clone map in RAM 38 typically store the page numbers of pages of data that are currently stored in the hard disk cache. This is done to keep the size of the clone map and cache map table more reasonable. In other embodiments however with large amounts of RAM, the clone maps and cache maps can be used to keep track of individual blocks that have been copied to the hard disk cache.

The cache map includes data indicating which pages or blocks have been most recently used. This data is used whenever new data is copied into the cache to determine which blocks of the hard drive can be overwritten with the new data. The new data will be overwritten on top of the least recently used data already in the cache.

Figure 2:
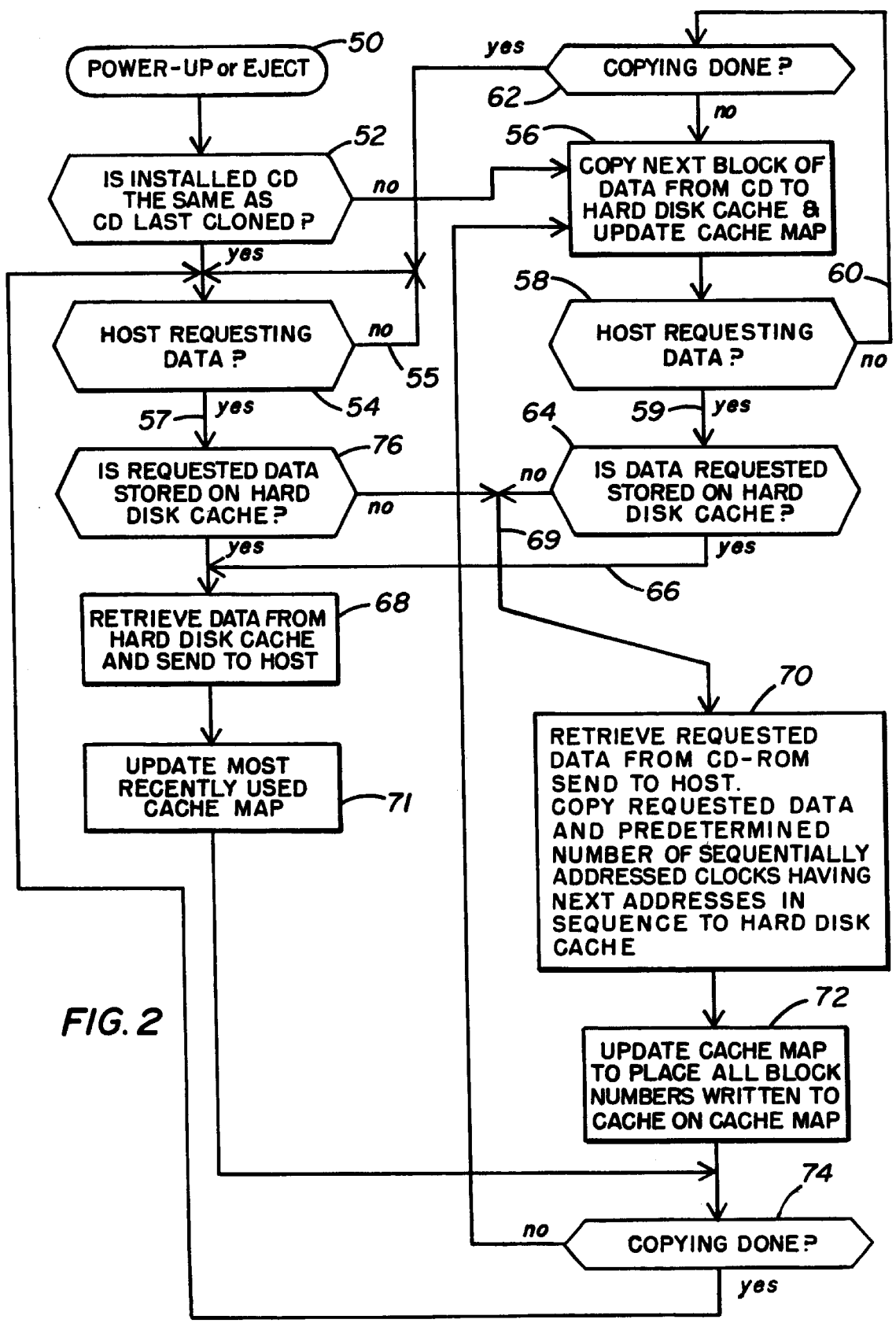
FIG. 2 is a flow chart of a portion of the control program for the microprocessor which controls the process of using the hard disk as a cache and receiving read requests from the host computer and either retrieving the data from the cache or retrieving the data from the rotating media bulk storage memory device and transmitting it to the host computer as well as copying the requested data to the hard disk cache.

Referring to FIG. 2, there is shown a flow chart of the control program for a basic embodiment wherein a hard disk having less capacity than the CD-ROM device is used as a cache memory. The control program is stored in EPROM 42 and controls operations of the microprocessor 30 so as to manage the three bus controllers 24, 26 and 28 and the control register 44. The process starts at block 50 at power-up time or upon an eject event. At power-up or upon an eject, the question is whether the data stored on the hard drive 22 is still a valid copy of the data stored on the disk currently installed on the CD-ROM drive 20. Eject or power-up events are detected by the microprocessor 30 by polling an interrupt flag bit in the bus controller 28. When the user turns on the power to the CD-ROM drive 20 or touches the eject button, data is sent to the bus controller 28 informing it of these events. The bus controller 28 sets its interrupt flag bit and writes data to internal status registers (not shown) which indicates what happened. The microprocessor 30 periodically reads the interrupt flag bits of all the bus controllers 24, 26 and 28, and when one of them is set, reads the internal status registers of the bus controller having its interrupt flag bit set to determine what event happened. The microprocessor then vectors to an interrupt service routine which is appropriate to the particular event which occurred. This is the basic mechanism by which the bus controllers 24, 26 and 28 communicate with the microprocessor 30. The basic mechanism by which the microprocessor 30 controls operations of the bus controllers is by addressing the individual controllers using the address bus 34. The microprocessor then sends commands to the bus controllers via data bus 32 or via data bus 32, data transceiver 33 and DMA bus 36. The latter route is used for some commands since it is simpler to send some commands into the bus controllers via their DMA ports than through their data ports coupled to the data bus 32. Henceforth when communications between the microprocessor 30 and one of the bus controllers is apparent from discussion of the flow charts, the aforementioned mechanism should be understood as the manner in which the communication is accomplished.

When the microprocessor detects the power-up or eject interrupt event, the microprocessor 30 makes a determination as to whether the currently installed CD-ROM disk is the same disk from which the data currently stored on hard disk 22 came. This process is symbolized by the test 52 on FIG. 2. This comparison process is done by reading blocks of data from the beginning, middle and end portions of the CD-ROM disk installed on drive 20 which are supposed to correspond to blocks of data stored on hard disk 22 and comparing the data blocks read from the CD-ROM to the supposedly corresponding blocks of data read from the hard disk. The comparison may be done in any number of ways, and the particular way it is done is not critical to the invention. In the preferred embodiment, the comparison is done by consulting the cache map stored in RAM 38 and picking blocks of data from the cache map which come from widely separated locations on the CD-ROM disk. For the sake of example, assume that the comparison will be done by reading blocks 1, 20 and 50 from the CD-ROM drive. The microprocessor 30 then addresses bus controller 28 and sequentially issues read commands for blocks 1, 20 and 50 via the data bus 32. The bus controller 28 then issues appropriate signals on bus 16 ordering the CD-ROM drive 20 to read blocks 1, 20 and 50. Next, the microprocessor 30 addresses bus controller 26 and sends it commands requesting that blocks 1, 20 and 50 be read from the hard disk 22. As each of these blocks of data comes in from the CD-ROM drive 20 and the disk drive 22, the corresponding bus controller sets its interrupt flag and microprocessor 30 detects the fact that the requested data blocks have arrived. The microprocessor 30 then reads the blocks of data using the data bus 32 or the DMA bus 36 and bus transceiver 33 and compares the blocks. If all three blocks match, processing is vectored to test 54 in FIG. 2. If there is any mismatch between the compared blocks, the microprocessor 30 assumes that the currently installed CD-ROM disk is different than the CD-ROM disk from which the data currently stored in the disk drive 22 came and re-starts the cloning/copying process, as symbolized by block 56 in FIG. 2.

The process symbolized by block 56 is a cloning process if the capacity of the hard disk 22 exceeds the capacity of the CD-ROM drive 20 and is a copying to cache process if the capacity of hard disk 22 is less than the capacity of the CD-ROM drive 20.

In the cloning process, there is no need to keep any data regarding which blocks are least recently used in a cache map. In such a case, a clone map is kept that indicates where each block from the CD-ROM drive 20 may be found on the hard disk 22. In the copying process, which is the usual case, only some of the data from the CD-ROM drive 20 will fit on the hard disk, so it is necessary to manage the hard disk 22 like a conventional cache memory including keeping data regarding which blocks are least recently used. This allows intelligent management of the cache by replacing data in the cache which has not been used recently with data recently read by the host which was not previously stored in the cache. The prior art on cache memories is vast, and any of the known techniques of managing a cache memory including managing the cache in a lookahead mode will suffice for purposes of practicing the invention. That is, the particular manner of managing the cache memory 22 is not critical to the invention. The prior art of cache memory management is incorporated by reference herein.

Block 56 in FIG. 2 represents the process of sequentially copying as many blocks of data as possible from the CD-ROM drive to the hard disk 22 and updating a cache map in RAM 38 as each block of data is transferred. In some embodiments, the blocks of data are transferred in pages and the cache memory map only keeps track of the pages that have been transferred and the binary boundaries of each page, e.g., page number 1 extends from block 1 to block 128. The microprocessor 30 keeps track of which pages or blocks have been successfully completely transferred during the process in case the process gets interrupted by a read request from the host. This allows the read request to be processed and, thereafter, allows the copying process to resume where it left off. For purposes of discussion herein, it will be hereafter assumed that the microprocessor 30 and all associated circuitry has the capability of reading, copying and otherwise keeping track of individual blocks on the CD-ROM drive 20.

The copying process symbolized by block 56 is carried out by the microprocessor 30 controlling the bus controllers 28 and 26 and the control register 44 in a specific manner. First, the microprocessor addresses the bus controller 28 and issues it a read command instructing it to read the next block from CD-ROM drive 20. Typically, on the first copying of the CD-ROM, all the blocks of the directory/file allocation table and other housekeeping blocks that are constantly will be copied to the hard drive 22. Then, the balance of the space available on the hard drive 22 will be sequentially filled up with sequentially numbered blocks from the CD-ROM drive 20 starting at the blocks just above the directory/file allocation table and other housekeeping blocks.

After the microprocessor 30 sends a read request to bus controller 28 as part of a copy/clone process, it will address bus controller 26 and send a write request thereto naming the address to which the data received from the CD-ROM drive 20 is to be written. This is part of a pipeline or lookahead process because the bus controller 26 can be performing any necessary operations such as causing the disk drive 22 to complete its seek movement to the appropriate location on the disk before the data actually arrives. This speeds up the transfer by getting preliminary steps in the write process done before the data actually arrives. The microprocessor 30 then writes DMA transfer control data to the control register 44. The control register contains data which is read by the bus controllers 24, 26 and 28 which controls DMA transfers on the DMA bus 36. In this instance, the data written to the control register will cause a DMA transfer from the bus controller 28 to the bus controller 26 when the block to be copied from the CD-ROM drive 20 to the hard disk 22 arrives at bus controller 28. This transfer occurs automatically without the intervention or assistance of the microprocessor other than the steps previously described. In the preferred embodiment, each byte in the data block being transferred is optionally counted, "handshaked" and error detected and corrected by circuitry (not shown) within the bus controllers to insure the integrity of the copying process. In case of an error in a block transfer where no error correction circuitry is used or where the error is not within the range of correction, the microprocessor initiates the transfer of that block over again. In the preferred embodiment, if the transfer fails a certain number of times, indicative of a bad region either on the CD-ROM disk or the hard disk or both, an interrupt is generated (not shown) which causes the controller 14 to stop attempting to cache the bad block and require that the host system always access the CD-ROM for this block. If the CD-ROM disk is the culprit, whatever error message or other interaction that normally occurs between a non-cached CD-ROM drive and the host computer occurs and the fact that the hard disk 22 is present as a cache memory is rendered invisible to the host computer 10.

The microprocessor 30, in the preferred embodiment, sets a counter (not shown) with the number of bytes to be transferred, and each time a byte is successfully transferred without errors, this counter is decremented. When the counter has counted down to zero, it sets the interrupt flag bit of whatever bus controller is doing the counting as a signal to the microprocessor 30 that the requested transfer has been successfully completed. This allows the microprocessor 30 to initiate the transfer of the next block in the sequence of blocks to be copied to the hard disk 22. If the host has not made a read request in the interim, path 60 from test 58 is taken to test 62 to determine if the transfer is done yet. Test 62 represents the process of comparing the block number of the block just transferred to the last block number in the sequence of blocks to be copied from the CD-ROM drive 20 to the hard disk. If the last block has been successfully transferred, processing is vectored to test 54 to await the next host read request. If the last block has not been successfully transferred, processing returns to block 56 to copy the next block in sequence from the CD-ROM drive 20 to the hard disk drive 22.

Block 58 in FIG. 2 represents the process of handling host read requests during the process of copying data from the CD-ROM drive 20 to the hard disk 22. In the embodiment symbolized by the flow chart of FIG. 2, the test of block 58 and the associated processes along the yes pathway symbolize the process of handling all the pending host read requests before returning to the process of copying data from the CD-ROM drive to the hard disk cache to fill the cache. In other embodiments, one host read request will be processed at the conclusion of the transfer symbolized by block 56, and any other host read request will not be processed until processing returns again to either tests 58 or 54.

The process symbolized by test 58 actually takes the form of discovery by the 40 microprocessor 30 during periodic polling of the interrupt flag bit of the bus controller 24 that the host computer 10 has sent a read request to the bus controller 24 specifying one or more blocks to be read from the CD-ROM drive 20. This read request will be stored in a FIFO memory (not shown) within the bus controller 24. The microprocessor 30 will read this FIFO as part of its interrupt service routine. Before this read request is carried out however path 59 is taken to test 64 where the microprocessor 30 determines if the requested block(s) has already been stored on the hard disk drive 22 or need to be retrieved from the CD-ROM drive 20. To do this, the microprocessor 30 addresses RAM 38 and reads the cache table to determine if the requested block has already been stored in the hard disk 22. If the requested block(s) has already been stored in the hard disk, path 66 is taken to block 68 representing the process of retrieving the data from the hard disk 22 and sending it to the host computer 10. If more than one block has been requested, block 68 represents the process of retrieving each requested block sequentially from the hard drive 22. If some of the blocks have not yet been transferred from the CD-ROM drive 20 to the hard drive, block 68 represents the process of retrieving all requested blocks stored on the hard drive from the hard drive 22 and retrieving the remaining blocks from the CD-ROM drive 20.

To retrieve the requested data from the hard disk 22 as part of the processing represented by block 68, the microprocessor 30 addresses bus controller 26 and sends it a read request and the block number (or the address of the requested block in some embodiments) of the first requested block. The bus controller 26 then sends appropriate signals/data to the hard disk 22 to cause it to access the requested block and return it to the bus controller 26. In the interim, the microprocessor 30 has written appropriate DMA control data to the the control register 44 to cause a DMA transfer from bus controller 26 to bus controller 24. Thus, when the data arrives from the hard disk, bus controller 26 sends it over the DMA bus 36 to bus controller 24 for transfer to the host computer without involvement of the microprocessor 30 in accordance with the DMA transfer mode encoded in the DMA transfer control data stored in the control register 44.

Figure 3:
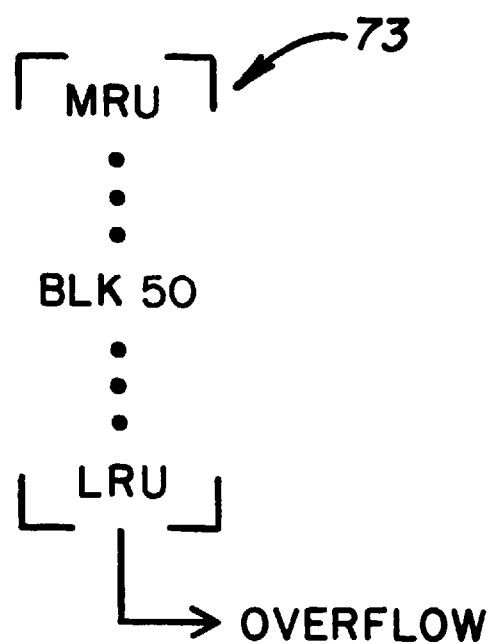
FIG. 3 is a symbolic drawing representing the nature of the push down stack for the cache area map showing how the least recently used and most recently used data blocks are encoded with recency of use information.

After or during the transfer of the requested data from the hard disk 22 to the host computer 10, the microprocessor 30 updates the cache table in embodiments where the hard disk has less data storage capacity than the CD-ROM drive. This process is represented by block 71. This process involves accessing RAM 38 and updating the cache table entry for the block(s) just transferred to the host computer to indicate the recent use thereof by the host computer 10. The least recently used data of the cache table entry can be implemented in the form of a modified push down stack data structure with bottom fallout. This concept is illustrated in FIG. 3. Preferably, the cache area map will take the structure previously described with reference to the discussion of step 72 in FIG. 2.

Referring to FIG. 3, the cache table in RAM 38 is represented as a push down stack 73. The stack is populated with block numbers. The length of the stack is equal to the number of blocks of storage available as the cache portion of hard disk 22. The position on the stack of any particular block number indicates the recency of use of a particular block. For example, the block number at the top of the stack, labelled MRU for convenience, is the block number which has been most recently used. Likewise, the block number at the bottom of the stack, labelled LRU for convenience, is the least recently used block. If the host has just asked for and received data block 50 which has a position down in the stack somewhere, the process represented by block 71 in FIG. 2 represents the process of moving the entry for block 50 to the top of the stack and pushing all other entries in the stack down by one position so that block 50 becomes the MRU block and the former MRU block becomes the second most recently used block. Note that since no new data has been added to the cache, no entries are lost from the stack in this hypothetical.

After the processing of block 71 is complete, processing is vectored to test 74 in FIG. 2. This test determines if the process of copying all data to be copied from the CD-ROM drive 20 to the hard disk 22 to fill up the cache area has been completed. If not, processing returns to block 56 to copy the next block (or page) of data in the sequence of blocks or pages to be copied from CD-ROM drive 20 to the hard disk 22 to complete the process of filling the cache. If the process of filling the cache has been completed, test 74 vectors processing to test 54 to wait for the next host read request. This waiting process is symbolized by the loop back path 55 which loops back to step 54 if no host read request has occurred.

When the next host read request occurs, test 54 vectors processing via path 57 to test 76 which determines if the requested data block is presently stored in the hard disk cache. This is done as previously described for step 64, and simply involves accessing the stack represented by FIG. 3 and reading the contents thereof and comparing these contents to the requested block number. If the requested data is present in the hard disk cache, processing is vectored to the process represented by block 68 to retrieve the data from the hard disk 22 and set up a DMA transfer from bus controller 26 to bus controller 24 to send the retrieved data to the host computer 10.

In embodiments where the hard drive 22 has more storage capacity than CD-ROM drive 20, step 71 is eliminated.

If test 64 k determines that the data requested by the host computer has not already been stored in the hard disk 22, path 69 is taken to block 70. Likewise, if the test of block 76 indicates that the requested data is not stored in the hard disk cache, path 69 is taken to the processing represented by block 70.

Block 70 represents the processing retrieving requested data from the CD-ROM drive, copying it to the cache and delivering it to the host computer. This process is performed whenever the host computer requests data which is not then stored in the hard disk cache. Block 70 represents the process carried out by the microprocessor of addressing the bus controller 28 and sending it a read command naming the block(s) requested by the host computer. The bus controller then causes the CD-ROM drive 20 to access the first requested block and send it to bus controller 28 via bus 16. In the meantime, microprocessor 30 writes data to the control register 44 to set up a simultaneous DMA transfer from bus controller 28 to bus controllers 24 and 26. The DMA transfer to bus controller 24 passes the data to the host computer 10. The DMA transfer to bus controller 26 allows the retrieved data to be added to the hard disk cache. The microprocessor 30 will have previously addressed bus controller 24 and given it a command to pass the data received by the DMA transfer to the host computer. Likewise, the microprocessor 30 will have previously addressed the bus controller 26 and sent it a write command and given it the block number of the data that will be arriving later by DMA transfer. This allows the bus controllers 24 and 26 to prepare in advance to carry out these activities. Thus, when the DMA transfer occurs, preliminary matters such as setting up transfers on buses 12 and 18 and carrying out the seek movement by disk drive 22 will have already been taken care of and transmitting of the data to the host and writing of the data to disk drive 22 can begin immediately. This eliminates the delays associated with these necessary preliminary activities by allowing these delays to overlap the inherent delay in accessing the requested data from the CD-ROM drive 20.

In some embodiments, block 70 represents the process of only accessing the requested data and sending it to the host and writing it to the hard disk cache. In the embodiment depicted in FIG. 2, block 70 represents the process of retrieving not only the requested data block(s) but also a predetermined number of other sequential data blocks having block numbers higher than the highest requested block number. It has been found that application programs executing on the host often ask for data blocks sequentially in ascending block number order. Therefore, the hit ratio can be increased by storing in the cache the next blocks in sequence above the requested block number in "lookahead" fashion. Therefore, block 70 represents the process of also retrieving a predetermined number of other blocks in the block number sequence starting with the block number(s) requested by the host and writing these additional blocks to the hard disk cache but not sending them to the host computer 10.

The way this is typically done is for the microprocessor 30 to set up the DMA transfer for simultaneous transfer to the bus controllers 24 and 26 and then set a byte counter to the number of bytes in the requested block(s). The byte counter (not shown) resides within bus controller 28 and counts the bytes that have been retrieved from the CD-ROM drive and successfully transferred. Thus, if the host computer requested one block, the microprocessor 30 will address the bus controller 28 and set the byte count to 512. As each byte is retrieved and successfully transferred, this byte count is decremented. When the count reaches zero, the interrupt flag bit of bus controller 28 is set. The microprocessor detects this and writes new DMA transfer control data to the control register 44. This new data redirects the DMA transfers from the bus controller 28 so that data from subsequently retrieved block flows on the DMA bus only to the bus controller 26 for writing on the hard disk cache.

Typically, the predetermined number of additional blocks retrieved from the CD-ROM drive 20 beyond the block(s) requested by the host computer will be the rest of the blocks in the page on which the requested block(s) are found. However, the predetermined number of additional blocks can be any number, and the number is programmable by the user in some embodiments. The additional blocks are stored in the hard disk cache in any unused locations, and pointers to them are updated during the process to be described with reference to block 72 described next. If the cache is full, the requested block(s) and the additional blocks retrieved from the CD-ROM drive are preferably stored in the physical locations where an equal number of least recently used blocks are stored, the new blocks overwriting the least recently used blocks. The manner in which the requested block(s) and the additional blocks are stored in the hard disk cache is not critical to the invention and other ways of doing this fall within the scope of the processes symbolized by block 70. All these processes are symbolized by block 70.

After the processing symbolized by block 70 is complete, the process of updating the cache map in RAM 38 is performed as symbolized by block 72. In one embodiment, the cache map is implemented as a push down stack symbolized by FIG. 3. In embodiments where each block is individually kept track of in managing the cache, the huge number of blocks of data on a typical CD-ROM drive of 680 megabyte capacity is too large to make a push down stack manageable. Even when only pages of data are individually tracked, there are still 11,000 pages of data on a typical CD-ROM disk with 128 blocks per page (assuming a block is 512 bytes—some block sizes are 2000 bytes). Even this number is large enough to make a push down stack too big for rapid access to the table entries. Therefore, the preferred form for the cache map is as follows. The cache map is comprised of a table which has entries in ascending or descending CD-ROM page number order. When a page of data is copied from the CD-ROM to the hard disk cache, a two byte entry is made at the location in the table corresponding to the CD-ROM page number just copied to the hard disk. This two byte entry is a pointer to the page address on the hard disk where the data from the page from the CD-ROM disk was stored. Another entry is made in the cache map at the location corresponding to the CD-ROM page number just copied to the hard disk to indicate recency of use or aging and will hereafter be referred to as an aging entry. This entry can be a two byte entry or can be smaller depending upon how much resolution of the aging data is desired. When a new entry is made in the cache table, the aging entry is set to 0 or some arbitrary number indicating that the page of data was just copied to the hard drive. By having two separate entries in the table, one of which is a pointer to the address and the other of which is an aging entry, the pointer address to the location of the desired data on the hard drive can be used to start the data transfer process while the aging data is updated. Then, while the data transfer is proceeding, the microprocessor 30 can go through the aging entries and adjust them. This is done by adding one to all aging entries in the table. The oldest aging entries can also be flagged as candidates for removal if the cache is full and new data not previously stored there needs to be added to the cache. In subsequent discussions herein where the cache map is referred to as a push down stack, those skilled in the art will appreciate that the alternative preferred form described here can be substituted.

Referring to FIG. 3 a symbolic drawing of a push down stack for use as a cache map is shown, this process occurs as follows. The requested block(s) and the additional blocks have their block numbers and pointers to their physical addresses on hard disk cache 22 pushed down onto the top of the cache map stack symbolized by FIG. 3. All other entries on the list are pushed down. A number of entries equal to the number of requested blocks and the additional blocks fall out from the bottom of the stack. Therefore, the position of the block numbers of these newly retrieved blocks at the top of the stack indicates the recency of use of these blocks. The pointers to the physical locations on the hard disk cache for these new blocks point to their locations on the hard disk which are, preferably, the same locations in which the LRU blocks which fell out of the bottom of the stack were formerly stored.

After, the updating of the cache map symbolized by block 72 on FIG. 2 is complete, the test of block 74 is performed to determine if the process of copying data from the CD-ROM to fill up the hard disk cache is complete. This is done by checking the push down stack symbolized by FIG. 3 to see if it is full. The number of positions in this stack will equal the number of blocks that can be cached on the hard disk. The process of test 74 simply checks to see if all the positions on the push down stack of FIG. 3 are full. If not, processing returns to the process symbolized by block 56. If the hard disk cache is now full, processing is vectored to the processed symbolized by test 54 to wait for the next host computer read request.

Figure 4:
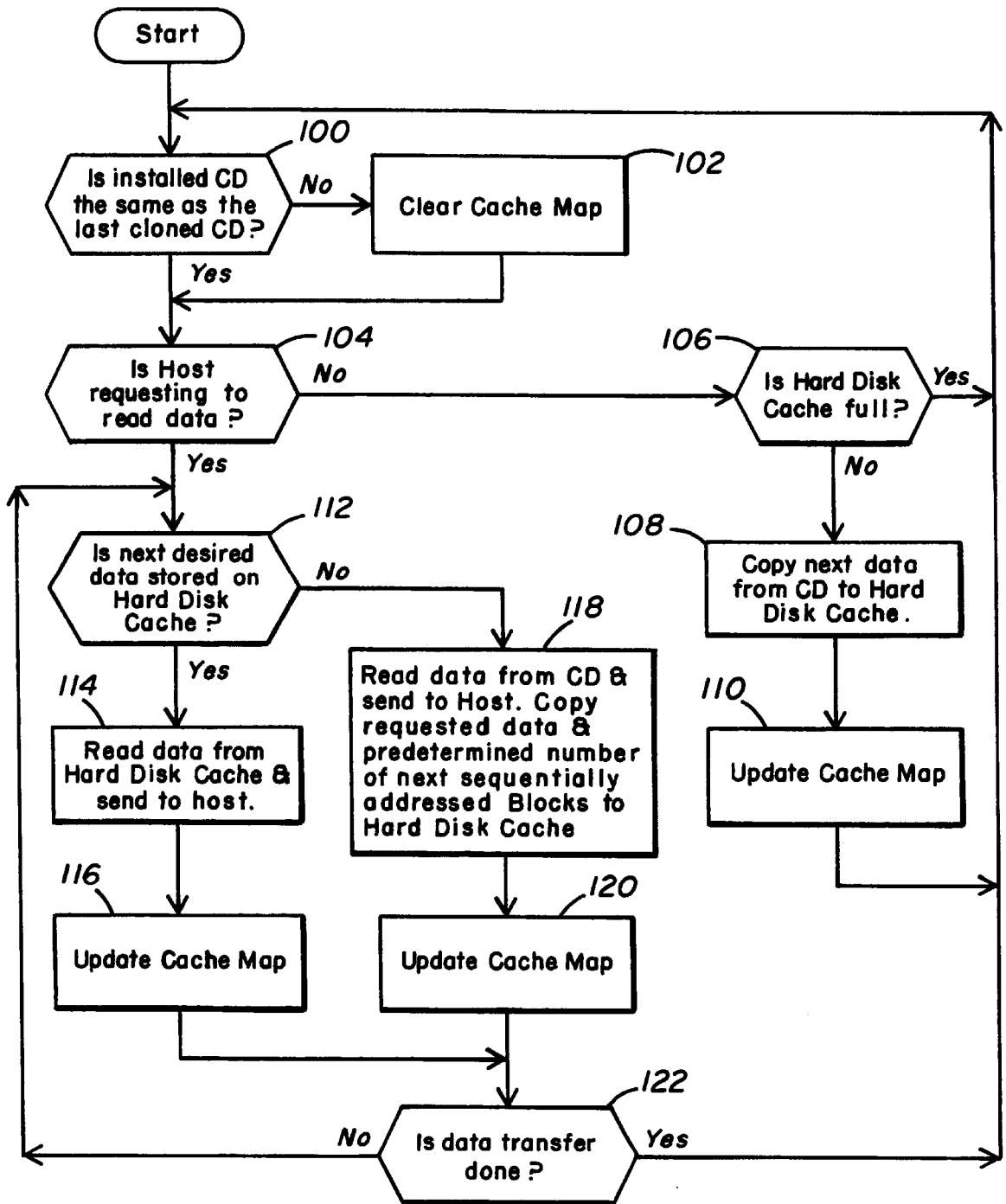
FIG. 4 is a flow chart of another embodiment for a control program for using a hard disk as a cache for a CD-ROM drive. The control program of FIG. 4 is designed to handle all stacked read requests by the host completely before returning to the process of filling the hard disk cache from the CD-ROM drive.

Referring to FIG. 4, there is shown a flow chart for another embodiment of a control program to control operations of the microprocessor 30 to use hard disk 22 as a cache memory for the CD-ROM drive 20. The process starts with a test 100. The purpose of this test is to determine if the installed CD-ROM disk in CD-ROM drive 20 is the same as the CD-ROM disk from which the data currently stored on the hard disk 22 was taken. Since many of the operations on the flow chart of FIG. 4 are performed in the same way as identical operations on the flow chart of FIG. 2, the details will not be repeated.

If a new CD-ROM disk has been placed in the CD-ROM drive, the cache map in RAM 38 is cleared as symbolized by block 102.

If test 100 determines that the CD-ROM disk currently in the drive is the same as the disk from which the current data stored in the cache was copied, a test 104 is performed. The purpose of test 104 is to determine if the host computer 10 has requested any data from the CD-ROM disk. If not, a test 106 is performed to determine if the hard disk cache is full. If it is full, processing returns to test 100. If the hard disk cache is not full, the process symbolized by block 108 is performed. This block represents the process of copying the next data block (or the next data page in some embodiments) to the hard disk cache. This is done as previously described. Typically, the microprocessor will copy enough sequentially numbered blocks from the CD-ROM disk to fill up the hard disk cache starting with the directory, file allocation table and/or other often used blocks. The microprocessor keeps track of where it is in this sequence of copying, and this process is also symbolized by block 108.

After the next block has been copied to the cache, the cache map is updated by pushing the block number of the block just copied to the hard disk cache onto the cache map stack symbolized by FIG. 3. This process is symbolized by block 110. After updating the cache map, processing returns to test 100.

If test 104 determines that the host computer 10 is requesting a data block, test 112 is performed to determine if the requested data block is stored on the hard disk cache. This is done by searching the cache map table to see if the requested block number is present and, if it is, retrieving the pointer to the physical address of the block on the hard disk cache.

If the requested block is present on the hard disk cache, the process symbolized by block 114 is performed to retrieve the block from the hard disk cache and send it to the host computer. This is done by the microprocessor addressing the bus controller 26 and sending it the physical address of the requested block and setting up the DMA transfer from bus controller 26 to bus controller 24.

After the requested data is transferred to the host computer, the process symbolized by block 116 is performed to update the cache map by removing the block number of the block transferred to the host from its current position in the cache map stack and pushing it onto the top of the cache map stack. The remaining block numbers in the stack are rearranged to reflect the new order. Those skilled in the art will appreciate that the cache map may be implemented as a fixed length linked list having one list entry for every block (or every page etc.) stored in the hard disk cache, After the cache map is updated in the processing symbolized by block 116, test 122 is performed to determine if all the blocks requested by the host computer 10 have been transferred thereto. The microprocessor 30 keeps track of this by virtue of knowing the block numbers requested from the initial interrupt servicing of bus controller 24 and by keeping track of which block numbers have been sent to either the bus controller 28 or the bus controller 26 for retrieval. If not all requested blocks have been sent to the host computer, processing returns to test 112 to determine if the next requested block is stored on the hard disk cache. If not, processing proceeds to the processes symbolized by blocks 118, 120 to retrieve the next requested block from the CD-ROM disk, send it to the host computer and write it to the hard disk cache and update the cache map. Thereafter, processing returns to test 122 and the cycle starts over. If test 112 determines that the next block is stored on the hard disk cache, the processing of blocks 114 and 116 is performed to retrieve the next requested block from the hard disk cache, send it to the host computer and rearrange the cache map. In this way, a read request that requests some blocks that are on the hard disk cache and some blocks that are not can be easily handled.

If test 112 determines that the requested data is not stored on the hard disk cache, the process symbolized by block 118 is performed. This block symbolizes processing identical to the class of processes symbolized by block 70 of FIG. 2 and will not be further described here.

After the processing symbolized by block 118, the cache map is updated as symbolized by block 120. This process involves pushing the block numbers of the blocks newly written to the cache onto the top of the cache map stack. An equal number of least recently used block numbers will overflow the bottom of the stack and fall out. After updating the cache map, test 122 is performed as previously described to determine if all requested blocks have been sent to the host. If so, processing is vectored to test 100.

Figures 1, 5:
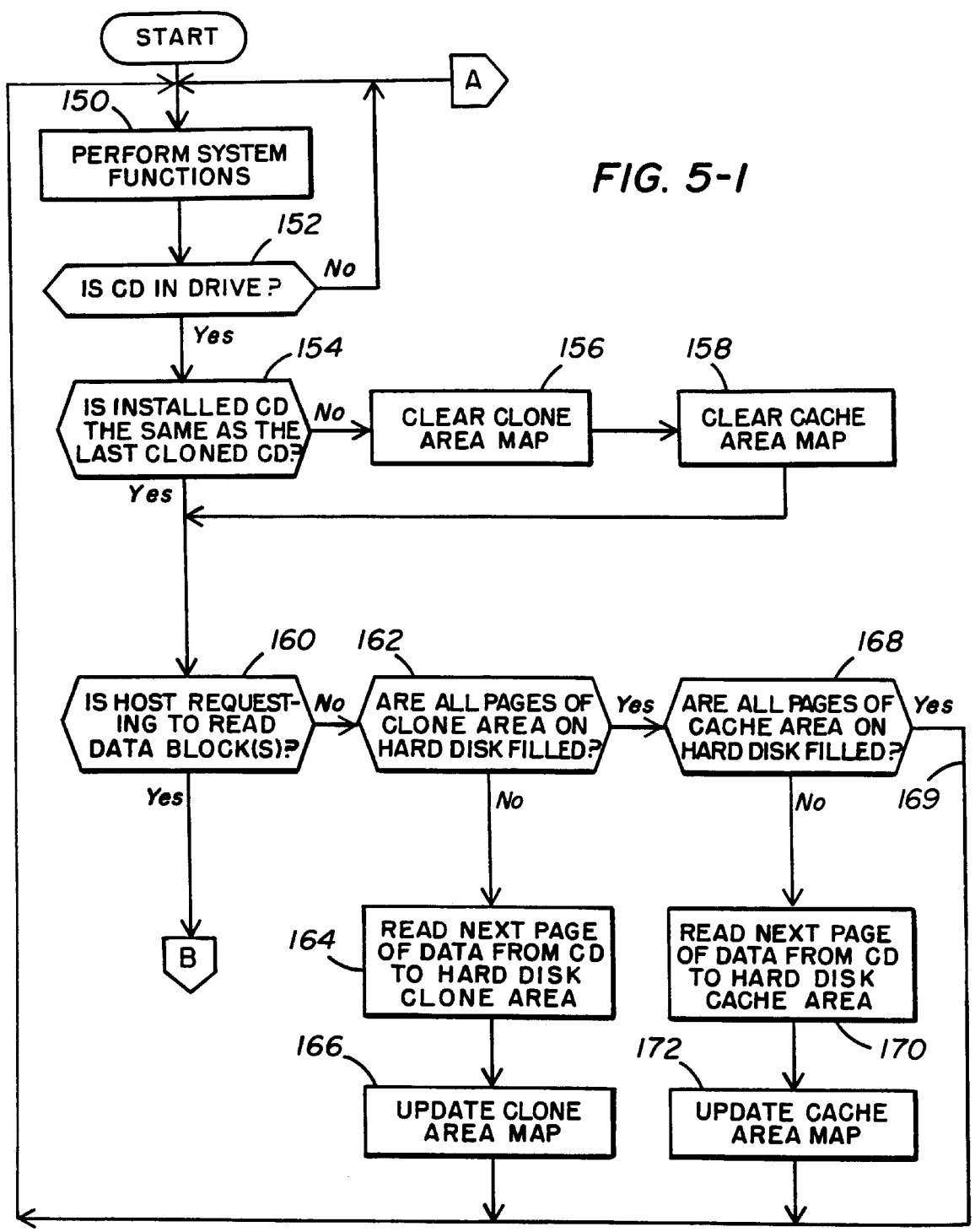
Figures 2, 5:
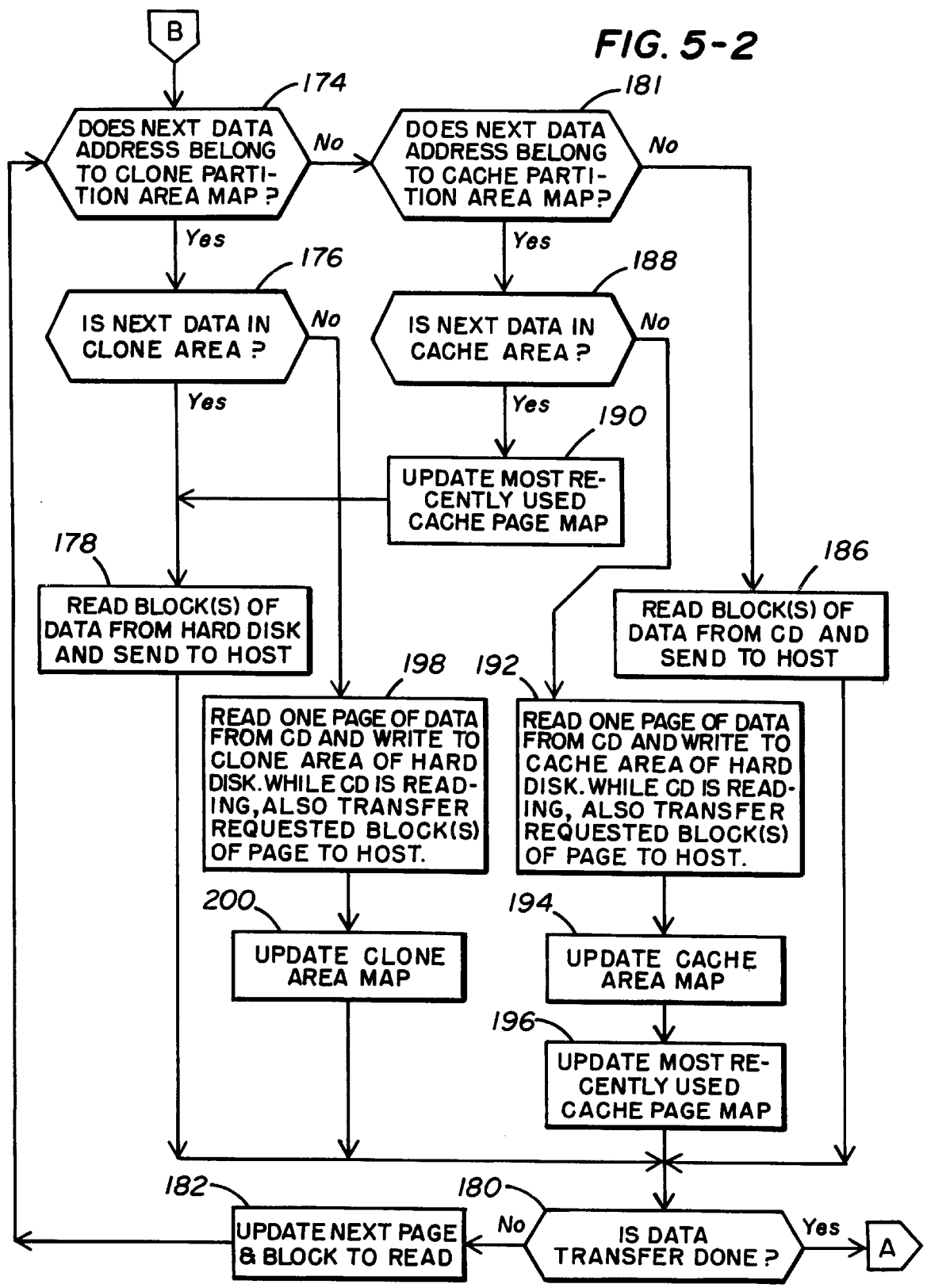

Referring to FIGS. 5-1 and 5-2, there is shown a flow chart of the preferred embodiment for a control program for microprocessor 30. This control program utilizes the hard disk drive 22 in a partitioned manner with one portion that is cloned from the frequently used CD-ROM drive pages and one portion that is managed as a cache. Again, many of the processes symbolized by the blocks of FIGS. 5-1 and 5-2 are similar or identical to processes previously described in detail in connection with the discussion of the flow chart of FIG. 2. Therefore, the details of how these processes are carried out will not be repeated here.

The process starts out with the process symbolized by block 150 where the microprocessor 30 is performing system functions. These system function can be any housekeeping duties etc. necessary to keep the controller board 14 running, on board diagnostics for maintenance etc. These functions are not critical to the invention and may be performed by other logic not shown in FIG. 1 and not part of the invention.

Next, test 152 is performed to determine if there is a CD-ROM disk present in drive 20. This is done by addressing bus controller 28 and reading status registers therein (not shown). If no disk is present, processing returns to block 150 to perform more system functions. If a CD disk is present, test 154 is performed to determine if the installed CD is the same CD disk that was last cloned to the hard disk cache. If not, the processing symbolized by blocks 156 and 158 is performed to clear the clone area map and the cache area map. In this embodiment, the hard disk drive 22 is partitioned along an address line which may be fixed or may be programmable by the user. The storage locations on the hard disk drive 22 on one side of the line are used to "clone", i.e., make an identical copy of, the blocks of data for some segment of the CD-ROM disk in drive 20. Usually, the portion of the CD-ROM disk which is cloned is the portion containing the directory, file allocation table and any other blocks of data that are frequently used. Usually, these blocks of data are the first blocks of data on the CD-ROM, so these blocks are cloned at least, and, in addition, additional blocks of data having higher block sequence numbers may also be cloned. Since these blocks are frequently used, the cloning thereof to the hard disk significantly increases the hit ratio. The storage locations on the other side of the line are managed as a cache memory to store other data blocks frequently called for as well as data blocks which are likely to be called for in the near future.

The clone area map cleared by the process of block 156 is a table stored in RAM 38 which stores information regarding which data blocks are stored in the clone area. No pointers to addresses in the clone area are needed because block one on the CD-ROM is stored in block one of the hard disk drive 22.

The cache area map cleared by the process of block 158 is a table stored in RAM 38, organized like a push-down stack as symbolized by FIG. 3, which stores information regarding which data blocks are stored in the cache area. This table contains pointers to the address on hard disk drive 22 of each data block listed in the cache map table.

If test 154 concludes that the installed CD disk is the same disk as previously cloned, test 160 is performed to determine if the host computer 10 is requesting data. If not, test 162 is performed to determine if all pages of the clone area of the hard disk are filled. Because a typical CD-ROM disk contains 680 megabytes of data, there are too many blocks of data to keep track of individually unless a very large RAM 38 and a very fast microprocessor 30 are used. In a more typical embodiment, only pages are tracked in the clone and cache maps where each page contains 128 blocks of data. Both the clone area and cache area contain a certain number of pages worth of data storage locations which, ideally, are filled to maximum capacity to maximize the hit ratio. Test 162 determines if the maximum capacity of the clone area of the hard disk has been used. If not, the processing represented by block 164 is performed to read the next page of data blocks from the CD-ROM disk and copy them to the clone area of the hard disk cache 22. This process is similar to the process described above with reference to step 56 in FIG. 2 except that a whole page of data blocks are copied to the hard disk as opposed to a single block. In some embodiments, the microprocessor 30 can manage this transfer by ordering the transfer of each individual block in the page, and in some embodiments, the bus controllers 28 and 26 will have sufficient intelligence to receive read and write requests, respectively, from the microprocessor that specifies only the page. The bus controllers will then manage the transfer of each individual block within the page without further involvement by the microprocessor 30.

After the transfer of the page is completed by the process symbolized by block 164, the clone area map is updated by the process symbolized by block 166. This process entails writing the page number of the transferred page to the clone area map stored in RAM 38.

If test 162 determines that all pages of the clone area of the hard disk cache are filled, test 168 is performed. This test determines if all pages of the cache area of the hard disk cache have been filled. If so, processing returns to step 150. If not all cache pages have been filled, the process represented by block 170 is performed. This process reads the next page of data from the CD-ROM drive 20 and copies it to the cache area of the hard disk cache 22. The microprocessor 30 will arbitrarily select a page number above the range of pages to be used in filling the clone area to start filling the cache area in some embodiments. In other embodiments, the microprocessor 30 will select as a page number to start filling the cache area the page number including the first block of data other than a block of data in the clone area. The cache area will then be filled with sequentially numbered pages having page numbers equal to or greater than the first page number used to start filling the cache area plus one.

After the process symbolized by block 170 is complete, the cache area map is updated as symbolized by block 172.

If test 160 indicates that the host computer 10 is requesting data, processing is vectored to the process symbolized by block 174 on FIG. 5-2. Test 174 is a process where the microprocessor 30 examines the block number of the block being requested by the host computer and compares that to a range of block numbers defining the range of blocks on the CD-ROM disk in drive 20 to be cloned. There is a logical partition defined by a range of blocks maintained as part of the control program for microprocessor 30. This partition defines which group of blocks on the CD-ROM disk is to be cloned to the hard disk cache, and which are subject to being cached. The partition also, in some embodiments, identifies which blocks on the CD-ROM disk are never to be subjected to being copied to either the clone or cache area. The partition is fixed in some embodiments, and is a variable which the user can dynamically change in other embodiments. In some embodiments, the control program of the microprocessor 30 will look at the read requests that the host computer is issuing and intelligently set the partition accordingly. Such an embodiment would be able to detect for example, the typical pattern of access characteristic of certain applications such as movies where access is often to sequential blocks or dictionaries, encyclopedias etc where access can jump around. The control program then sets the partition for best optimization of the hit ratio. The test 174 determines if the next block number to be accessed lies within the clone partition. Likewise, test 184 determines if the next block to be accessed lies within the cache partition. If the answer determined by test 174 is yes, it does not necessarily follow that the next block actually is stored in the area of the hard disk cache devoted to the cloned blocks. Therefore, test 176 is performed to determine if the next requested block of data is actually stored in the clone area of the hard disk drive 22. If the answer is yes, the processing symbolized by block 178 is performed to read the requested block(s) of data from the clone area of the hard disk cache and send it to the host computer. Thereafter, processing is vectored to test 180 which determines whether the data transfer of all blocks requested by the host computer is done.

If test 180 determines that not all blocks requested by the host computer 10 have been sent, then processing symbolized by block 182 is performed. This block symbolizes the process carried out by the microprocessor of comparing the blocks that have been successfully sent to the host computer to the blocks requested by the host computer in the original read request and determining the next block number to read. Processing is then vectored to the process of test 174 which starts the process of determining if this block number determined by the process symbolized by block 182 is within the range of blocks from the CD-ROM disk to be cloned, is within the range of blocks subject to being cached or is within the range of blocks not subject to being stored in either the clone area or the cache area of the hard disk cache. This determination proceeds as follows. If test 174 determines that the block number of the next block to be transferred to the host computer is within the clone range of the partition, test 176 is performed to determine if the next block to be retrieved is actually stored on the hard disk cache portion devoted to cloned blocks.

If test 174 determines that the next block to be retrieved is not within the clone range of the partition, then test 184 is performed to determine if the block number of the next block to be retrieved is within the cache range of the partition. If not, then the block must be stored on the CD-ROM portion which will never be copied to the hard disk cache. In such an eventuality, the processing symbolized by block 186 is performed to order bus controller 28 to access the block number determined by the process of block 182 from the CD-ROM disk and to set up a DMA transfer from bus controller 28 to bus controller 24 and a transfer from there to the host computer 10.

If test 184 indicates that the next block to be transferred of the block(s) requested is within the cache range of the partition, test 188 is performed to determine if that block number is actually stored in the area of the hard disk cache devoted to storing blocks from the cache range of the partition. Since the area of the hard disk devoted to storing blocks from the cache range of the partition is usually smaller than the range of block number in the cache range of the partition, a cache map must be maintained in RAM 38 indicating which blocks from the cache range are actually stored in the cache area of the hard disk 22. The processing of test 188 involves comparing the block numbers in this cache area map against the block number of the next block to be accessed.

If test 188 determines that the next block to be retrieved is actually stored in the area of the hard disk cache devoted to storing blocks from the cache range of the partition, the processing symbolized by block 190 is performed to update the cache map most recently used data. Since the most recently used status of any particular block is its position in the push down stack shown in FIG. 3, the processing symbolized by block 190 involves moving the block number of the next block to be accessed to the top of the stack and pushing all other block numbers in the stack downward. In a linked list embodiment, this is done by simply rearranging the link pointers on the list to reflect the new order.

After the processing of block 190, processing is vectored to the process represented by block 178 to read the next requested block from the hard disk cache.

If test 188 determines that the next block to be accessed has not yet been stored in the hard disk cache, the processing symbolized by block 192 is performed. This process involves sending appropriate commands to bus controllers 28 and 26 and the control register 44 to read the entire page of data blocks containing the next block to be transferred to the host computer and copy them to the area of the hard disk cache 22 devoted to the cache range of the partition. When the actual requested block number arrives at the bus controller 28, it is DMA transferred to bus controller 24 for transfer to the host computer 10. This process is similar to a process previously described and involves microprocessor 30 setting up a byte count in bus controller 28 to count the number of bytes in the blocks between the beginning of the page being copied and the beginning of the block to be accessed as determined by the process of block 182. The microprocessor 30 also addresses the control register 44 and writes data therein setting up a DMA transfer from bus controller 28 to bus controller 26. The microprocessor 30 also transmits write commands to bus controller 26 to start the process of setting up the write to hard disk cache 22. As each byte is transferred from bus controller 28 to bus controller 26 over the DMA bus 36, the byte counter is decremented. When it reaches zero, an interrupt is generated, and microprocessor 30 detects this fact during regular polling. Microprocessor 30 then rewrites the data in the control register 44 to set up a simultaneous DMA transfer of the data block the host computer actually requested simultaneously to the host computer bus controller 24 and the hard disk cache bus controller 26. A read request for the block actually requested is then sent to bus controller 28 and a write request is sent to bus controller 26. The microprocessor 30 then also sends an appropriate command to the bus controller 24 telling it to transfer the data coming in on the DMA port to the host computer 10. The byte count register is addressed and set to the byte count for the number of bytes in the requested block. The transfer then proceeds until all bytes of the requested block have been transferred to the host computer and written onto the hard disk cache. The byte counter will have counted down to zero by that time, and an interrupt will be generated.

The microprocessor then resets the data in the control register 44 to set up DMA transfer only from the bus controller 28 to the bus controller 26. The microprocessor also sends appropriate read and write commands to these two bus controllers to read the data blocks between the end of the requested block and the end of the page and write them onto the hard disk. The byte counter is then set to count the number of bytes in the blocks from the end of the requested block and the end of the page. When it counts down to zero, the resulting interrupt causes microprocessor 30 to know that the transfer has been completed and to vector processing to the processes symbolized by blocks 194 and 196.

The processes symbolized by blocks 194 and 196 entail updating the cache area map to add the page number just copied to the hard disk cache and add information regarding its recency of access. This involves writing the page number (or individual block numbers in some embodiments) of the page just copied to the hard disk cache to the cache area map by pushing the page number down onto the top of the stack symbolized by FIG. 3. This causes the page number at the bottom of the stack to fall out and be lost. The write requests issued to the hard disk cache bus controller 26 to implement this copying process identified the physical addresses used by the blocks of the least recently used page that dropped out of the bottom of the stack so that the new blocks of data physically overwrite the blocks of data from the least recently used page. A pointer is written into the cache area map to identify the physical address at which the data from the newly written page starts.

After the processing of blocks 194 and 196, the test 180 is performed as previously described to determine if all requested blocks have been transferred.

Returning to the consideration of test 176, if it is determined there that the next block to be accessed is not stored in the area of the hard disk cache cloned from the CD-ROM disk, the processing represented by block 198 is performed. This processing is virtually identical to the processing described with respect to block 192 except that the page read from the CD-ROM disk is copied to the area of the hard disk devoted to cloning of the often used portions of the CD-ROM disk. Upon completion of this transfer, the processing of block 200 is performed to add the page number of the page copied to the hard disk to the clone area map. This clone area map need not contain any information regarding recency of use since it is an identical copy of a segment of the CD-ROM disk and selective replacement of least recently used blocks with data blocks more recently used does not occur. As such, recency of use data is not necessary in the clone area map.

Figure 6:
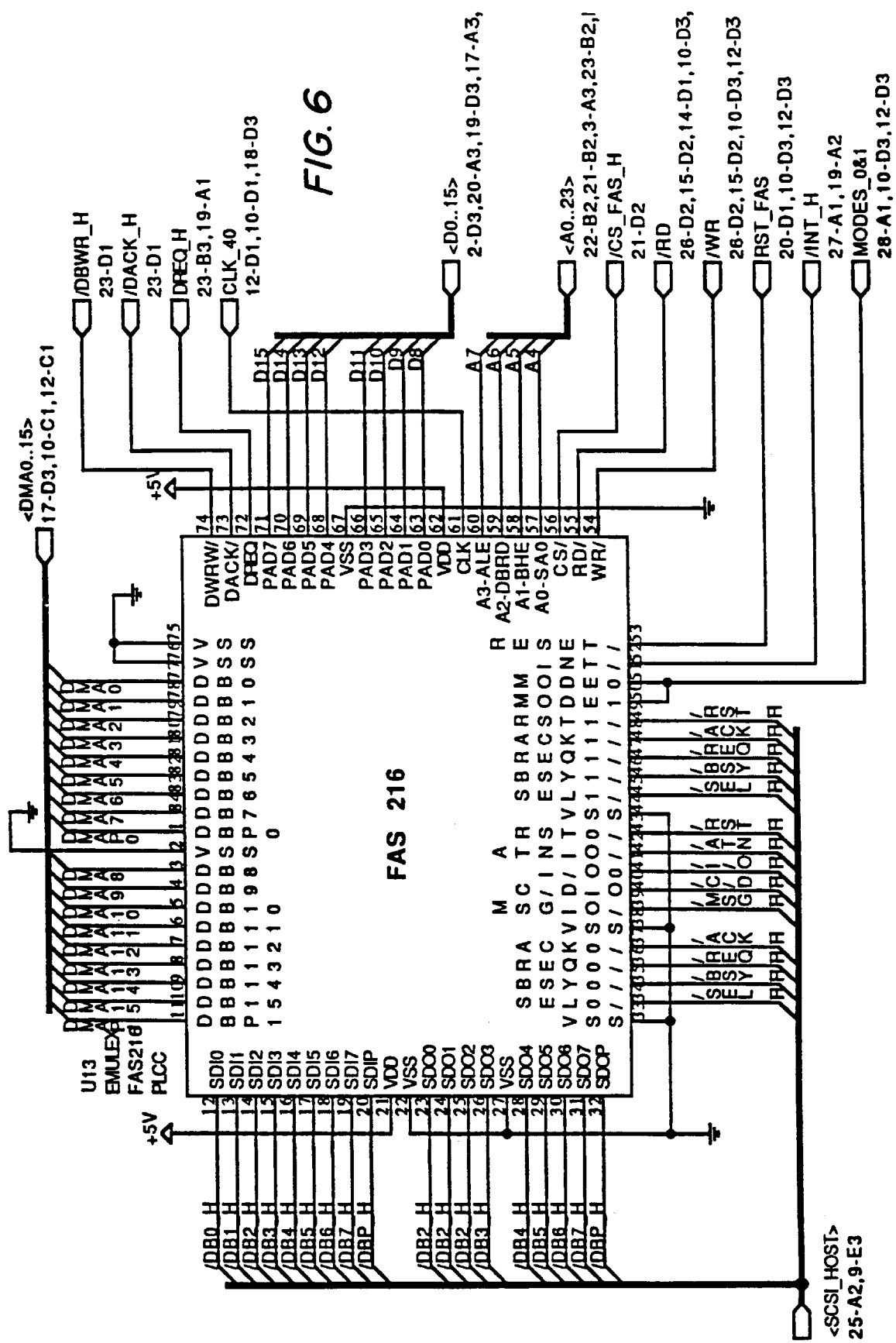
FIGS. 6–27 are the actual schematic diagram of the preferred embodiment.
Figure 7:
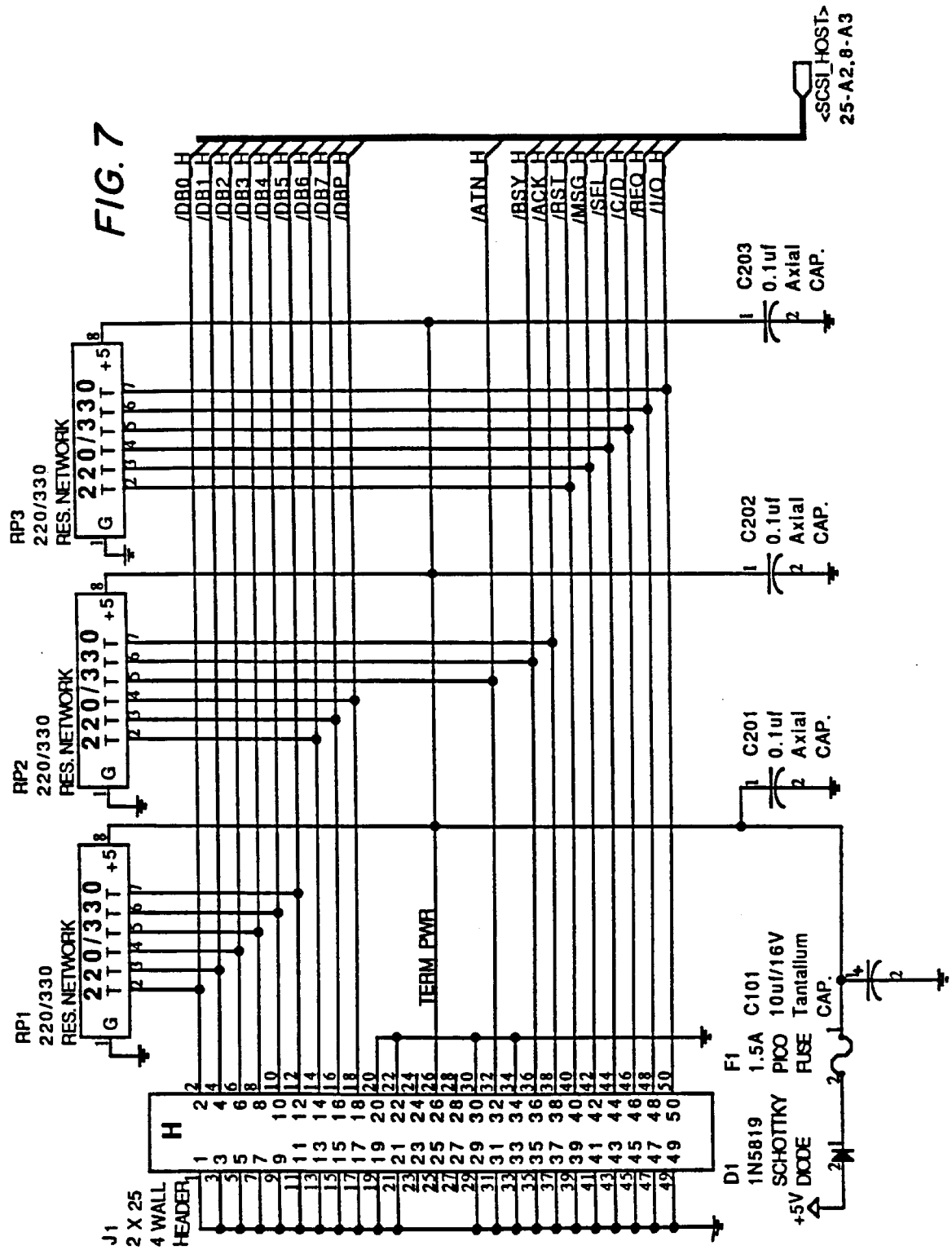
Figure 8:
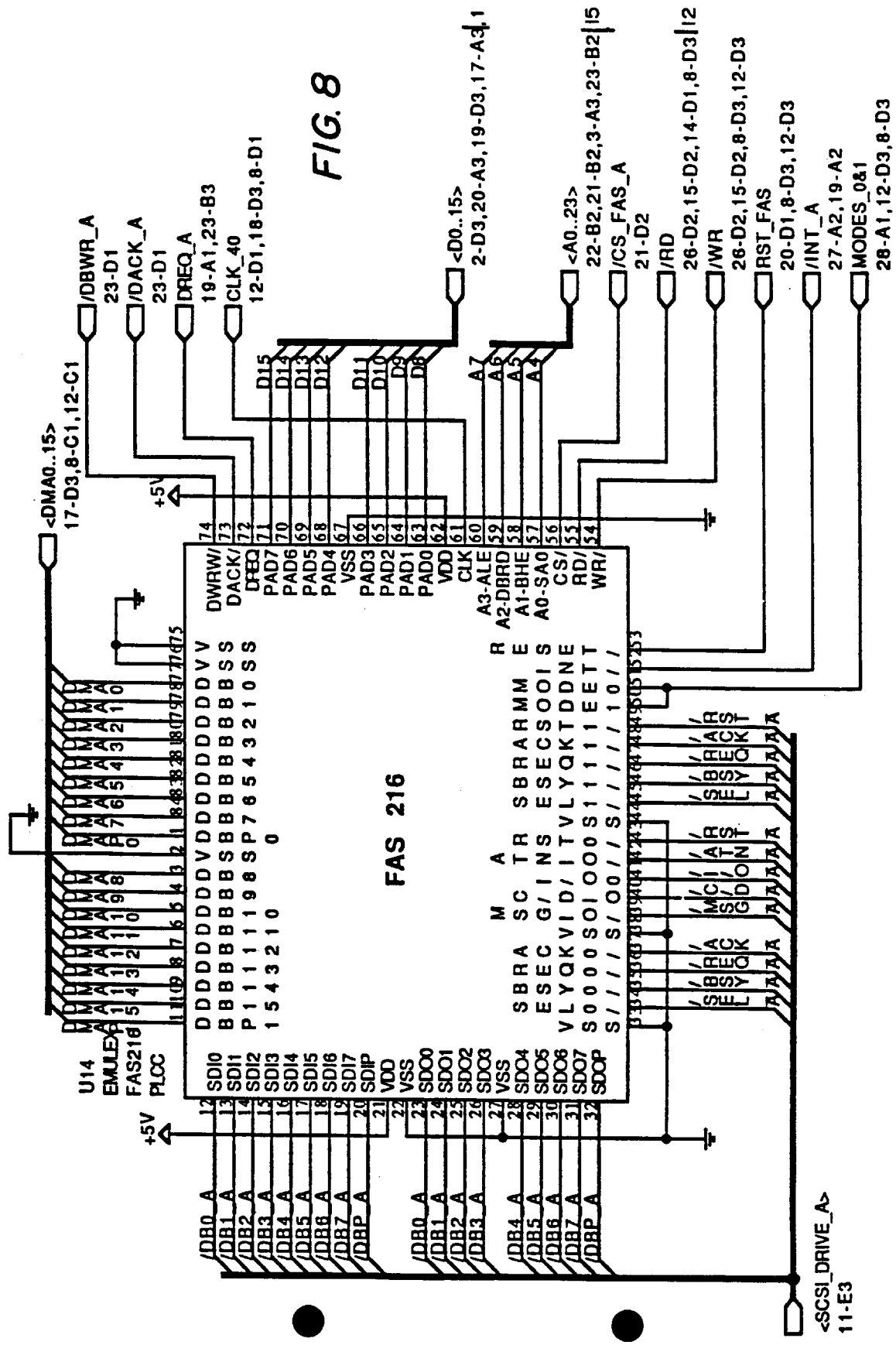
Figure 9:
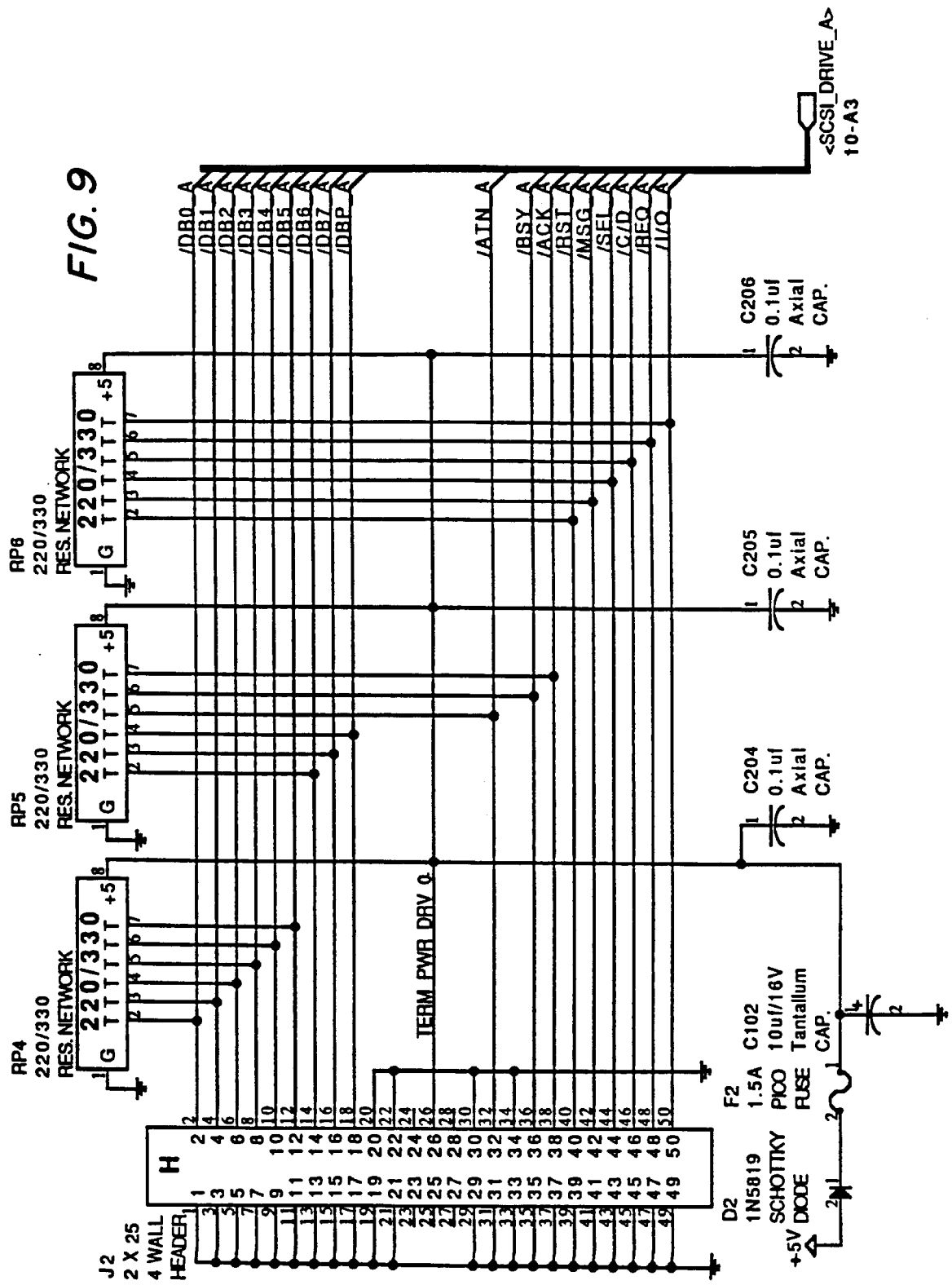
Figure 10:
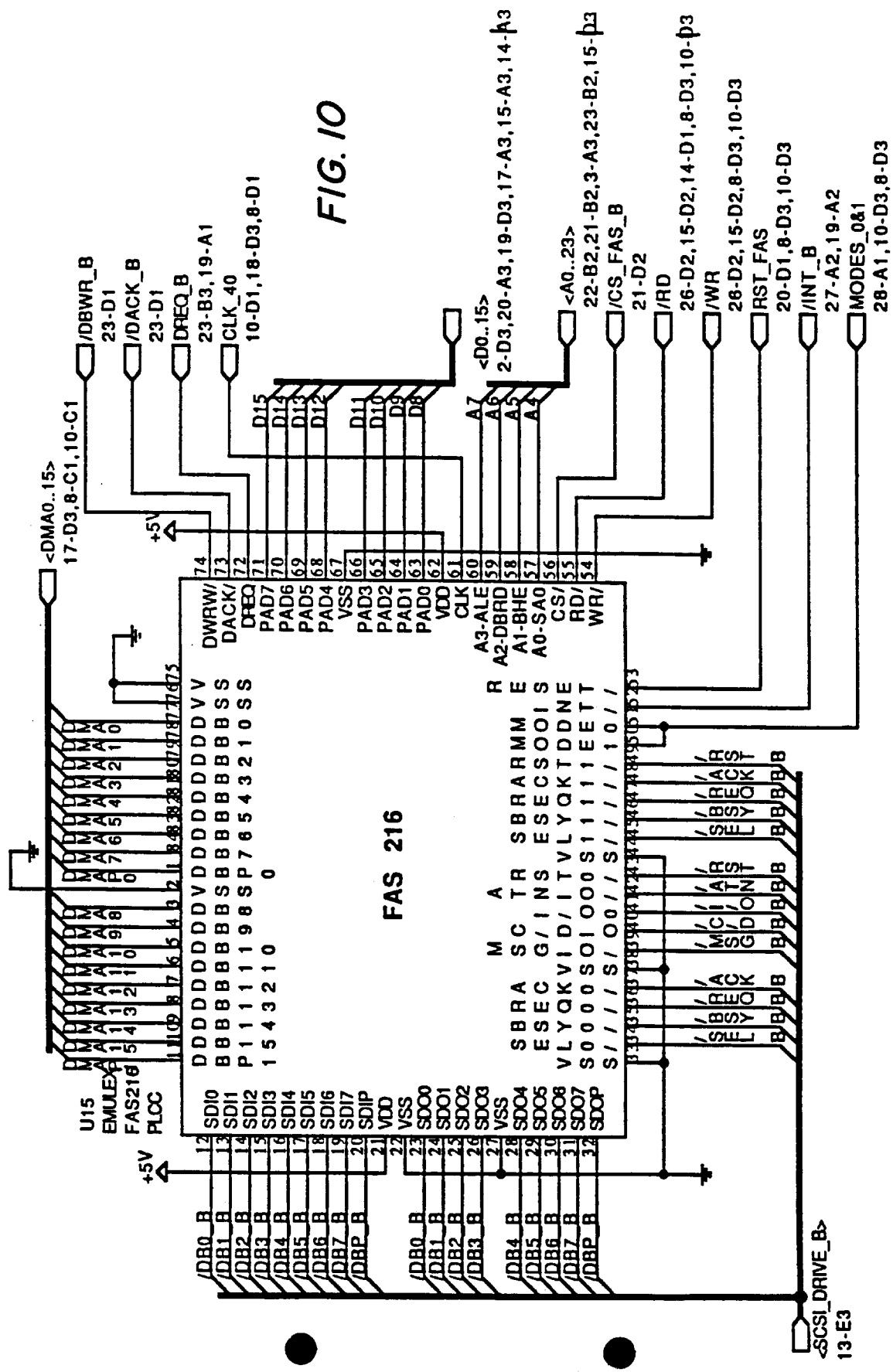
Figure 11:
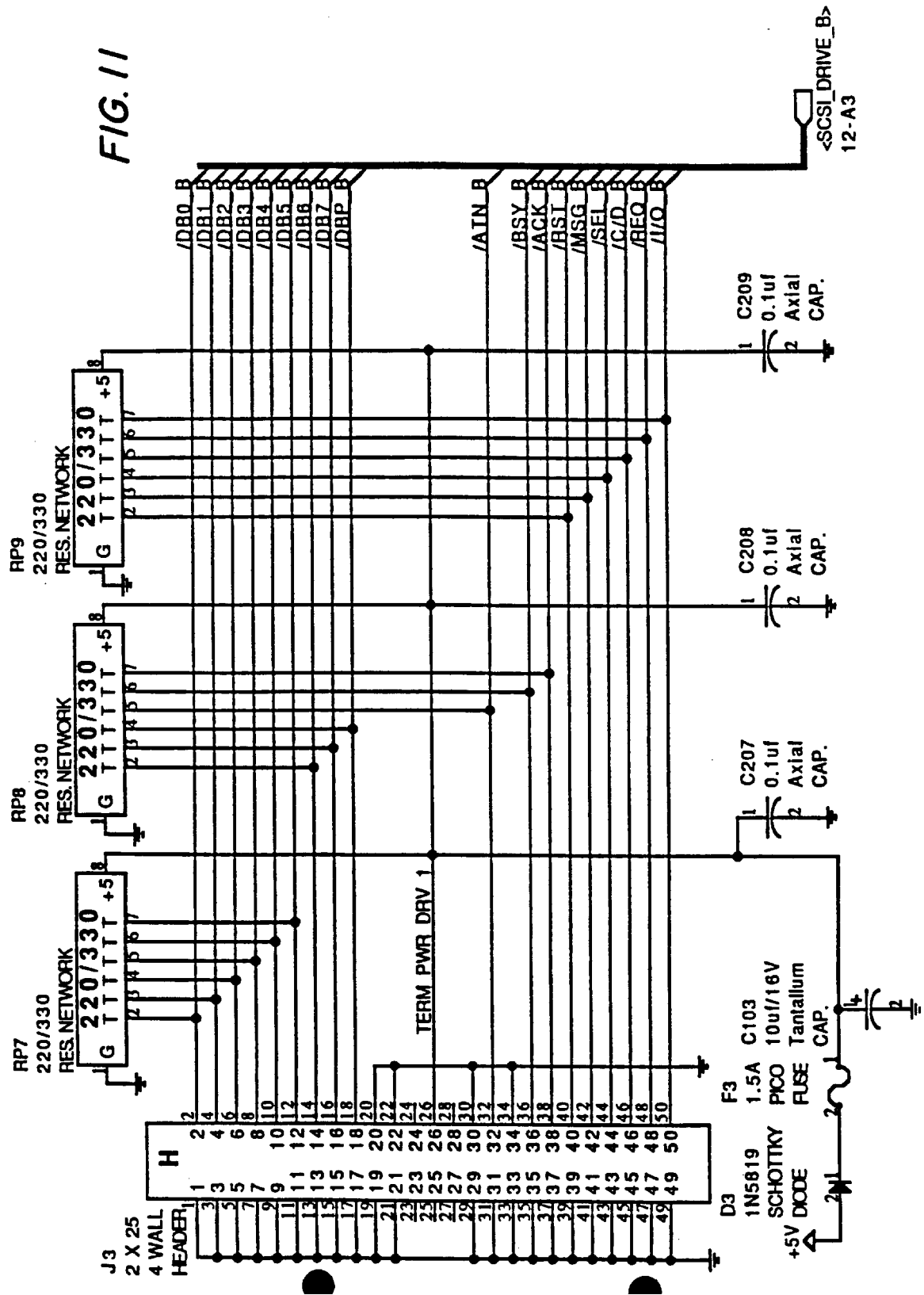
Figure 12:
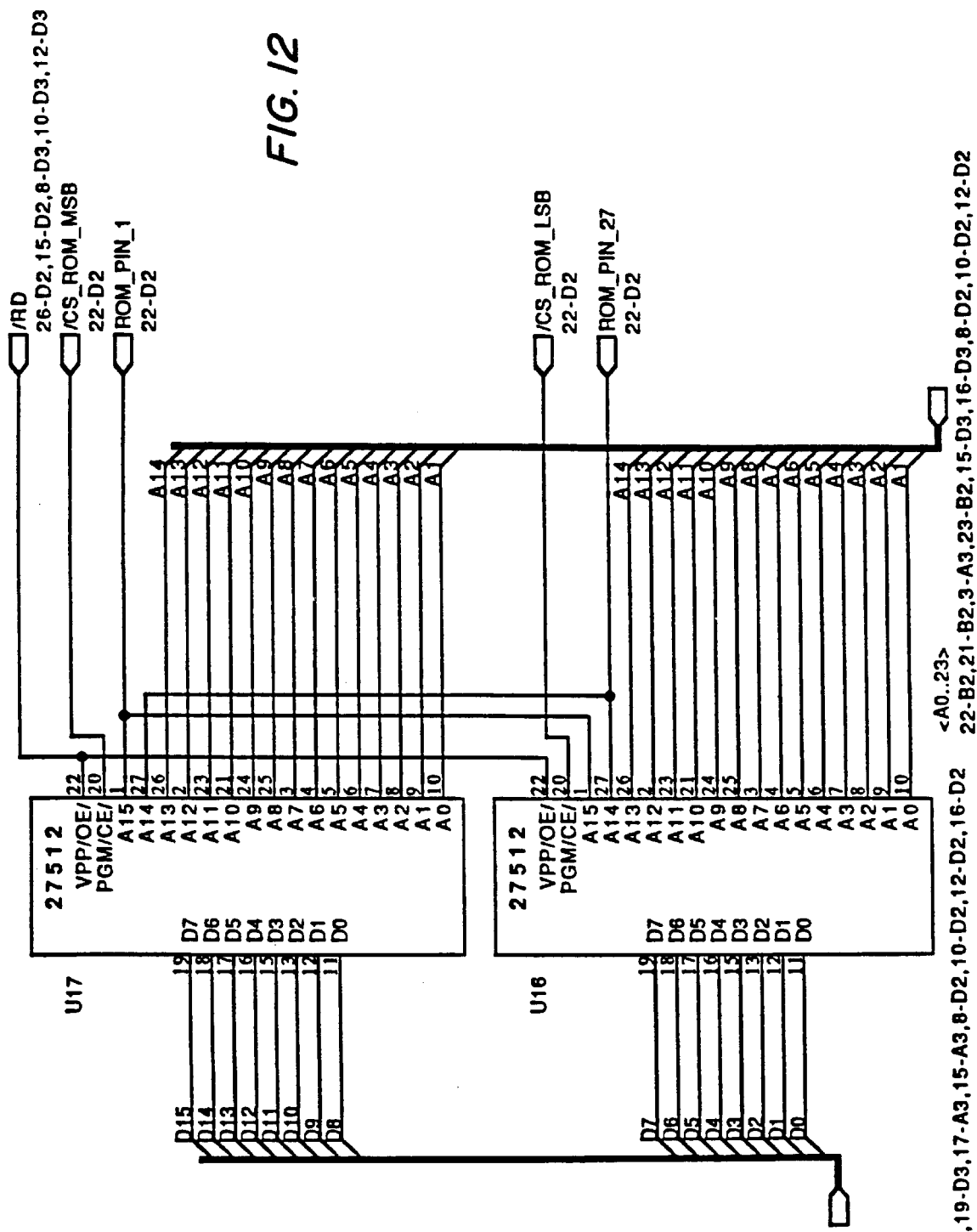
Figure 13:
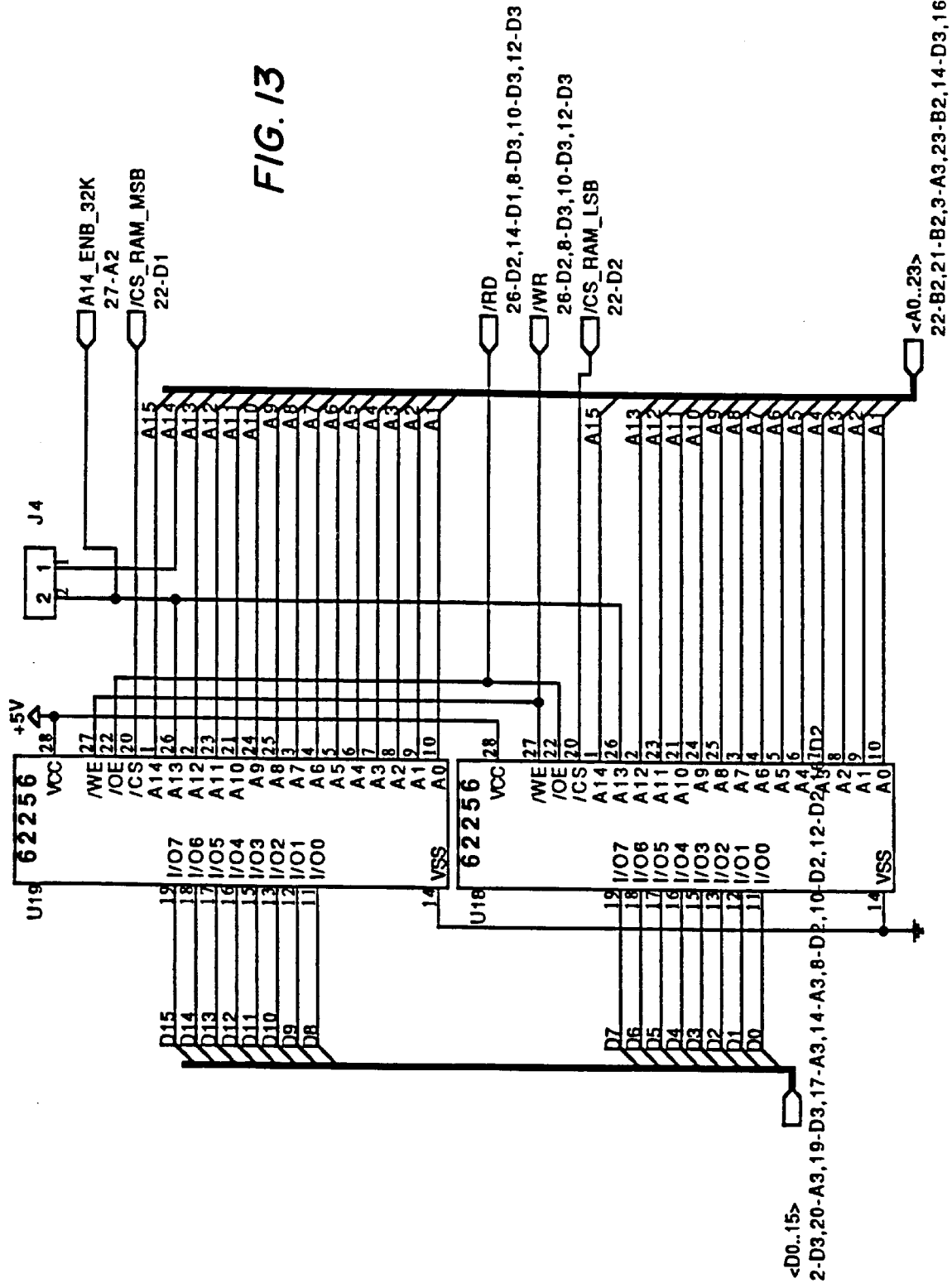
Figure 14:
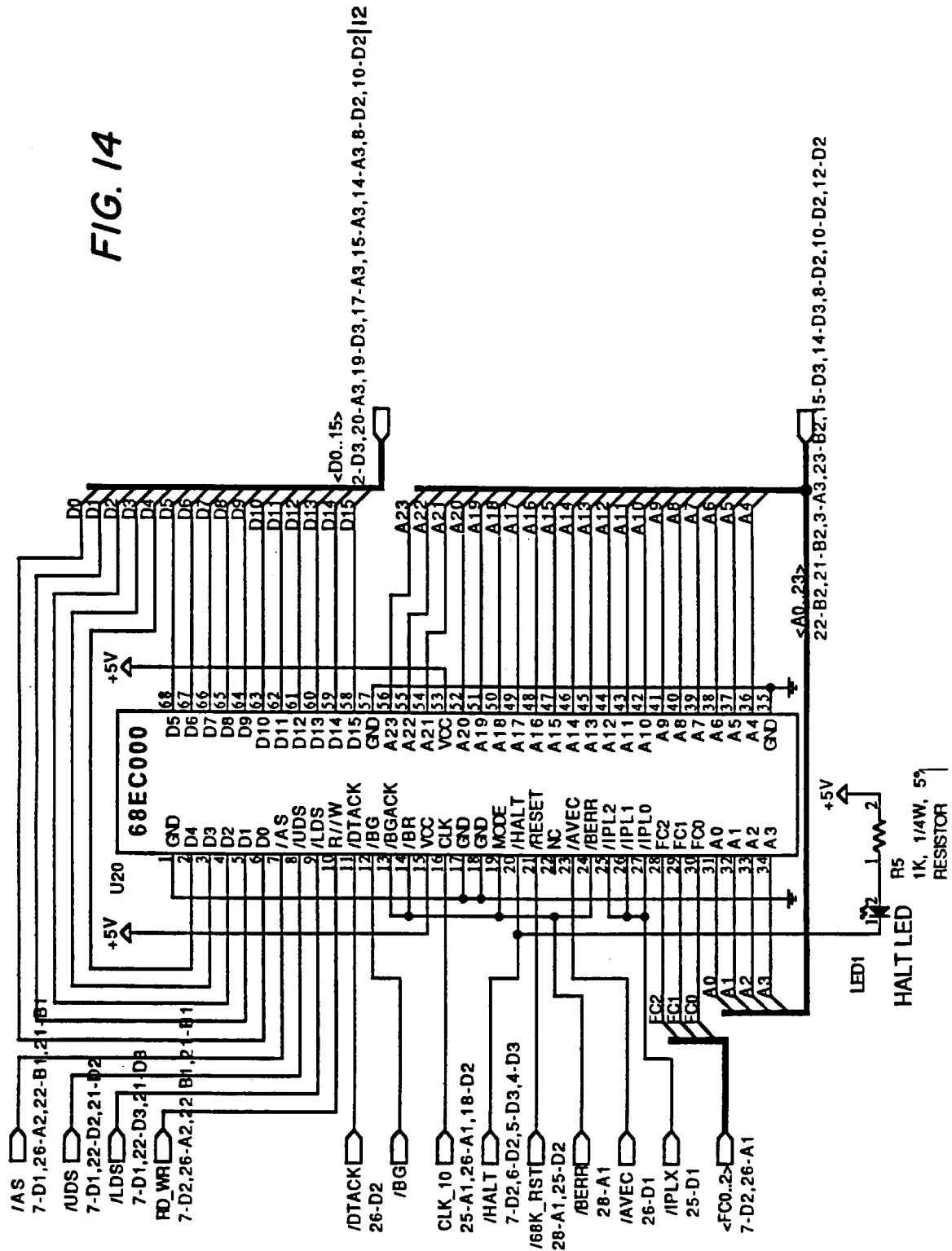
Figure 15:
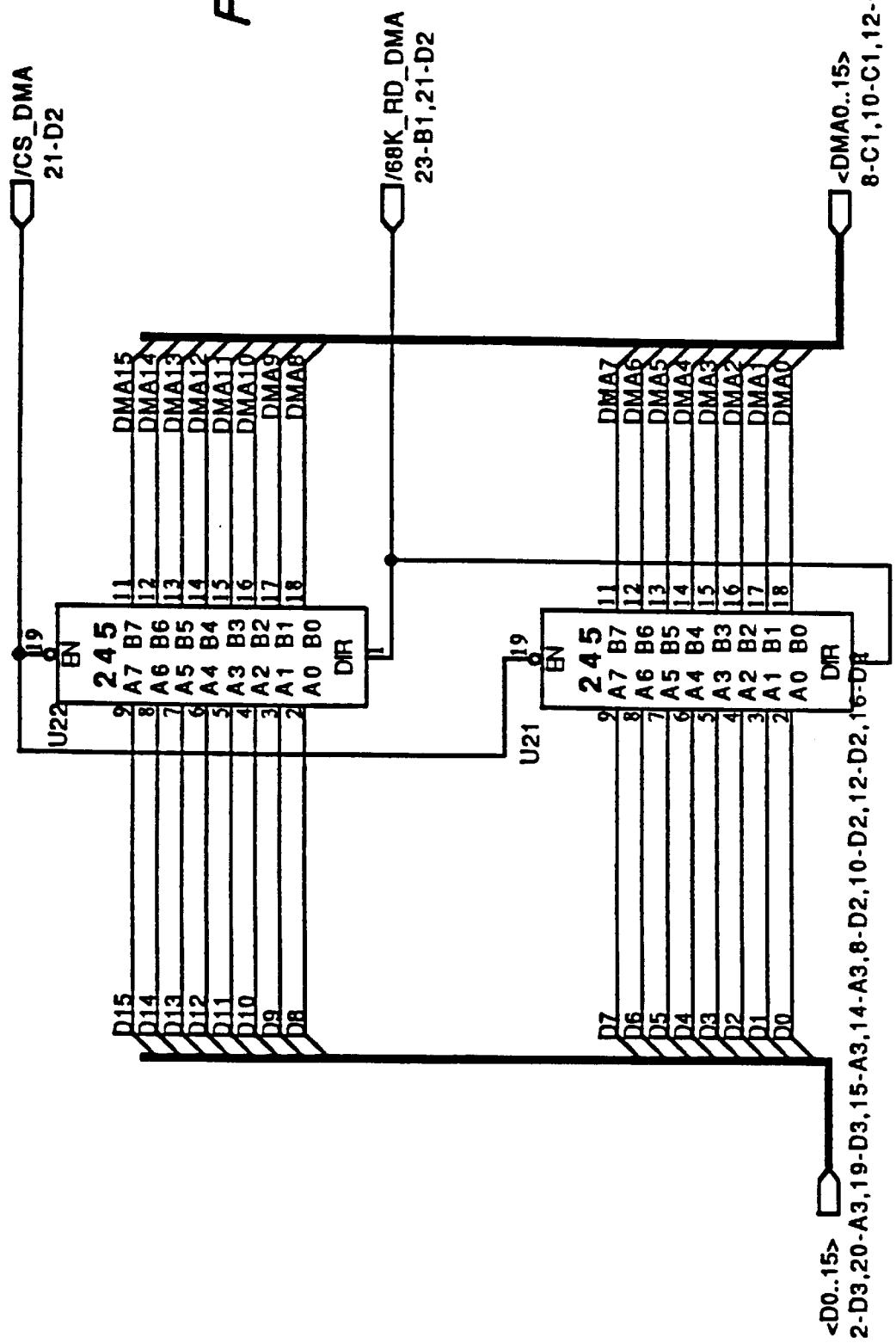
Figure 16:
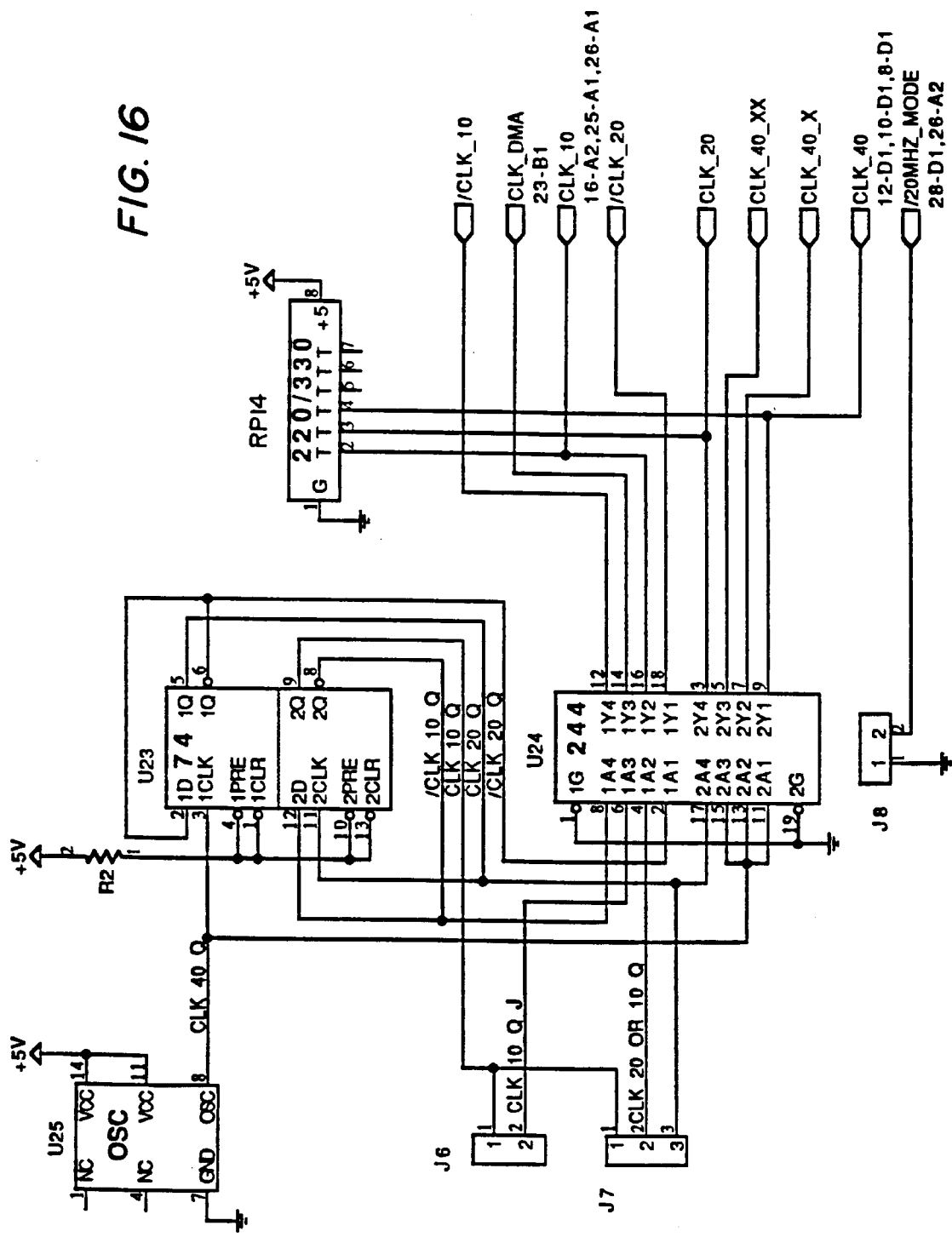
Figure 17:
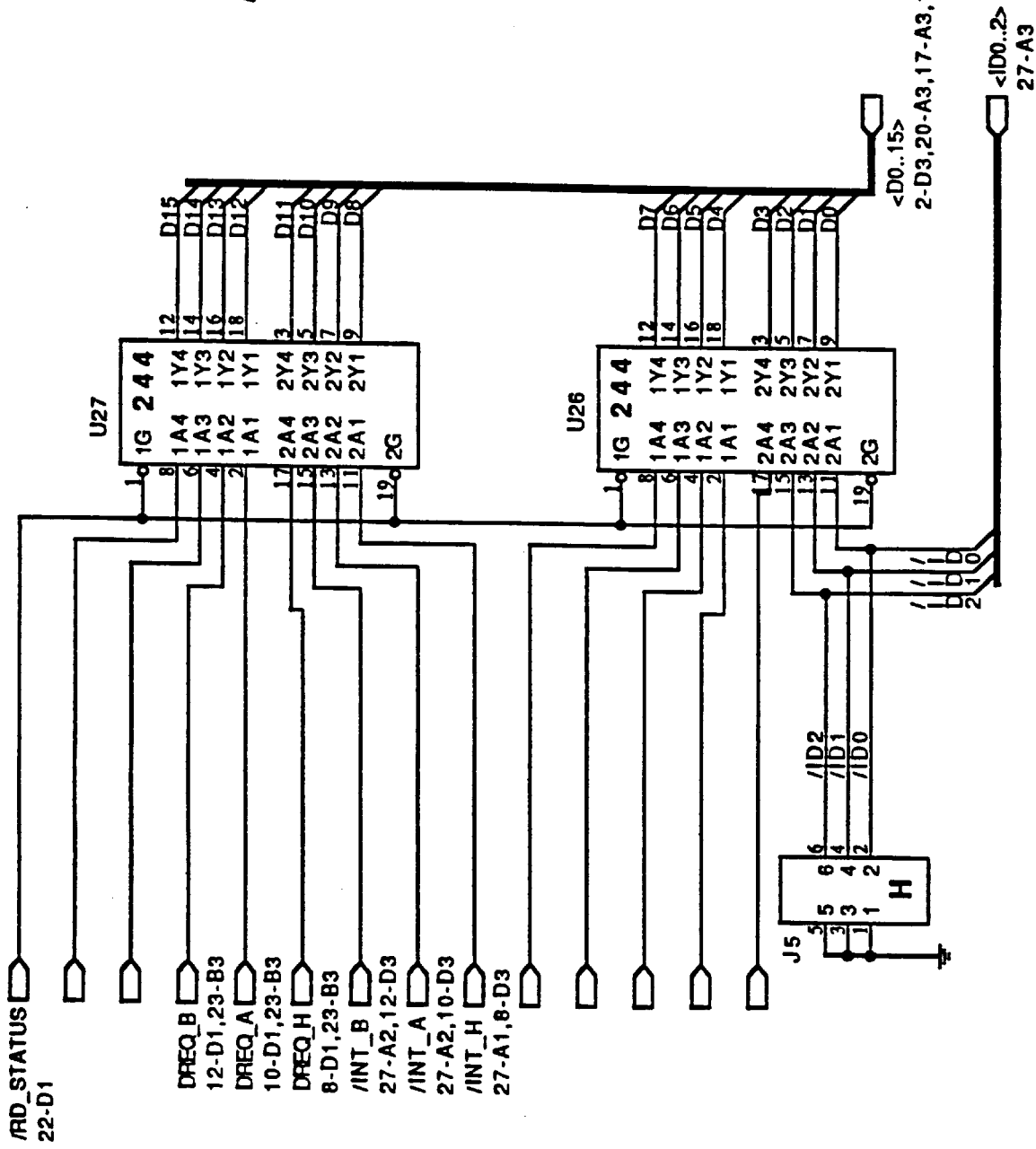
Figure 18:
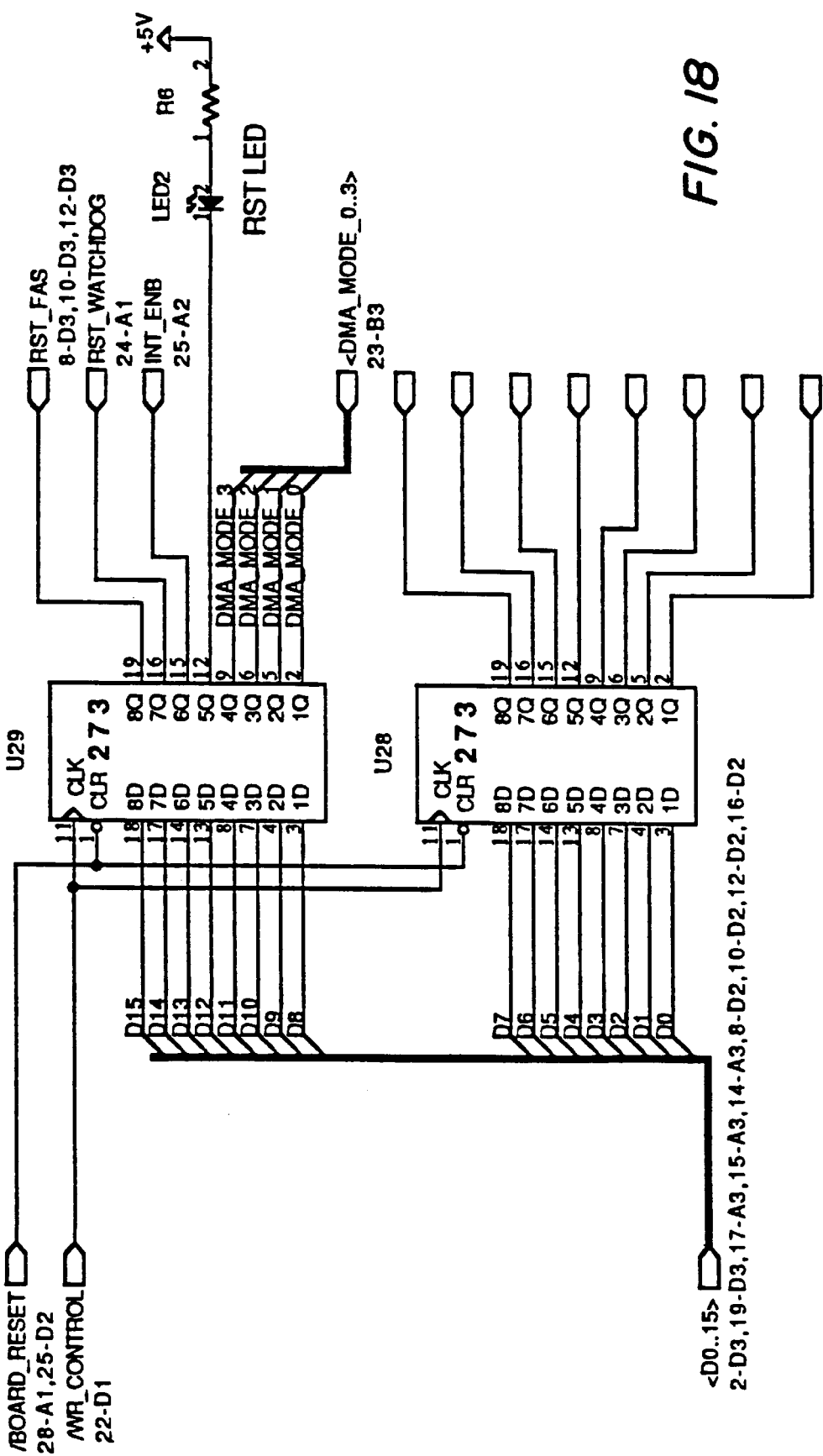
Figure 19:
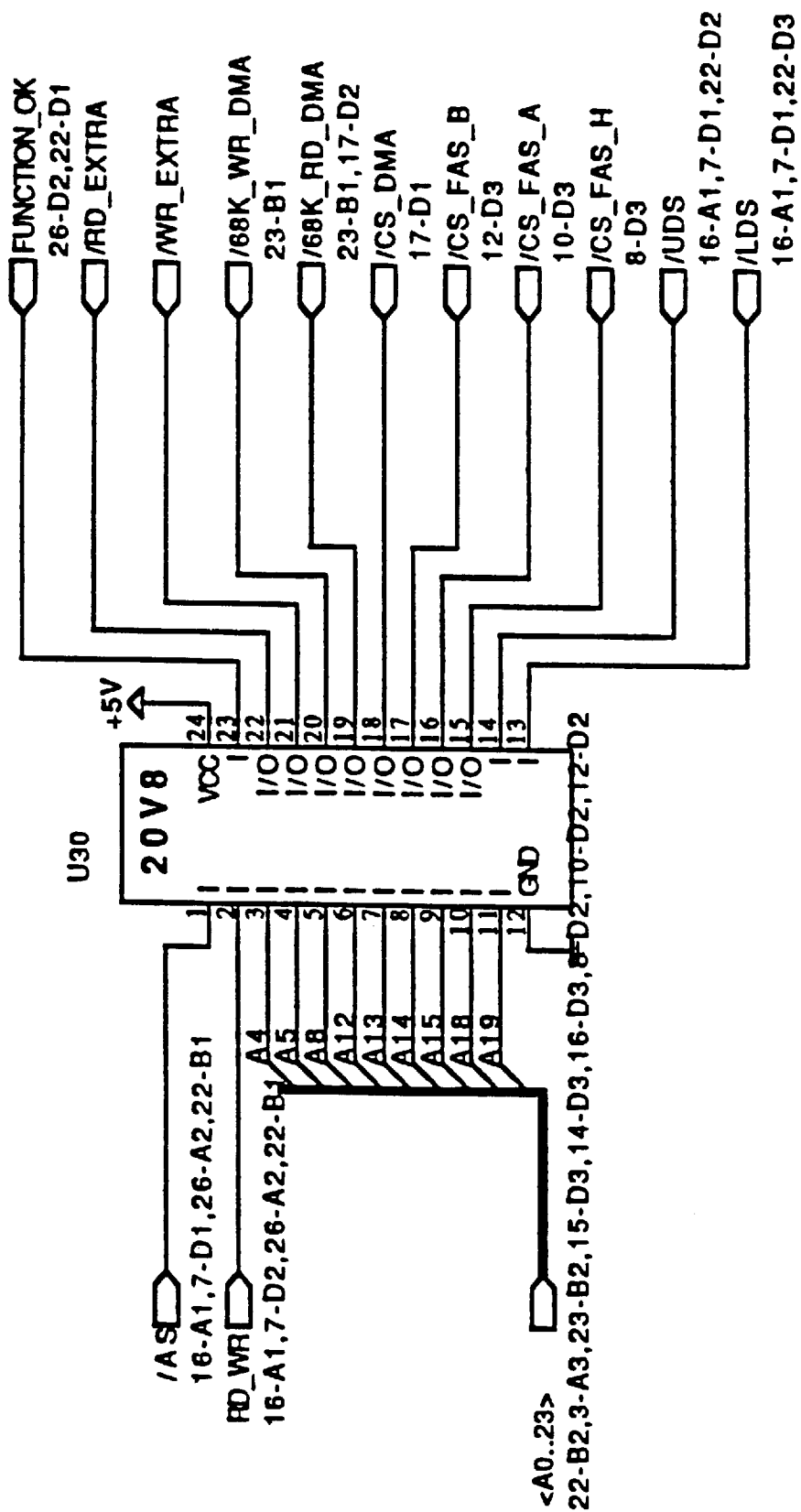
Figure 20:
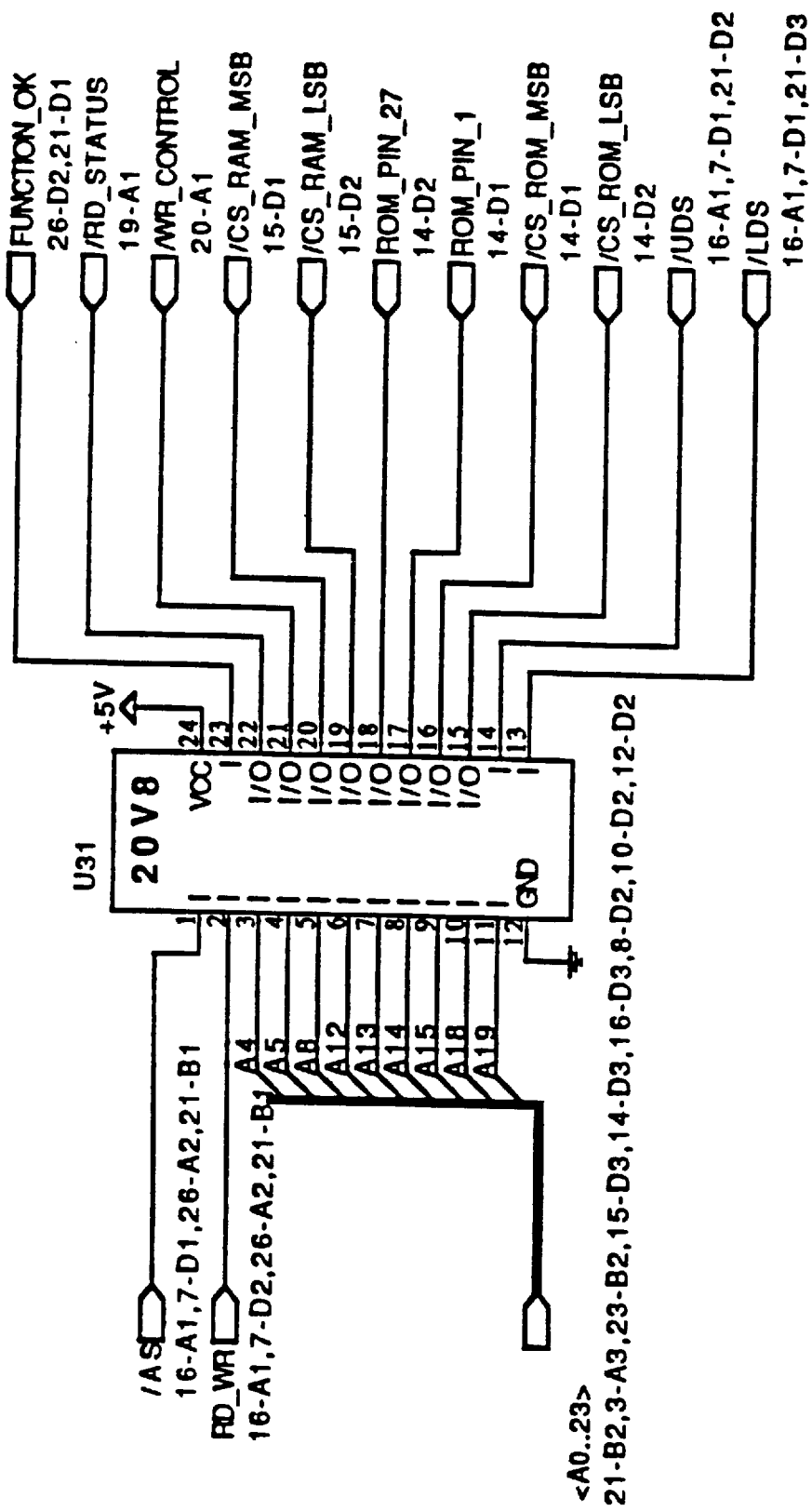
Figure 21:
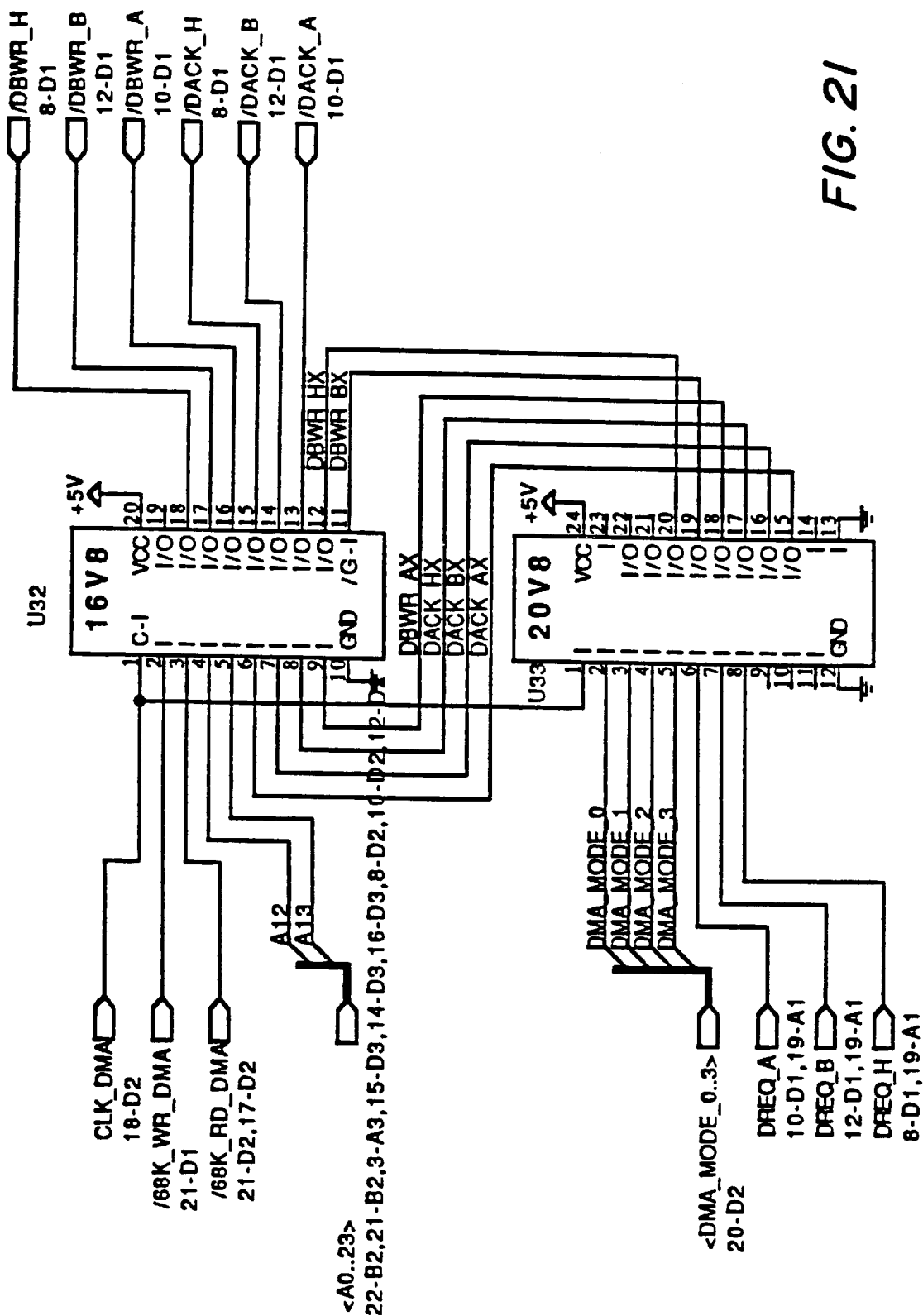
Figure 22:
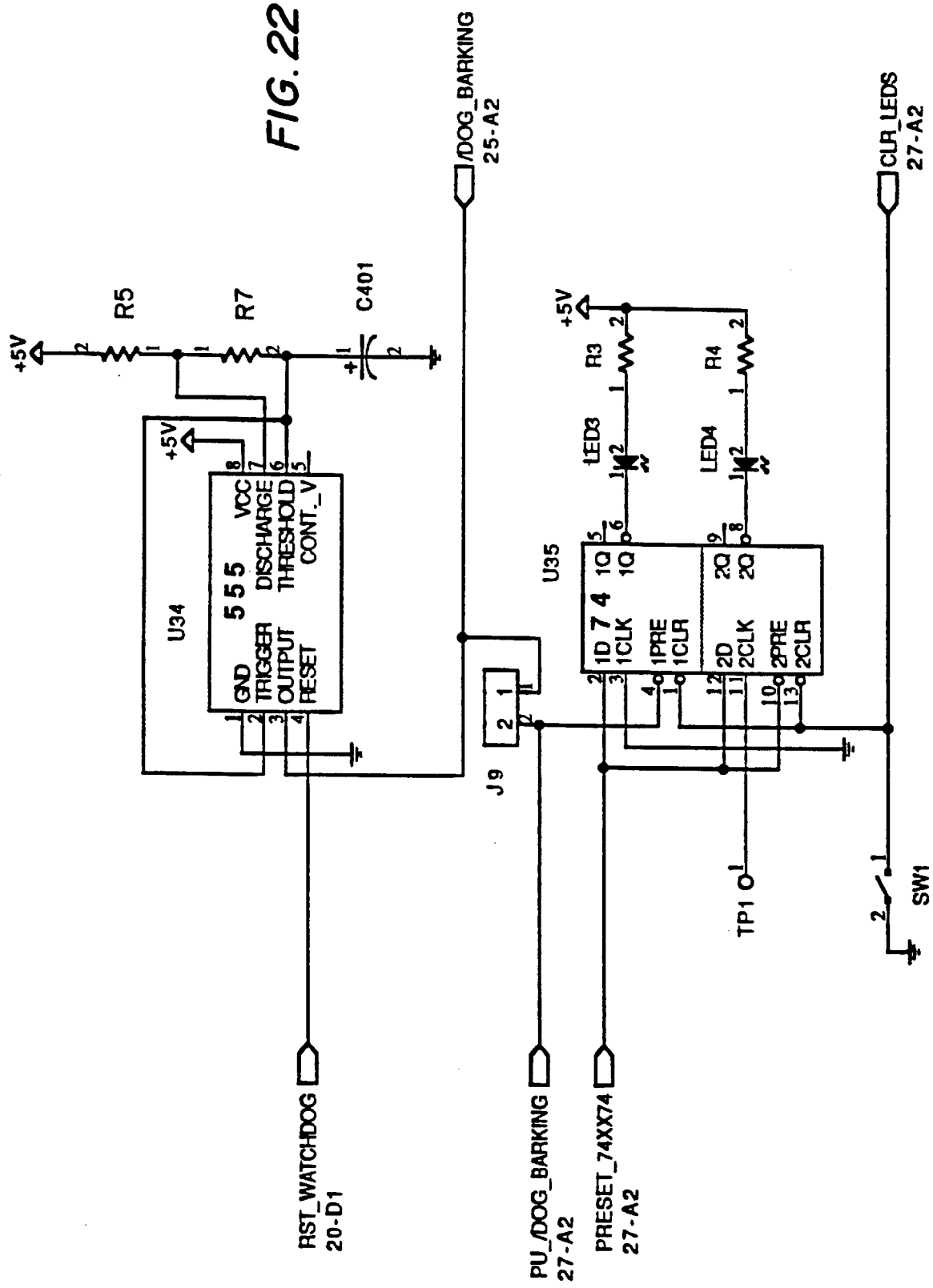
Figure 23:
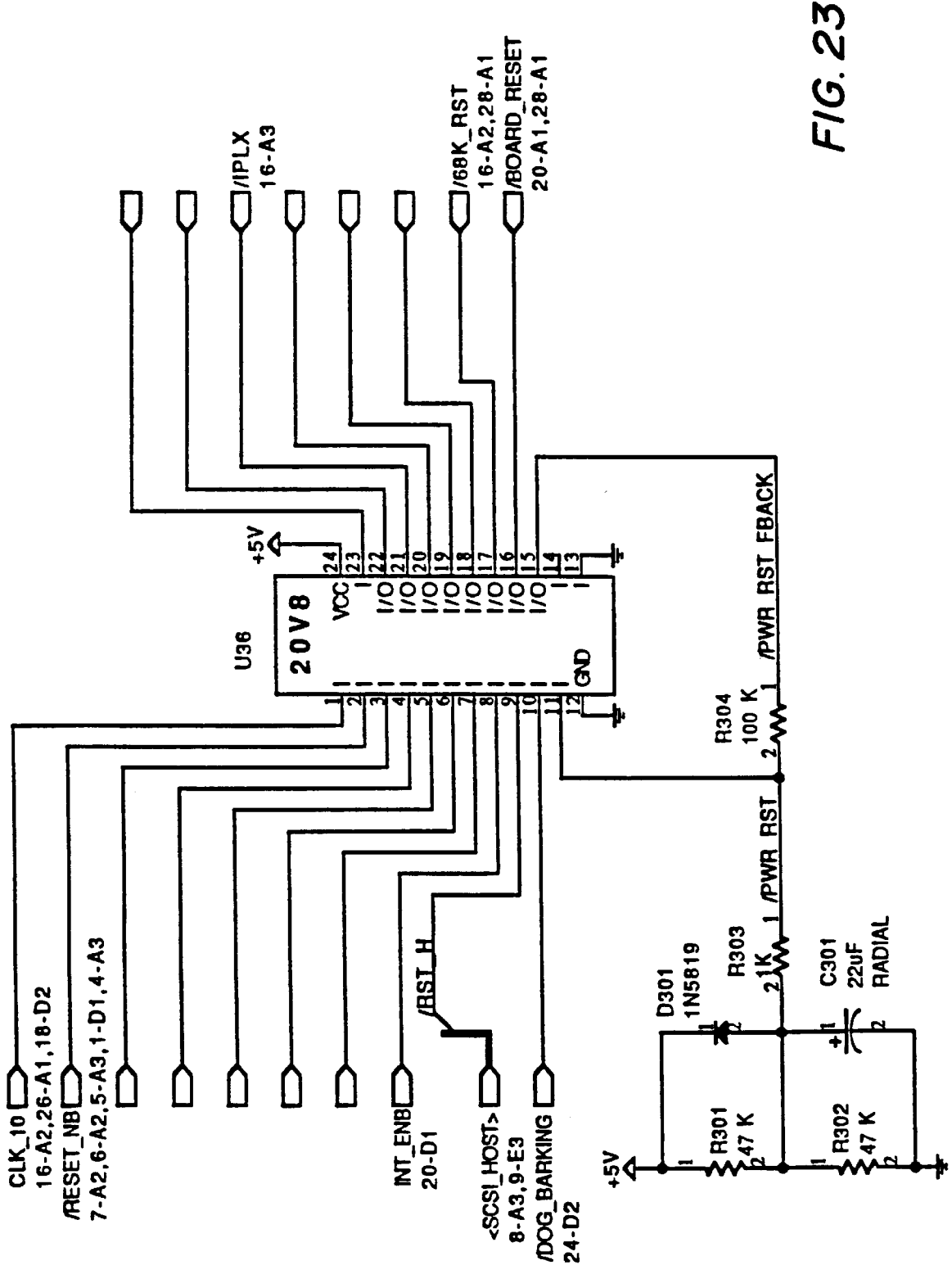
Figure 24:
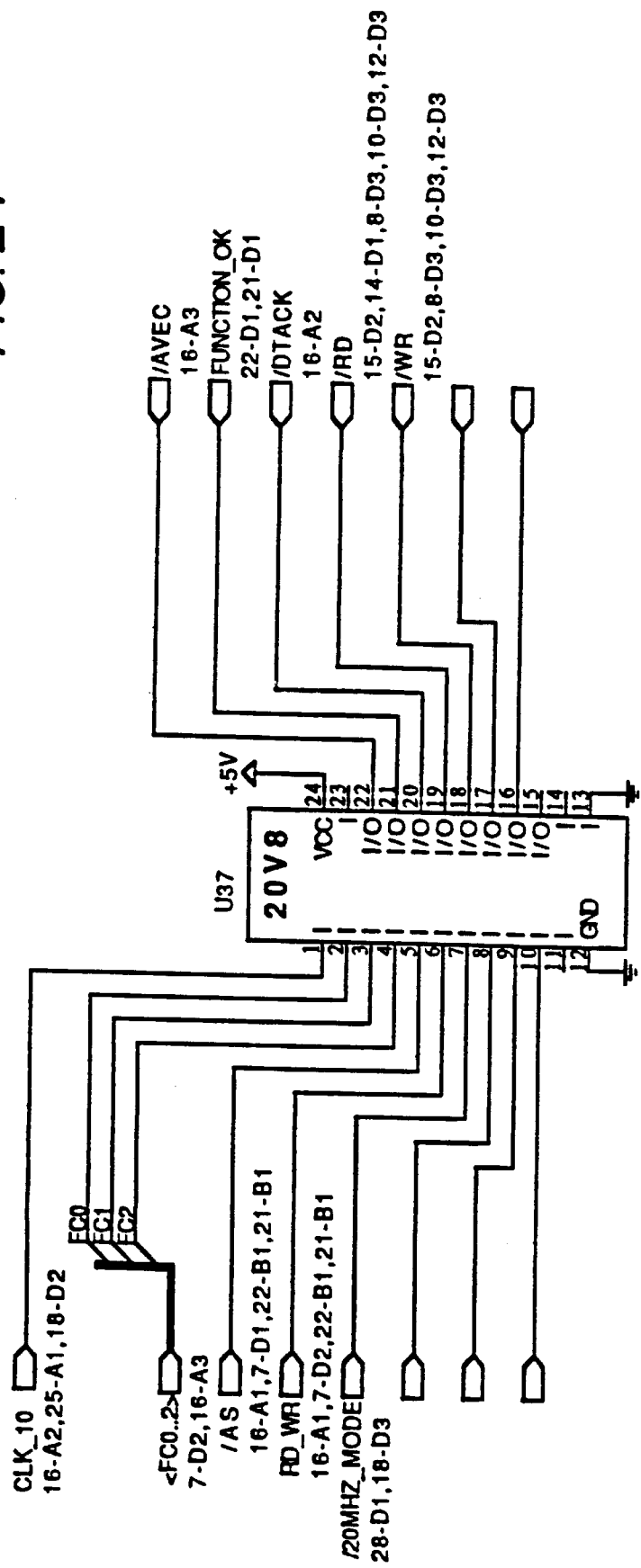
Figure 25:
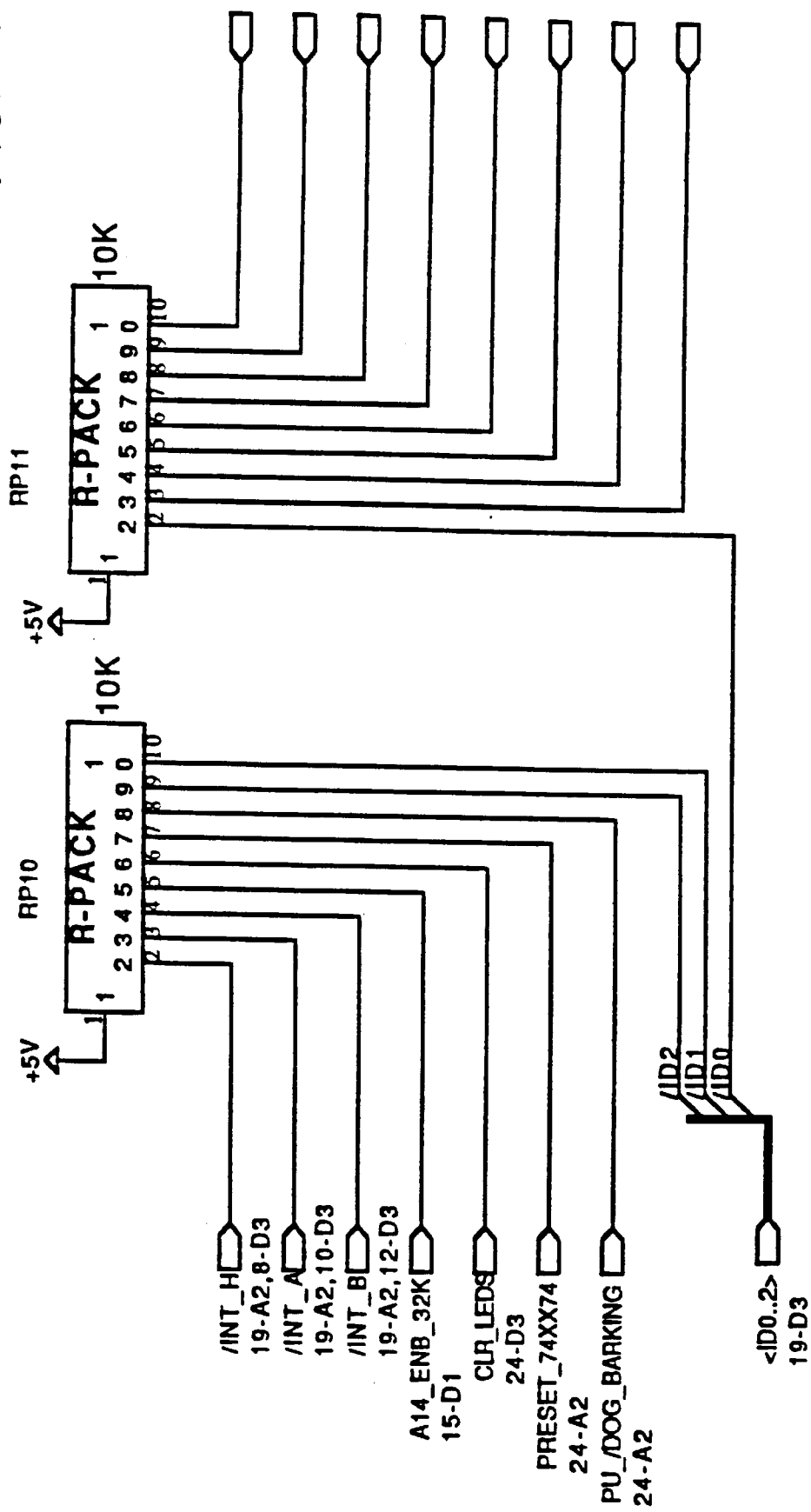
Figure 26:
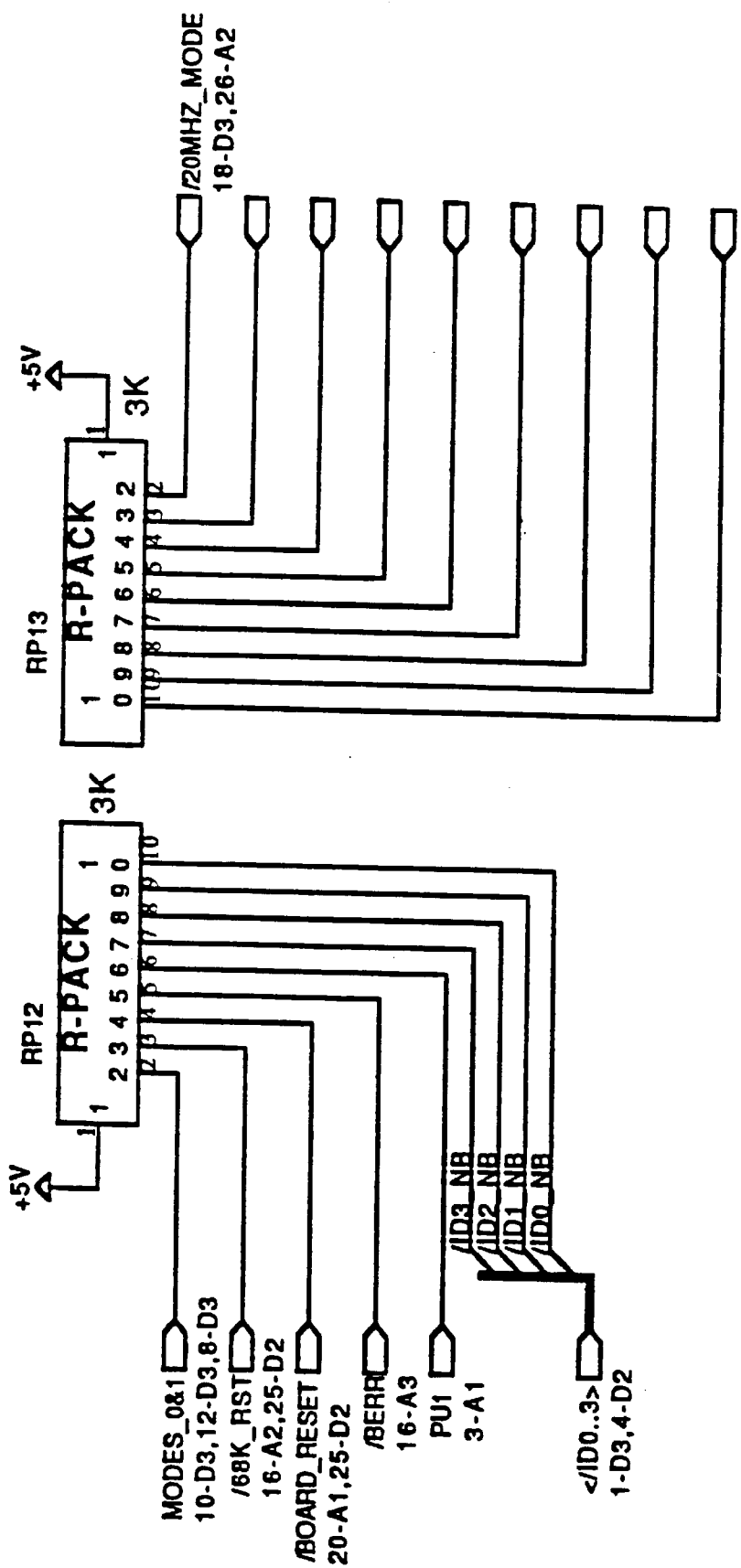
Figure 27:
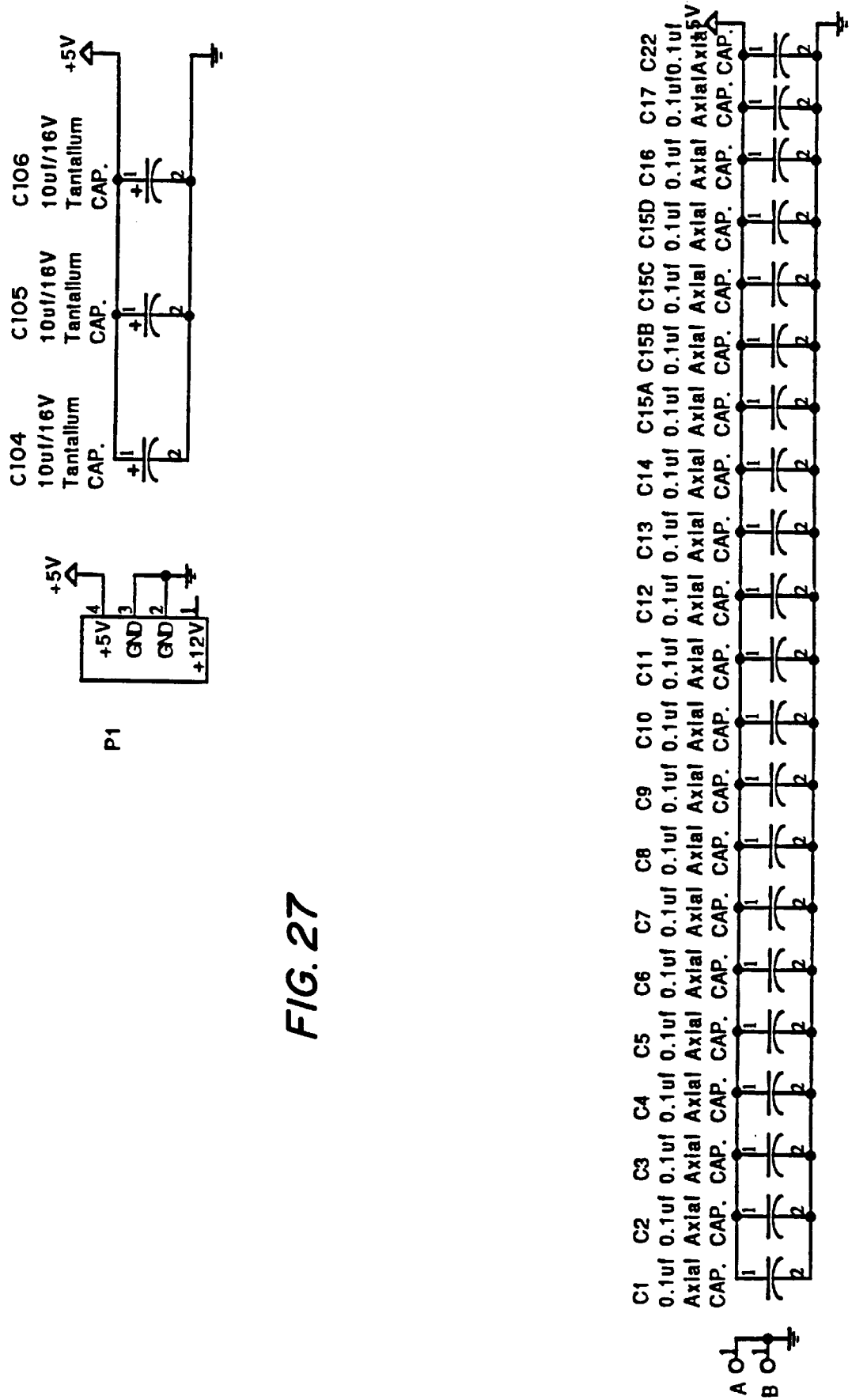

FIGS. 6-xx are actual schematic drawings of the best currently known mode of practicing the hardware of the invention.

Referring jointly to FIGS. 28-1, 28-2, 29-1, 29-2, 30-1 and 30-2, there is shown a flow chart of the preferred embodiment of the cache management process carried out by the cache controller of FIG. 1. FIGS. 28-1 and 28-2 and FIGS. 29A and 29B show the generic striped pattern filling process for initially filling either the clone or cache area. FIGS. 30A and 30B show the pipelined read request fulfillment process.

Figures 1, 28:
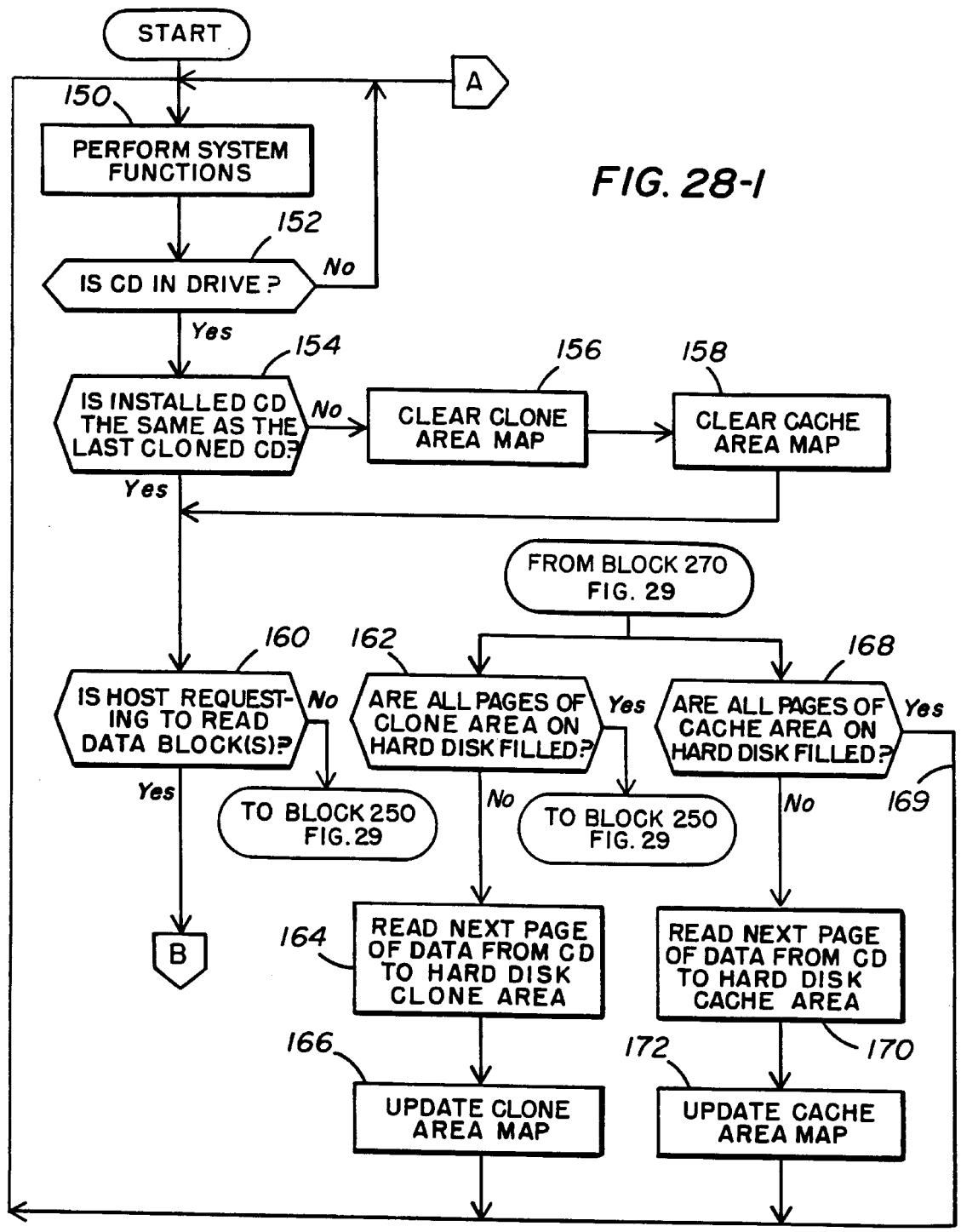
Figures 2, 28:
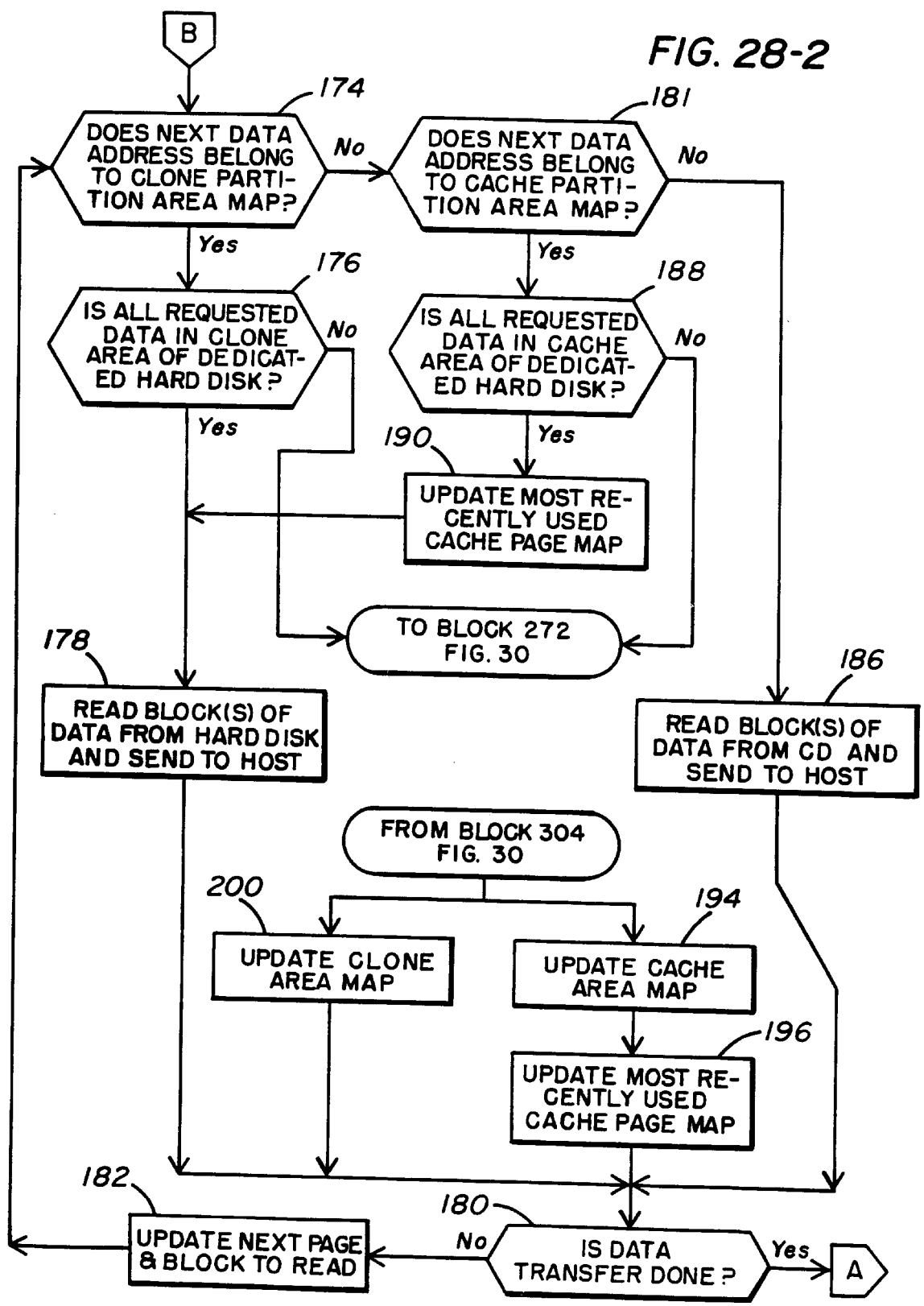

Referring first to FIG. 28-1 and 28-2, the process shown is substantially identical to the process symbolized by FIGS. 5-1 and 5-2, except for the modifications represented by FIGS. 29-1 and 29-2 and FIGS. 30-1 and 30-2. All blocks with identical reference numbers to blocks previously discussed with reference to FIGS. 5-1 and 5-2 serve the same purpose, and the discussions of those blocks is incorporated by reference herein.

The first change of significance in the process of FIG. 28-1 and 28-2 is on the initial cloning process where a frequently used part of the CD-ROM is cloned to the clone area of the dedicated hard disk 22. This occurs when the "no" branch is taken out of the decision of block 160. At that point, processing is transferred to block 250 of FIG. 29A.

Referring to FIG. 29A, in block 250 the process of initially filling the clone or cache area of the dedicated hard disk 22 by a "striped" or interleaved fill process is started. In block 250, the cache controller microprocessor 30 issues a command to the CD-ROM controller 28 to read the first 128 kbyte block of data from the CD-ROM 20 and transfer the data so read by DMA channel 29 in FIG. 1 to the controller 26 for the dedicated hard disk 22 for storage therein. The controller 26 stores the data received from the CD-ROM controller 28 in the blocks on the dedicated hard disk 22 which correspond to the blocks on the CD-ROM 20 from which the data was read.

Figures 2, 29:
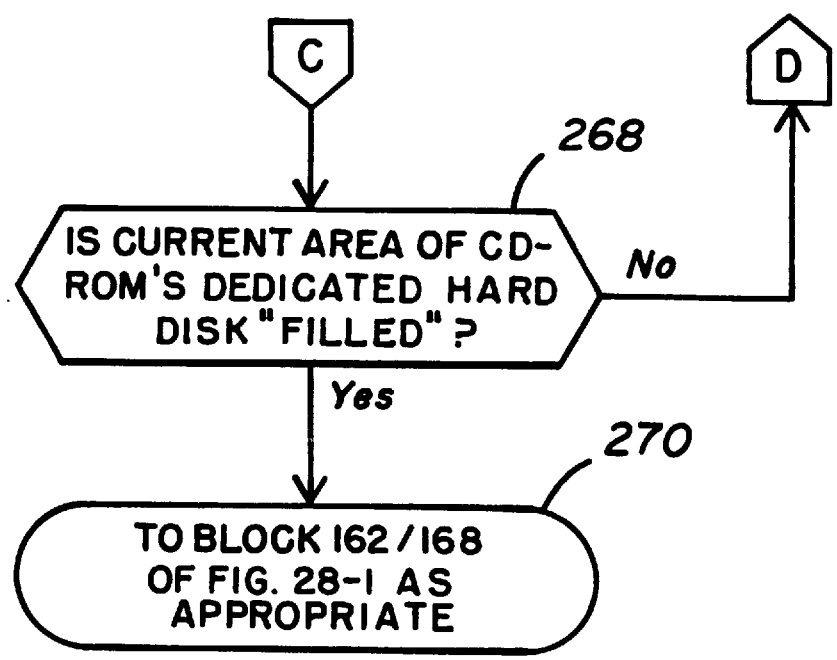

Next, decision 252 is performed wherein it is determined whether the transfer from the CD-ROM to the dedicated hard disk has been completed. If not, the process of block 256 is performed to wait until the transfer is complete. If the transfer has been completed, the process of block 254 is performed to update the appropriate area map. If the process of FIG. 29 is being used to fill the clone area initially, step 254 involves updating the clone area map to add the identification numbers of the blocks that were stored to the dedicated hard disk and the addresses in which they were stored. If the process of FIG. 29 is being used to fill the cache area of the dedicated hard disk initially, step 254 involves updating the cache area map to add the identification numbers of the blocks that were stored to the dedicated hard disk and the addresses in which they were stored as well as updating a least recently used table to indicate these blocks were recently accessed.

After updating the appropriate area map, the decision of block 258 is performed to determine if there are any host read requests pending. If there are, processing is transferred to point B on FIG. 28-2. If there are no pending host read requests, the process of block 260 is performed wherein the cache controller microprocessor 30 sends a command to the CD-ROM controller 28 telling it to skip the next 64 kbytes of data in sequence and then read the following 128 kbytes of data in sequence and transfer this data by the DMA channel to the hard disk controller for writing onto the hard disk. The hard disk controller 26 then writes the blocks of data received from the CD-ROM controller onto the corresponding segments of the clone or cache area of the dedicated hard disk 22.

Next, the process of block 262 is performed to update the appropriate area map. This process is identical to the process described above with reference to block 254.

After updating the map, the decision of block 264 is performed to determine if any there are any pending read requests from the host. If so, processing transfers to point B on FIG. 28-2. If not, the decision of block 268 is performed to determine if the current area of the CD-ROM's dedicated hard disk is "filled". "Filled", as the term is used in the context of the striped filling process means as many stripes of data from the CD-ROM as are possible to fit into the area of the dedicated hard disk devoted to the cache or clone area have been written to the hard disk. This is, of course, taking into account that the blocks of data from the CD-ROM are placed into the corresponding block numbers of the dedicated hard disk, at least upon initial filling.

If the decision of block 268 concludes that the current area being filled is not yet "full", processing returns to block 26, and the commands represented by that block are repeated. If the area being filled has been "filled", then processing transfers to either block 162 or block 168 of FIG. 28-1 as appropriate, as symbolized by block 270. If the process of FIG. 29-1 and 29-2 is being used to fill the clone area, processing transfers to block 162. If the process of FIG. 29-1 and 29-2 is being used to fill the cache area, processing transfers to block 168.

Referring to FIG. 28-1, the next significant change from the process described in reference to FIGS. 5-1 and 5-2 occurs at block 176 and following. In block 176, after a read request has been received from the host and the test of block 174 determines that the next data address in the requested data is in the clone partition map, the decision of block 176 is performed. The decision of block 174 includes only the decision whether or not the requested block(s) lies within the range of blocks that would be included within the range of blocks copied to the dedicated hard disk if all sequential blocks from the cloned area of the CD-ROM were copied to the dedicated hard disk, not taking into account the skipped blocks. The decision of block 176 then determines if all the requested data blocks are on the dedicated hard disk or if some are still on the CD-ROM, having been skipped during the striped filling process. If all the requested blocks are in the clone area of the hard disk, the processing of block 178 is performed to retrieve them and send them to the host. If not all the requested blocks are in the clone area of the hard disk, then processing is transferred to block 272 of FIG. 30-1.

Figure 30:
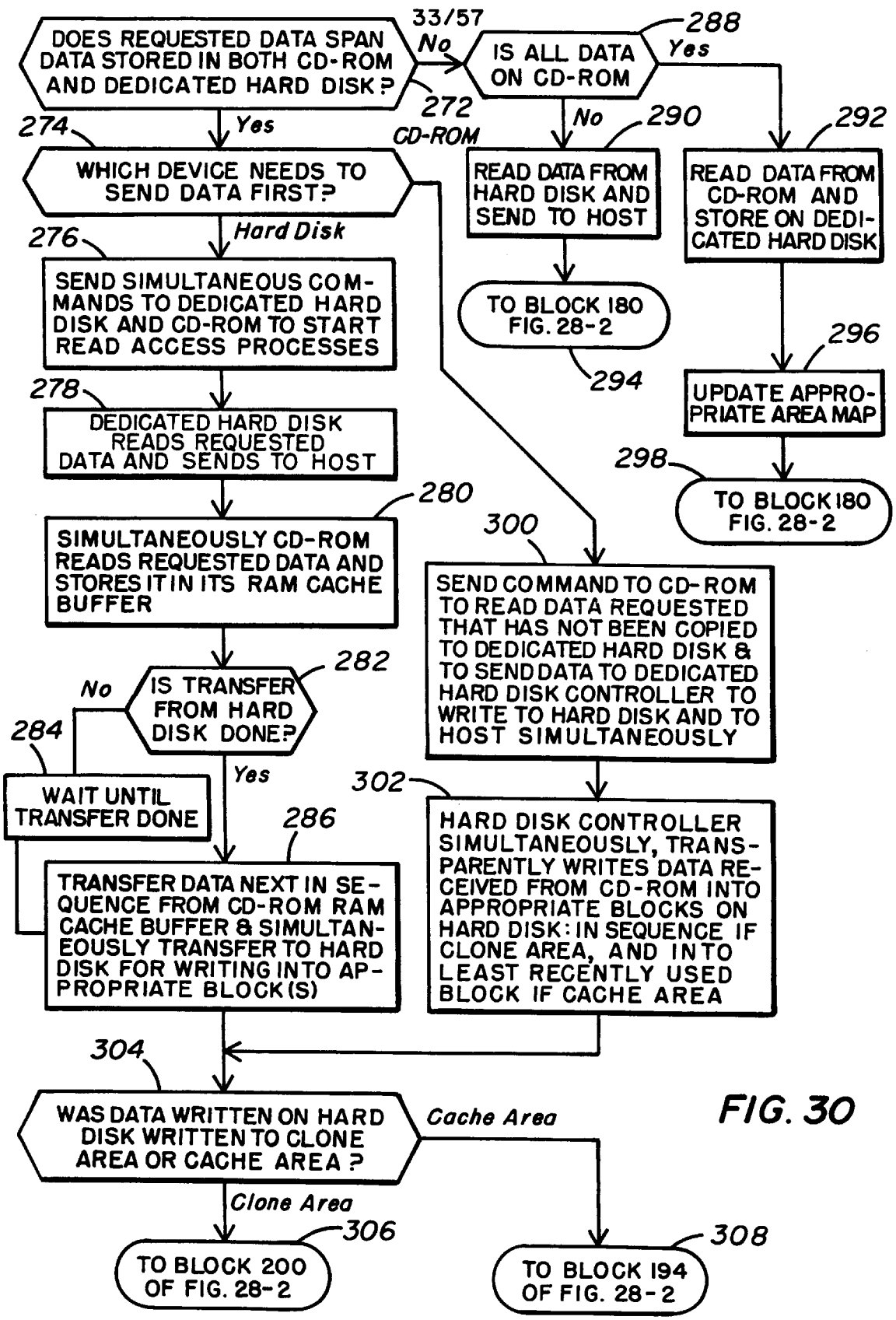
FIG. 30 is a flow chart of the pipelined read request fulfillment process used by the cache controller.

The processing of block 272 of FIG. 30-1 is also reached in another set of circumstances. If the test of block 174 determines that the requested data blocks are not in the clone area map, then the test of block 184 is performed. Test 184 determines if the requested data blocks are within the cache area partition on the dedicated hard disk according the cache area map, but not taking into account the striped fill pattern. In other words, if the requested block(s) are still on the CD-ROM and were never copied to the dedicated hard disk, but are within the range of blocks that would have been copied to the cache had there been no block skipping, then the test of block 188 is performed. Test 188 determines if all the requested blocks of data are in the cache area of the dedicated hard disk. This test determines whether all the requested data block have already been copied to the hard disk. If so, the processing of blocks 190 and 178 is performed to retrieve the data. If not, processing transfers to block 272 of FIG. 30-1.

The processing symbolized by FIG. 30 replaces the processing of blocks 198 and 192 on FIG. 5-2. Referring to FIG. 30, the test of block 272 determines whether the blocks of data requested by the host spans the data stored in both the CD-ROM and the dedicated hard disk taking into account the striped fill pattern. If the requested data blocks do span, i.e., the request includes some blocks of data stored only on the CD-ROM as well as some blocks of data stored both on the CD-ROM and the dedicated hard disk, the test of block 274 is performed to determine which device, the CD-ROM or the dedicated hard disk, needs to be accessed first to send the first requested blocks of data to the host. If the hard disk needs to be accessed first, block 276 is performed wherein the cache controller sends simultaneous commands to the controller 26 for the dedicated hard disk and the controller 28 for the CD-ROM telling them to simultaneously start their seek movements for the read access process and passing to each controller the identities of the requested blocks. Next, block 278 is performed wherein the dedicated hard disk 22 supplies the first requested blocks to controller 26 when sends them by DMA channel 29 and 36 to the controller 24, and from there to the host computer 10.

Block 280 represents the simultaneous process carried out by the CD-ROM 20 and its controller 28 of accessing the next requested blocks in the read request which are not stored on the dedicated hard disk 22. This process happens while the dedicated hard disk is accessing the first requested blocks that are stored thereon. After the CD-ROM accesses the next requested blocks, they are automatically stored in the CD-ROM's RAM cache. Almost all CD-ROM drives today have onboard RAM caches to speed up their performance. Typically, these RAM caches are 64 kbytes in capacity. For maximum efficiency, the amount of data in each skipped stripe during the initial striped filling process is equal to the capacity of the onboard RAM cache.

After the process of block 280 is performed, the test of block 282 is performed to determine if the transfer from the dedicated hard disk to the host is complete. If not, the process of block 284 is performed to wait until the transfer is complete. After the transfer from the dedicated hard disk to the host of the first requested blocks is complete, the process of block 286 is performed. This process represents issuance by the cache controller microprocessor 30 of instructions to transfer data next in sequence in the requested data blocks from the CD-ROM onboard RAM cache buffer to the host and to simultaneously transfer the same data to the controller 26 of the dedicated hard disk. The controller 26 then writes the data received from the CD-ROM controller into the appropriate blocks on the hard disk. That is, if the blocks came from the portion of the CD-ROM that is being cloned, the blocks of data are written onto the hard disk in corresponding block numbers so that they appear in the same sequence relative to other data on the hard disk that they appear in on the CD-ROM.

After the processing of block 286 is performed, the test of block 304 is performed to determine if the data written onto the dedicated hard disk was written into the clone area or the cache area. If the data written onto the hard disk was written into the clone area of the hard disk, processing is vectored to block 200 on FIG. 28-2, as symbolized by block 306, and the clone area map is updated with the identities of the blocks that were written to the hard disk. If the data written onto the hard disk was written into the cache area of the hard disk, processing is vectored to block 194 of FIG. 28-2.

Returning to the consideration of test 274, if the test determines that the CD-ROM is the first device that needs to supply data to the host, the processing of block 300 is performed. This process involves the cache controller sending a command to the CD-ROM controller 28 to read the requested data blocks that have not been copied to the dedicated hard disk and to send that data simultaneously to the host as well as the controller of the dedicated hard disk for writing into the appropriate area. Next, the process of block 302 is performed wherein the dedicated hard disk controller simultaneously, transparently (without knowledge of the host or requiring any assistance from the host) writes the data received from the CD-ROM into the appropriate blocks on the hard disk. The appropriate blocks will be, for a write operation into the clone area of the hard disk, to the blocks on the dedicated hard disk which are in the same sequence relative to the neighboring blocks of data as appeared on the CD-ROM. The appropriate blocks for a write operation into the cache area of the dedicated hard disk will be the number of blocks needed formerly occupied by the least recently used blocks as determined from the least recently used table.

Next, test 304 is performed to determine if the data written onto the dedicated hard disk 22 was written into the clone area or the cache area. If written onto the clone area, processing transfers to block 200 of FIG. 28-2 to update the clone area map. If written onto the cache area, processing is transferred to block 194 of FIG. 28-2.

Returning to the consideration of test 272, if test 272 determines that the requested data does not span data blocks that are stored both on the CD-ROM and the dedicated hard disk as well as data blocks stored only on the CD-ROM, then test 288 is performed. Test 288 determines if all the requested data blocks are stored only on the CD-ROM. If so, then block 292 is performed to read the requested data blocks from the CD-ROM and to simultaneously send them to the dedicated hard disk for storage into the appropriate blocks on the dedicated hard disk. Then block 296 is performed to update the appropriate area map. If the data is written into the clone area of the dedicated hard disk, the clone area map is amended to add the blocks that were written onto the dedicated hard disk and their addresses thereon. If the data was written into the cache area, the cache area map is similarly updated, and the least recently used map is updated to indicate these blocks as the most recently used. Processing is then vectored to block 180 on FIG. 28-2 to determine if the transfer is done.

Returning to the consideration of test 288, if the requested data blocks do not span, and they are not all stored only on the CD-ROM, then they must be stored on the dedicated hard disk as well as the CD-ROM. In that event, block 290 is performed to read the data from the hard disk and transfer it to the host. Then processing is vectored to block 180 on FIG. 28-2 to determine if the entire data transfer is completed.

The foregoing process, by not exceeding the size of the onboard RAM cache of the CD-ROM in the size of the skipped block(s) during the initial fill insures that the data from the CD-ROM can be read at a much higher rate since transfers to the host come either from the dedicated hard disk or the onboard RAM cache of the CD-ROM, both of which have substantially faster access times than the CD-ROM device.

Figures 1, 31:
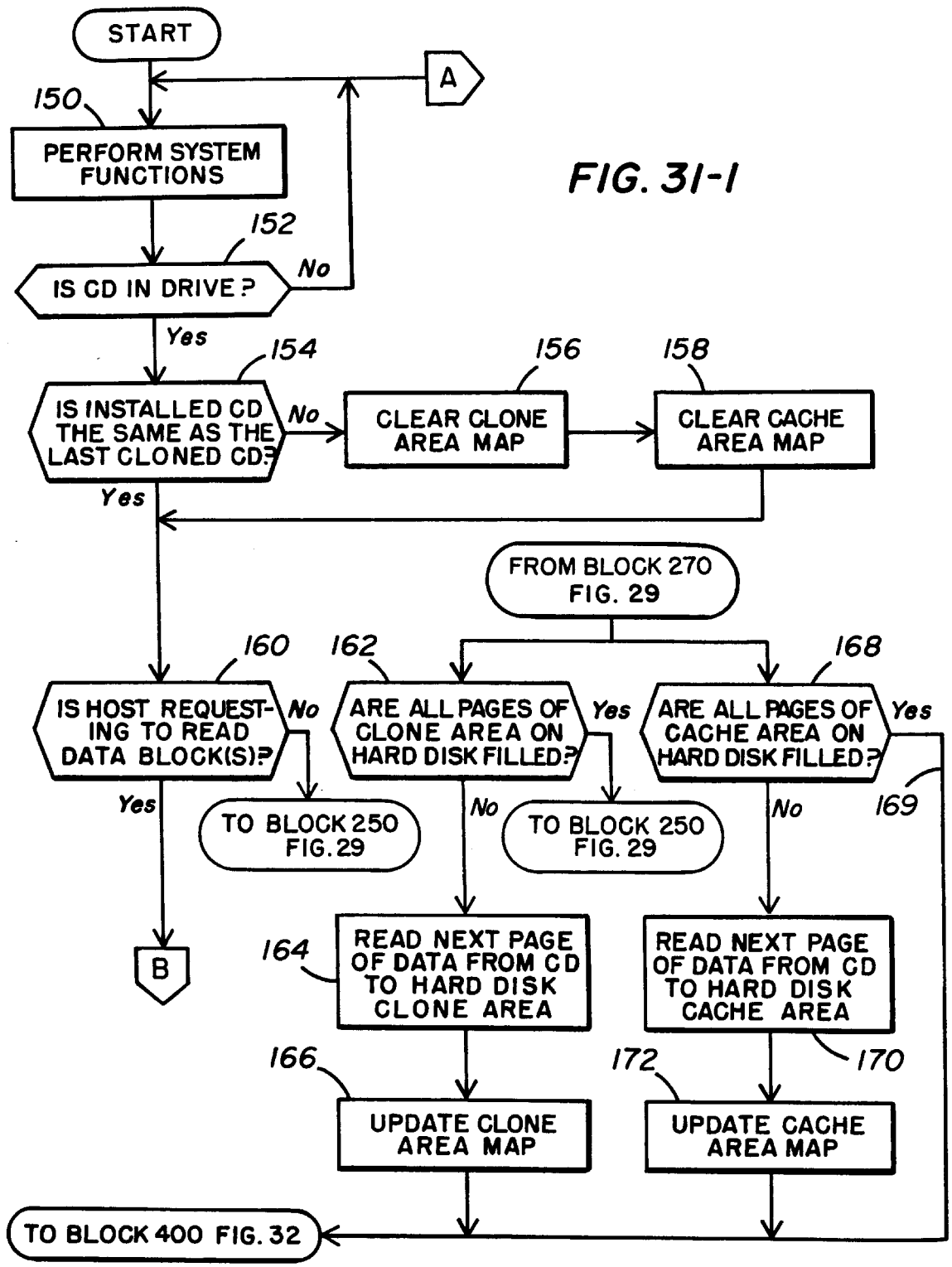
Figures 2, 31:
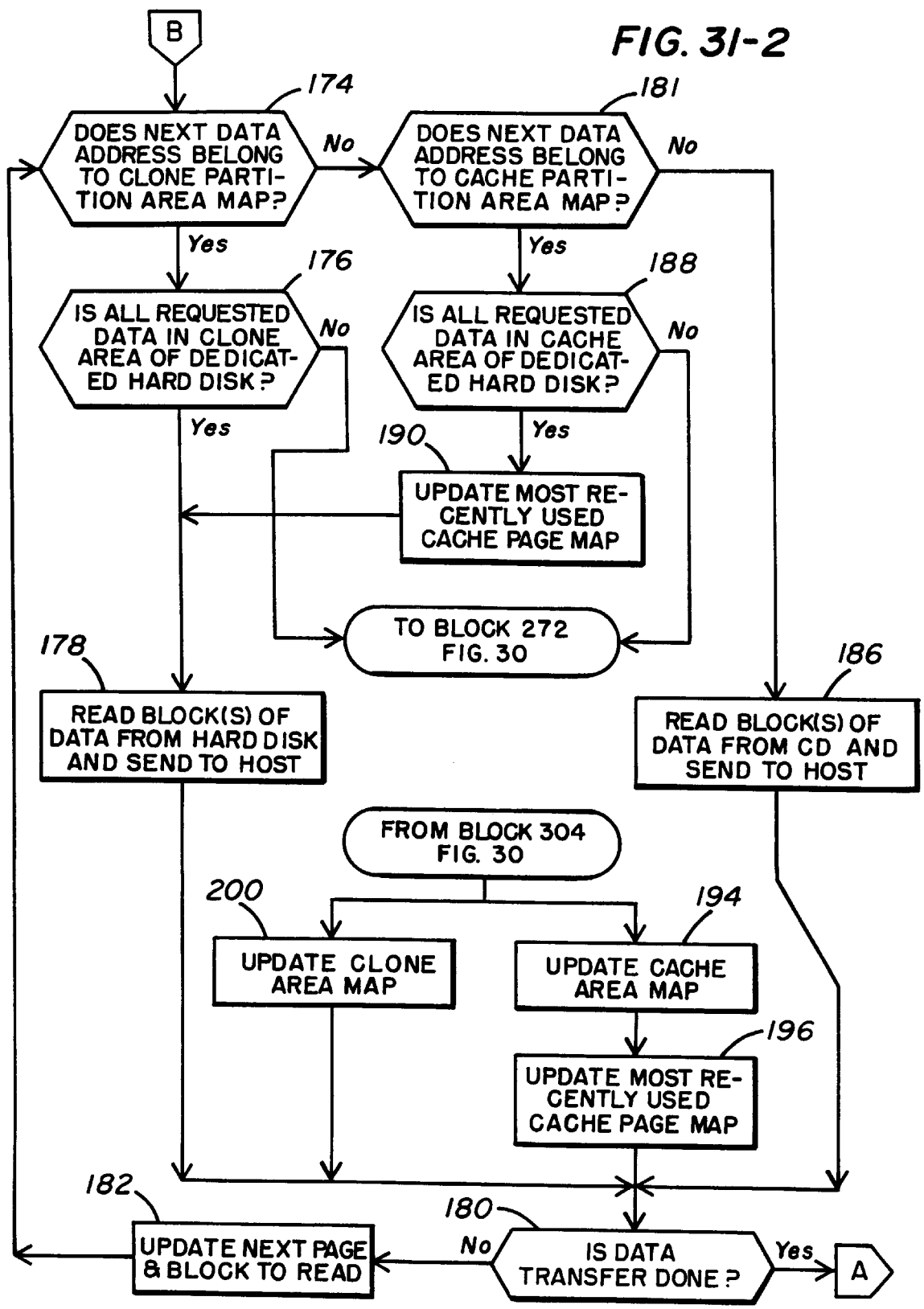
Figure 32:
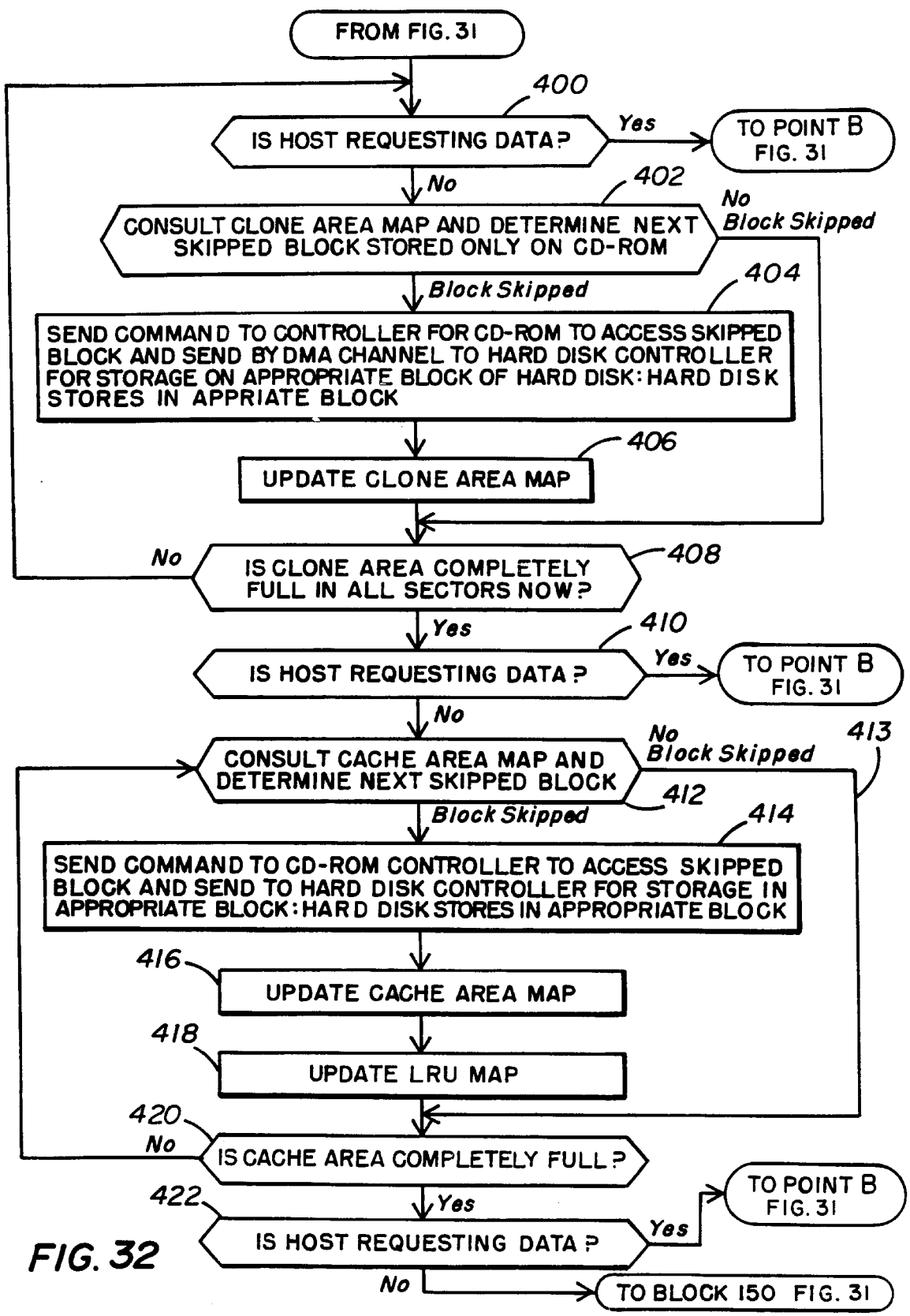
FIG. 32 is a flow chart of the process of filling in the skipped blocks in sequence on the dedicated hard disk after the initial striped filling process is completed.
Figure 33:
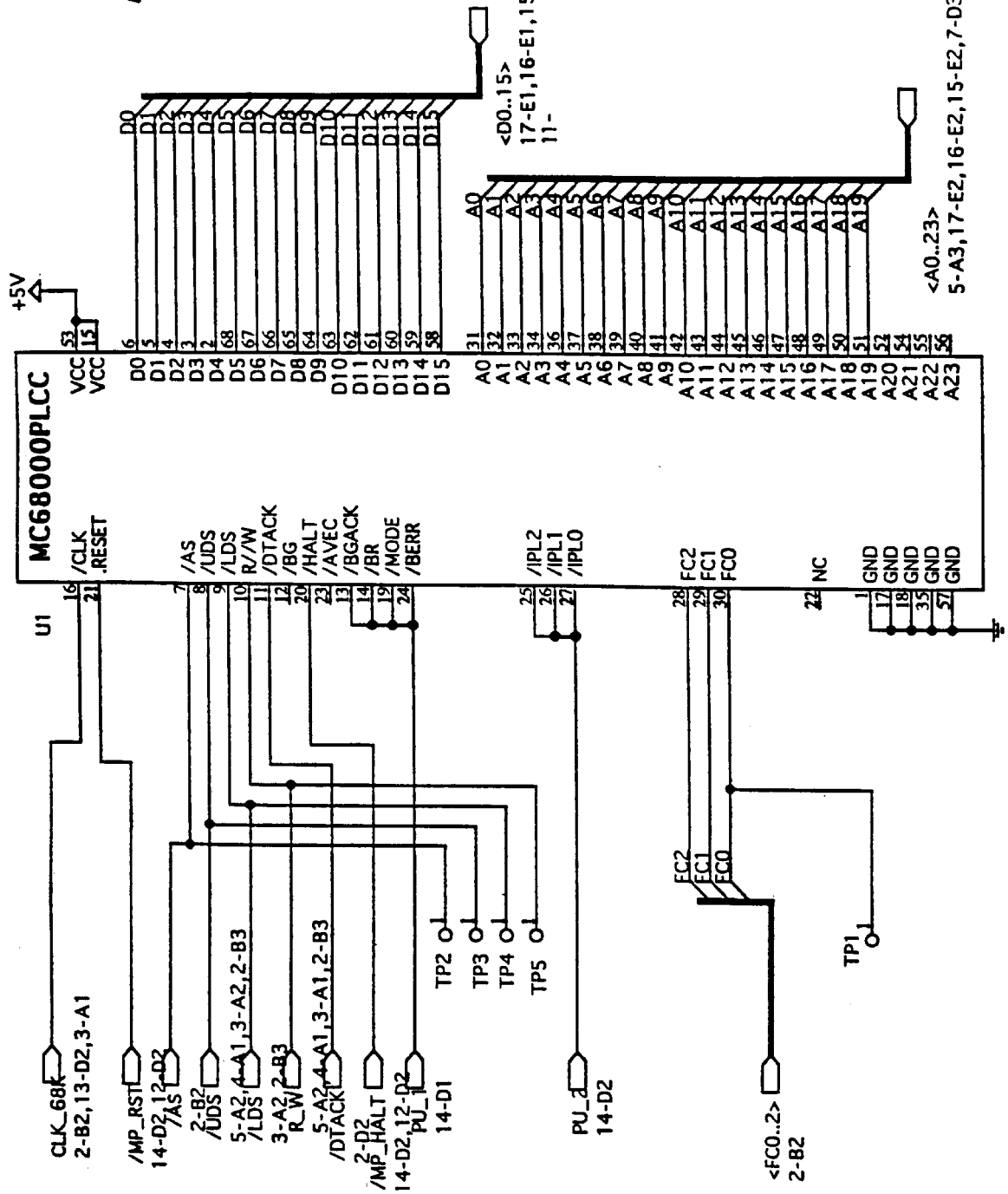
Figure 34:
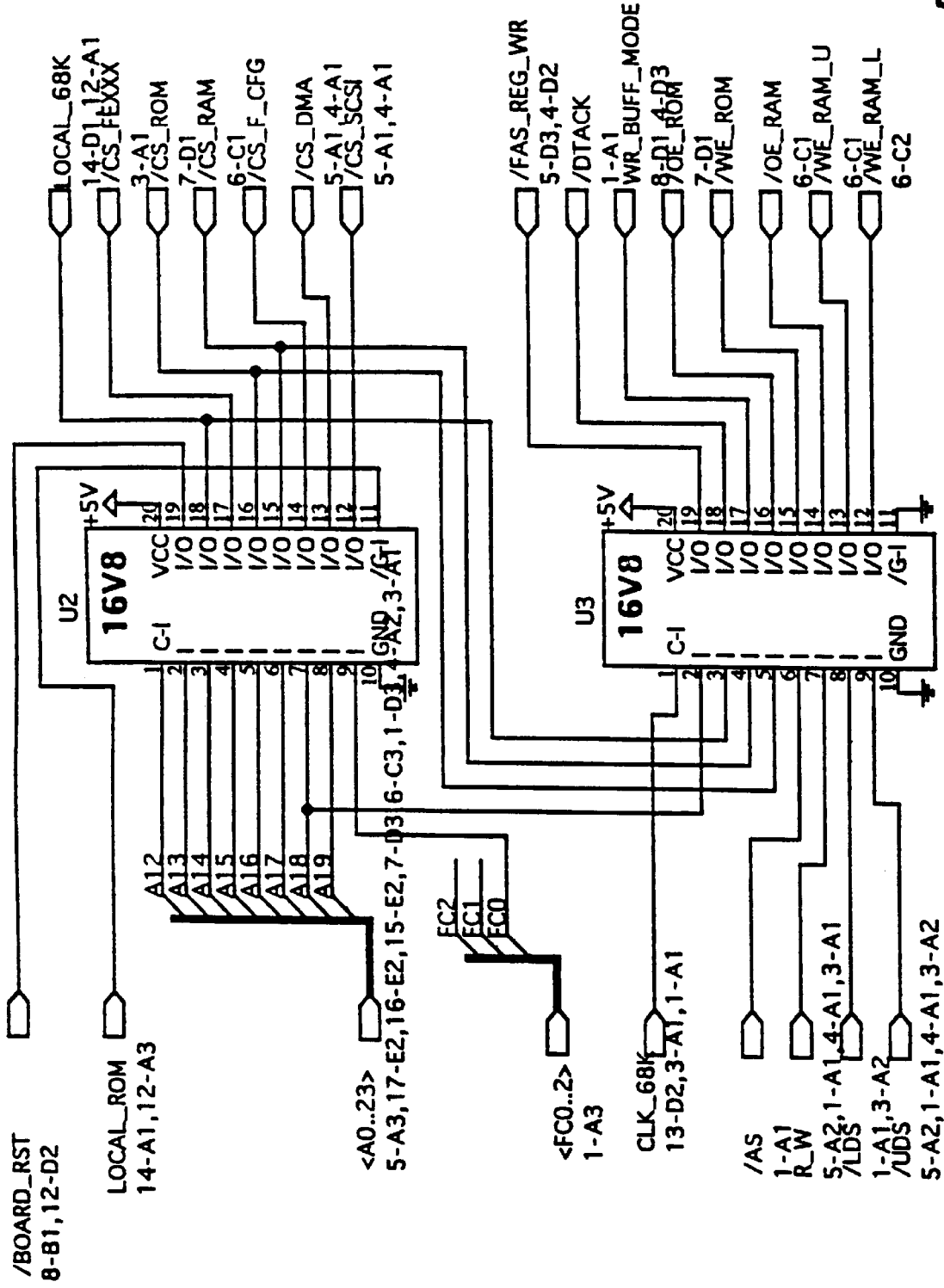
Figure 35:
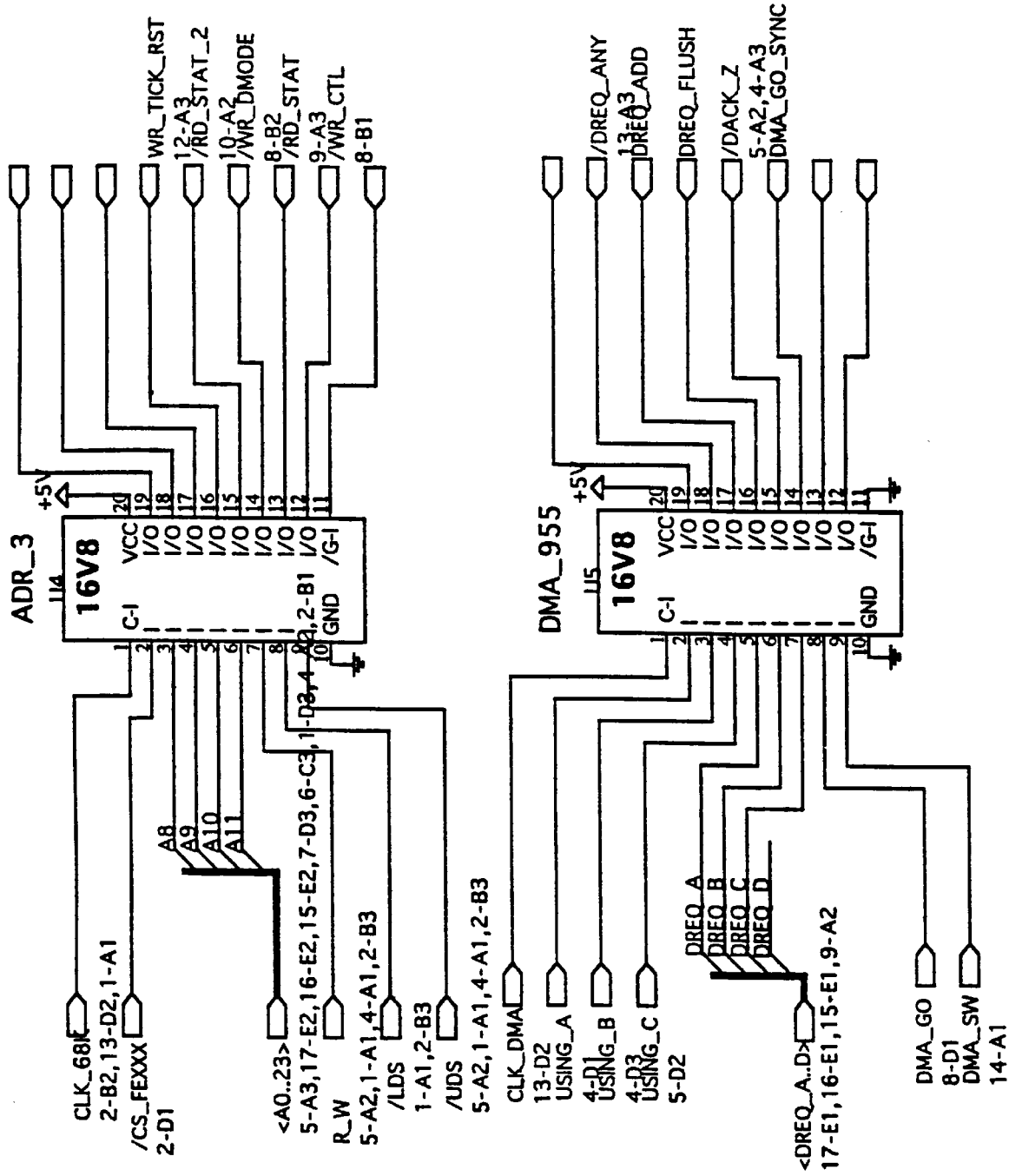
Figure 36:
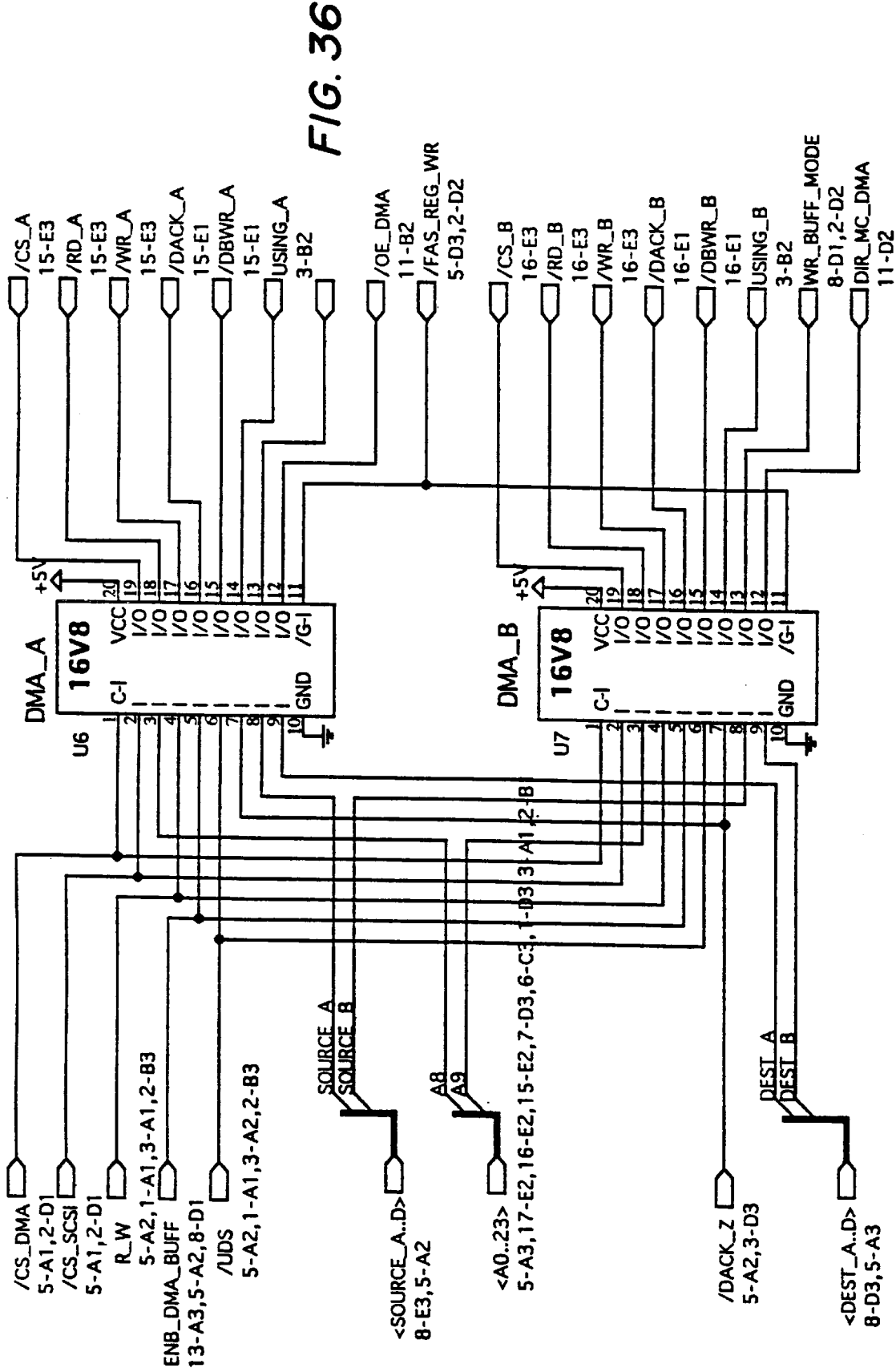
Figure 37:
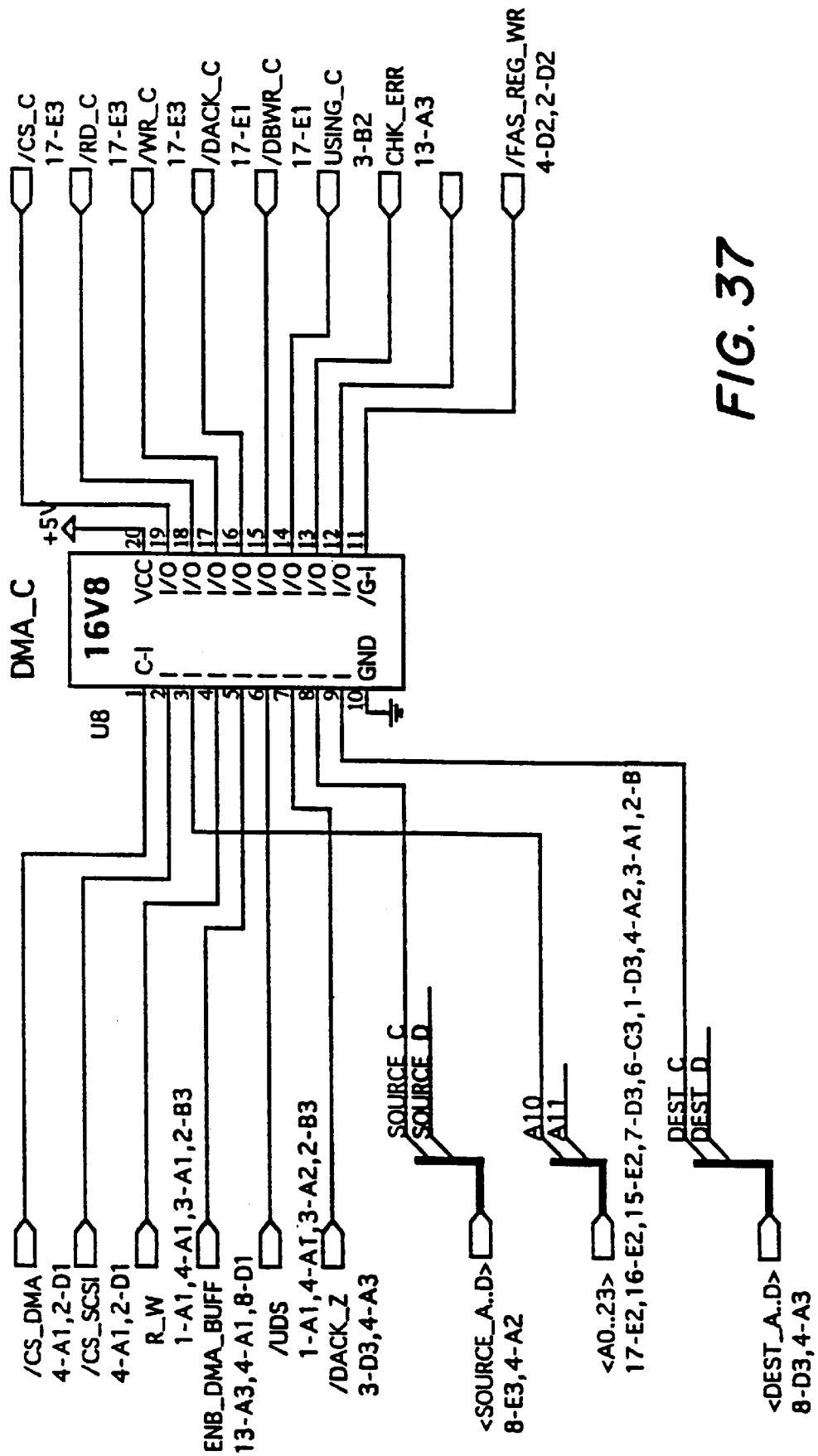
Figure 38:
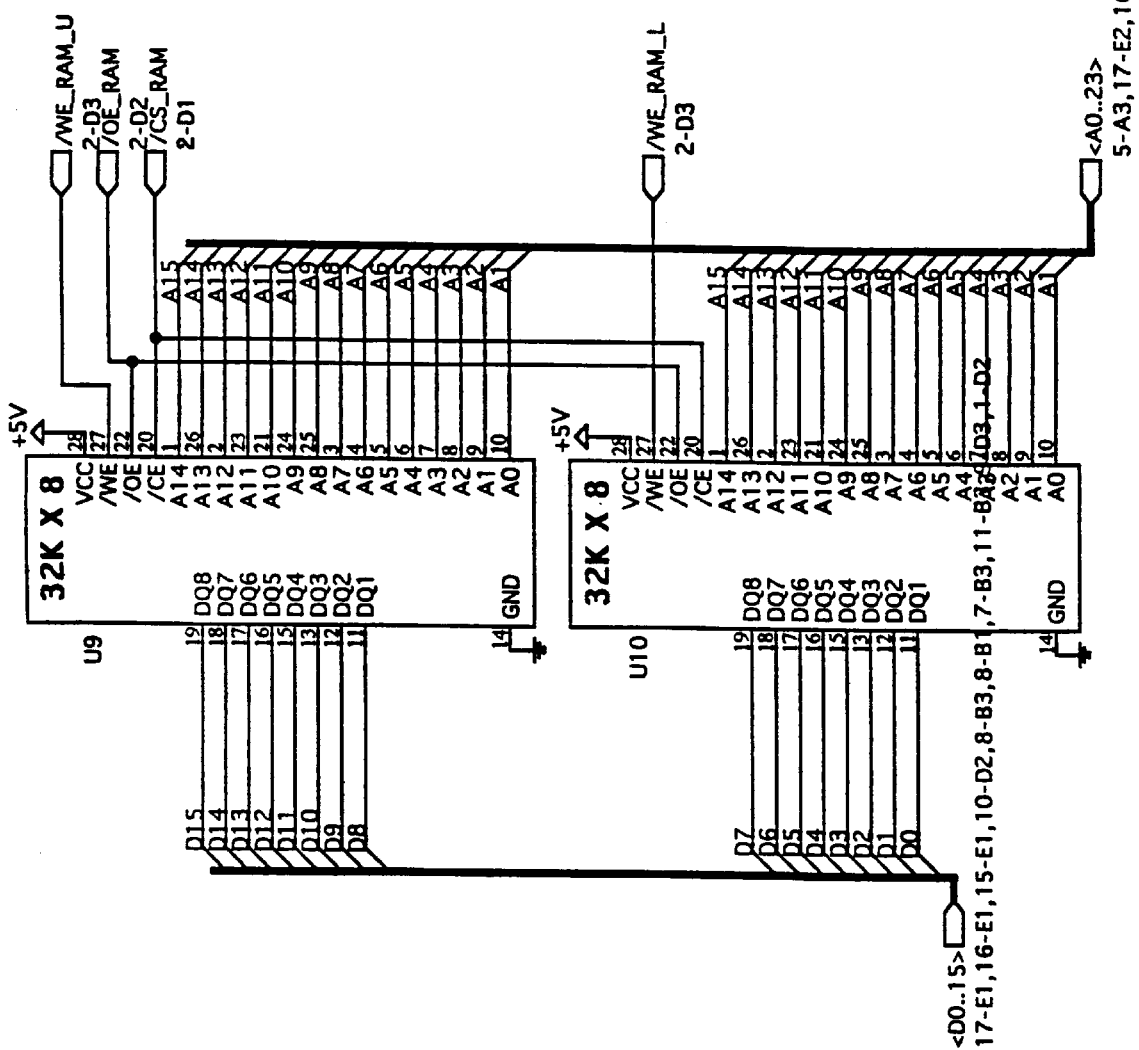
Figure 39:
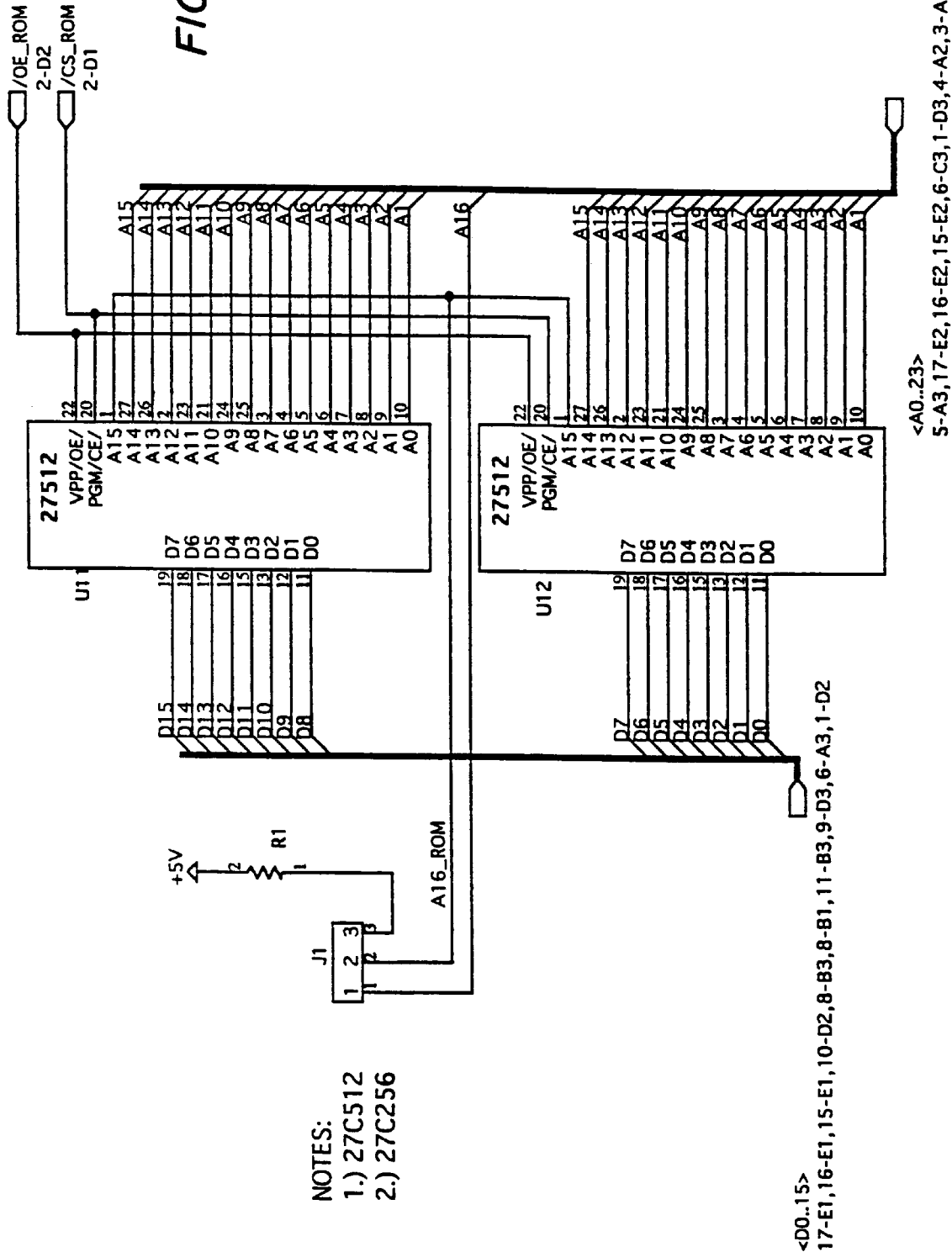
Figure 40:
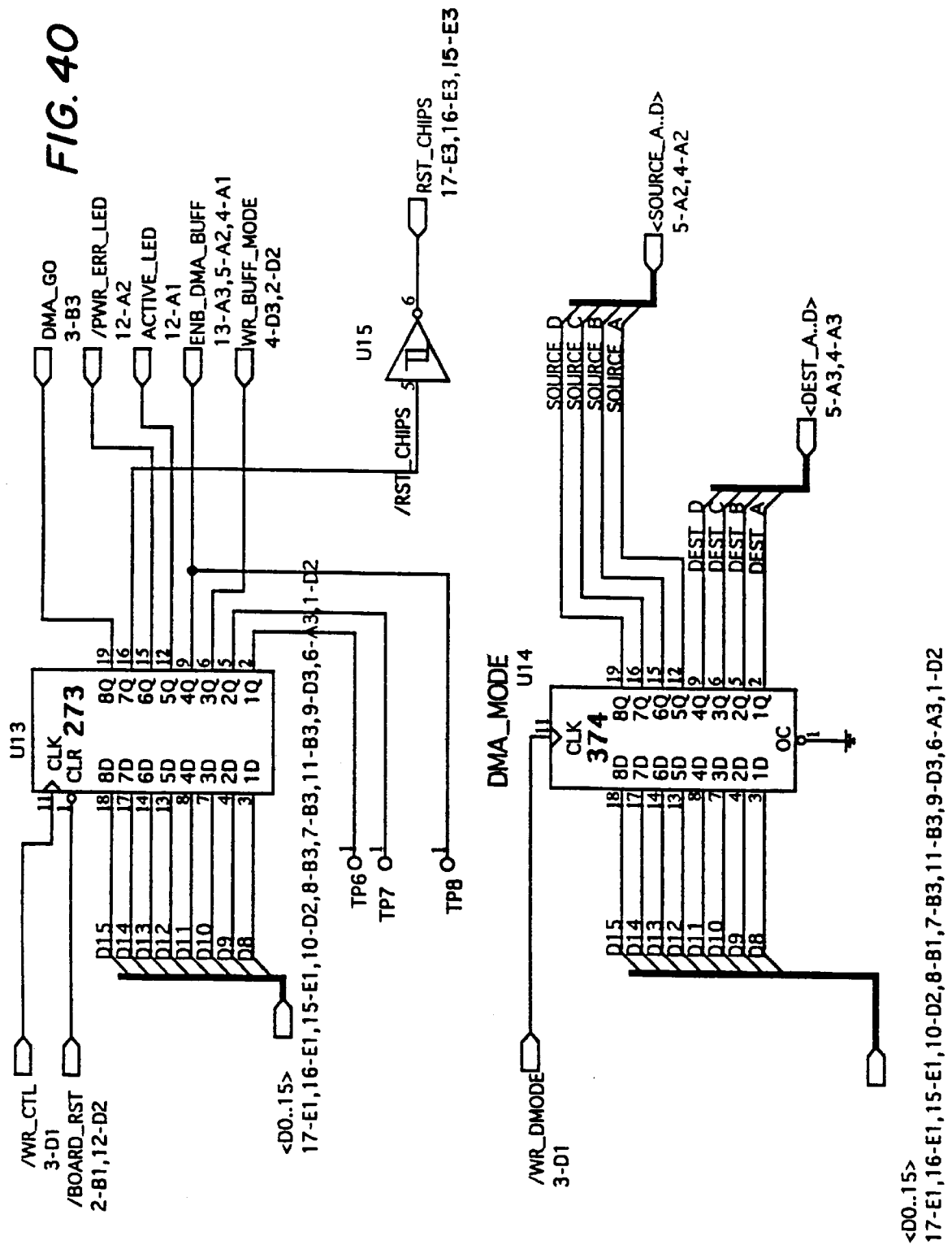
Figure 41:
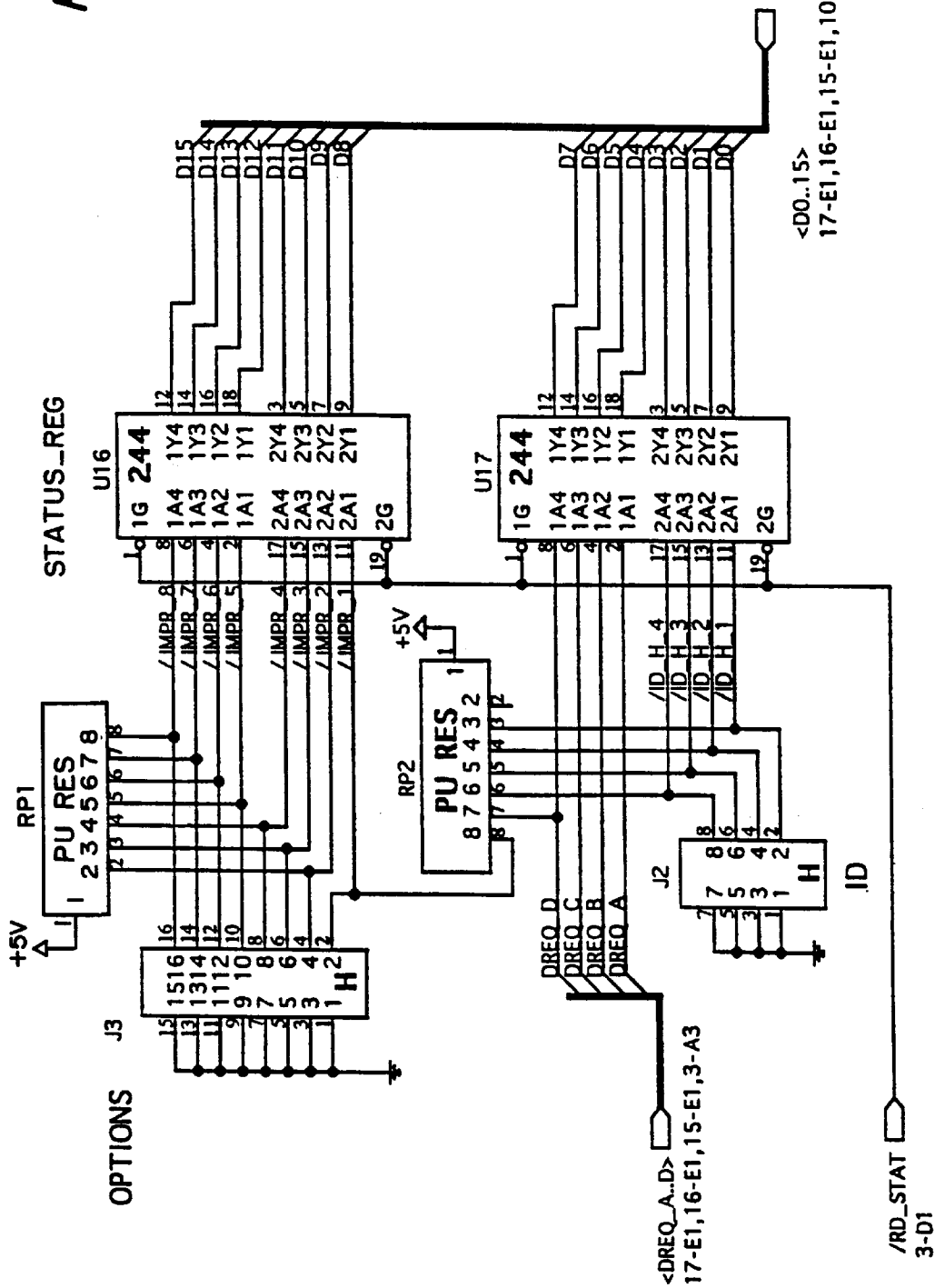
Figure 42:
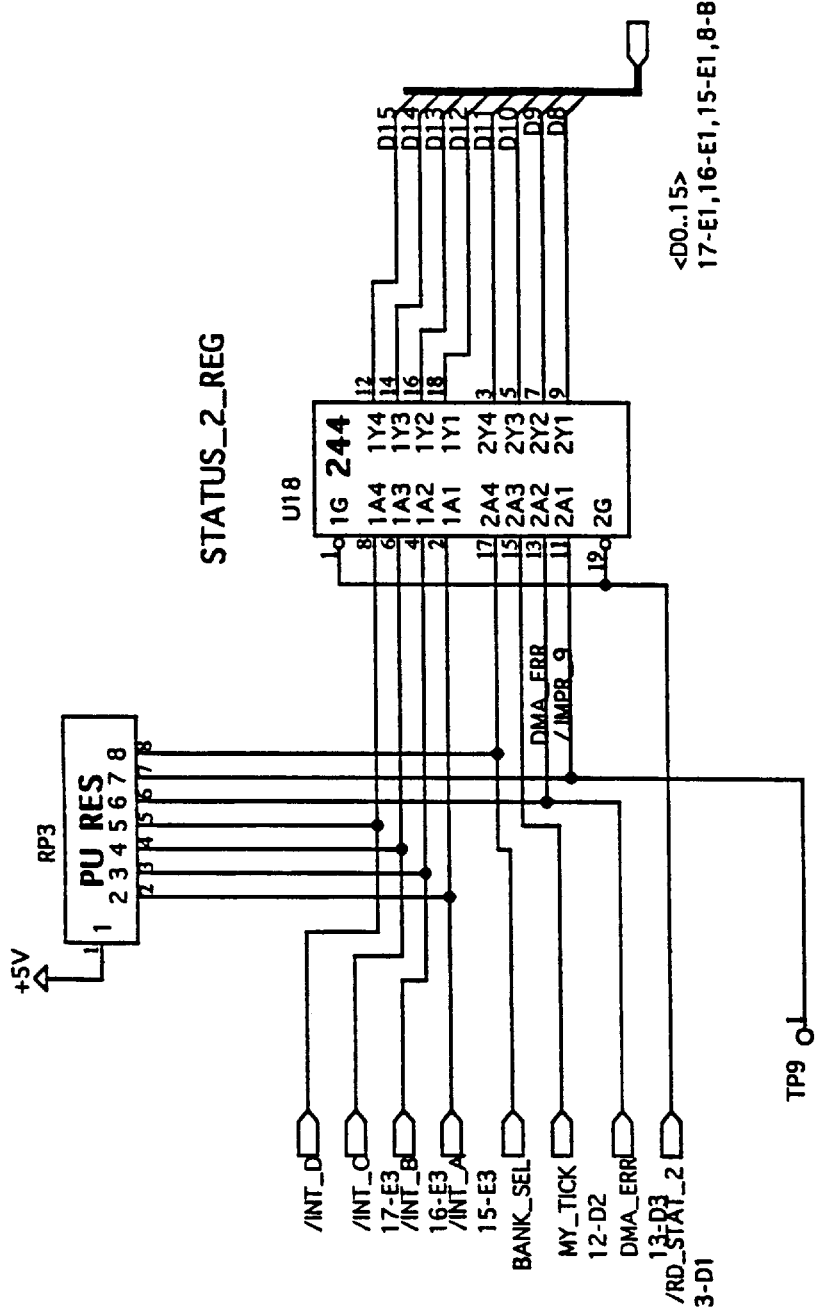
Figure 43:
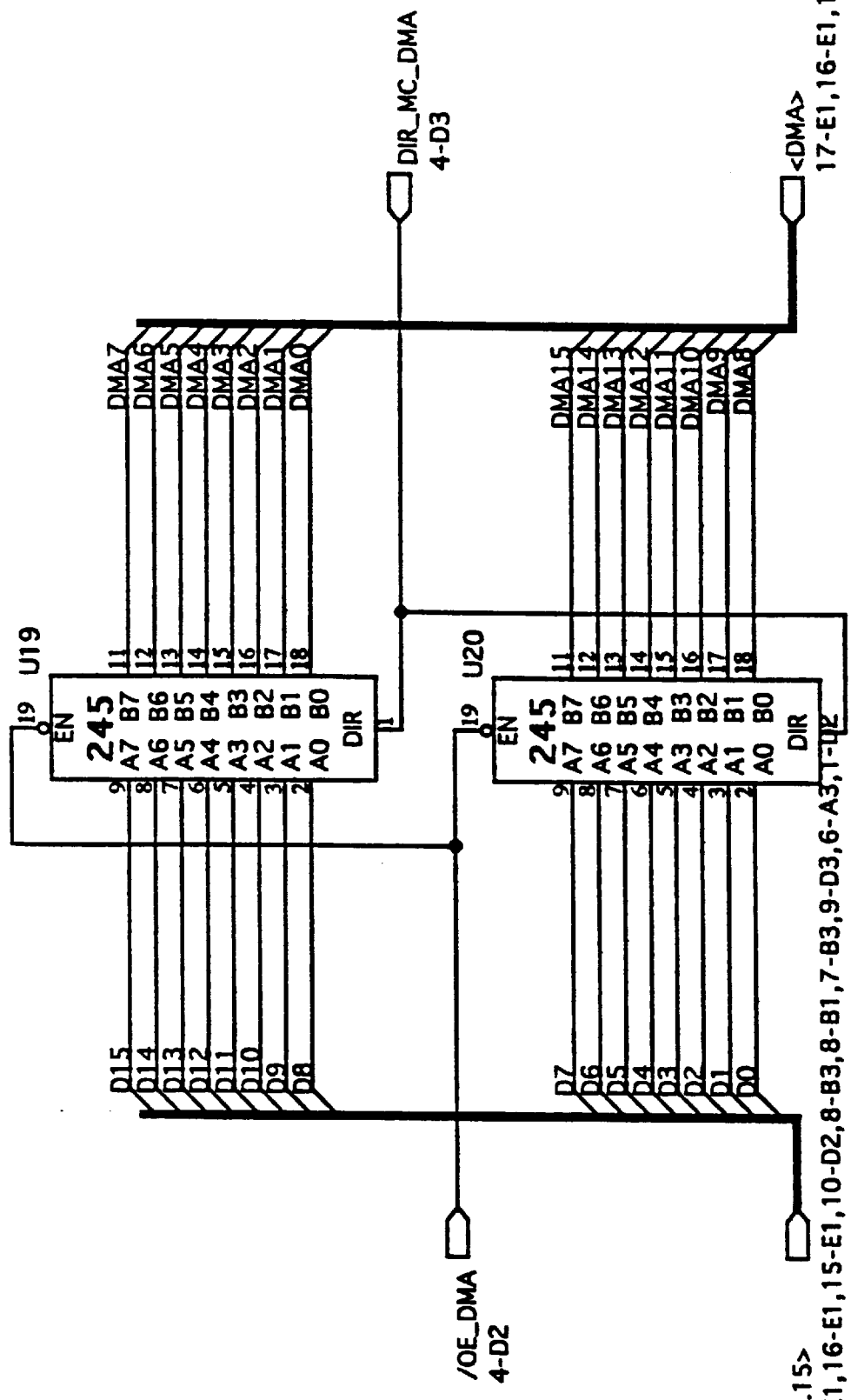
Figure 44:
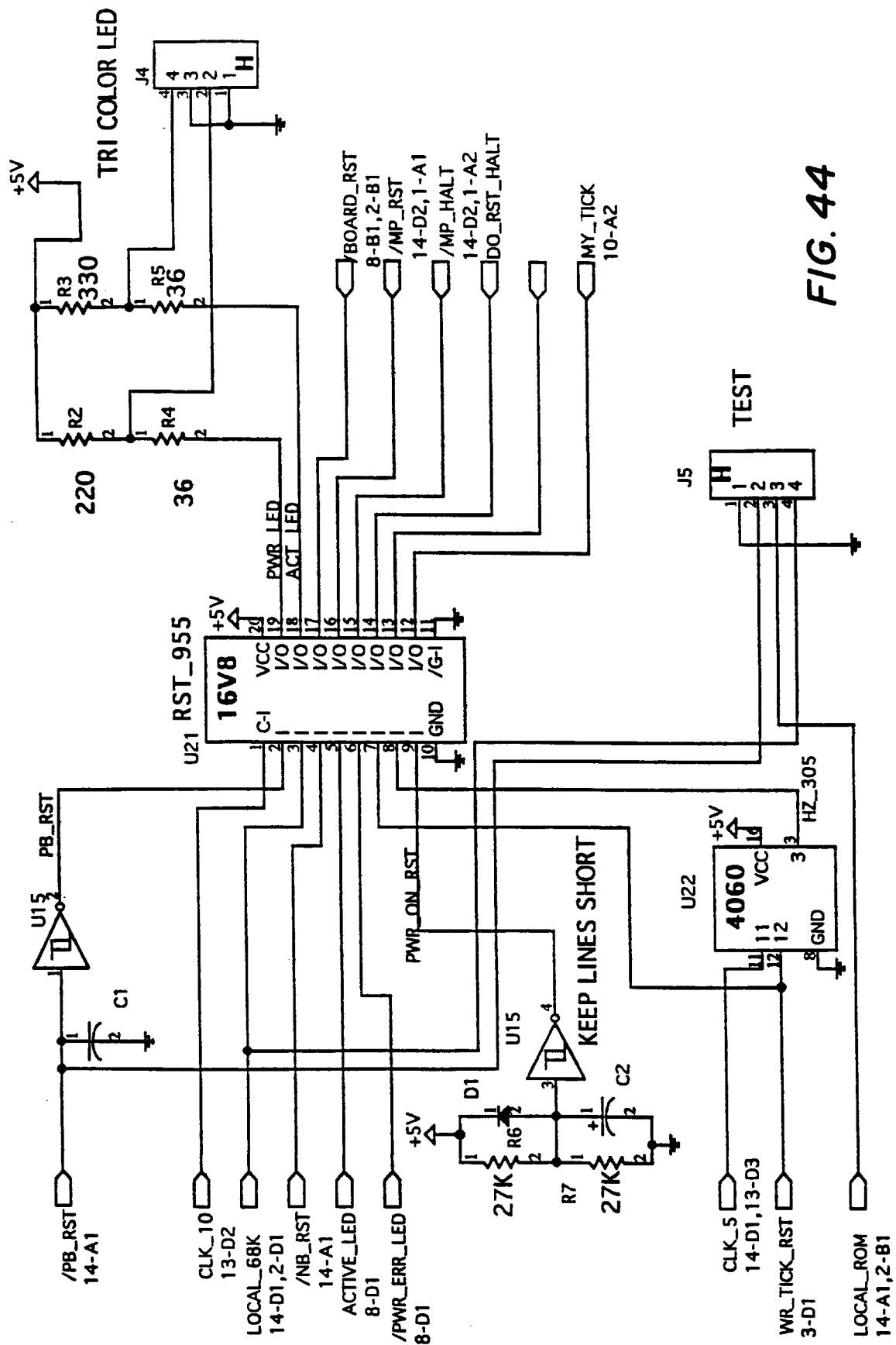
Figure 45:
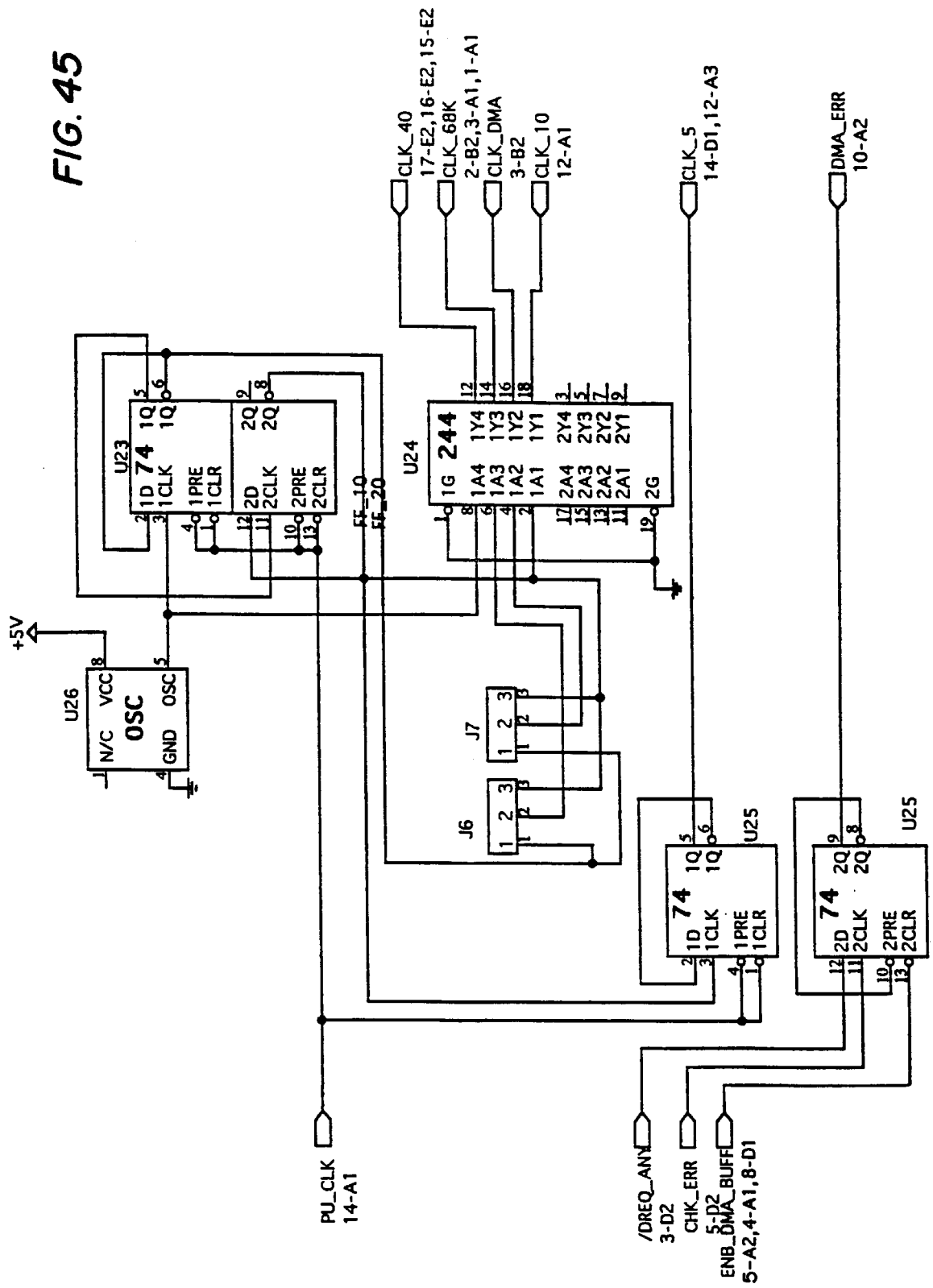
Figure 46:
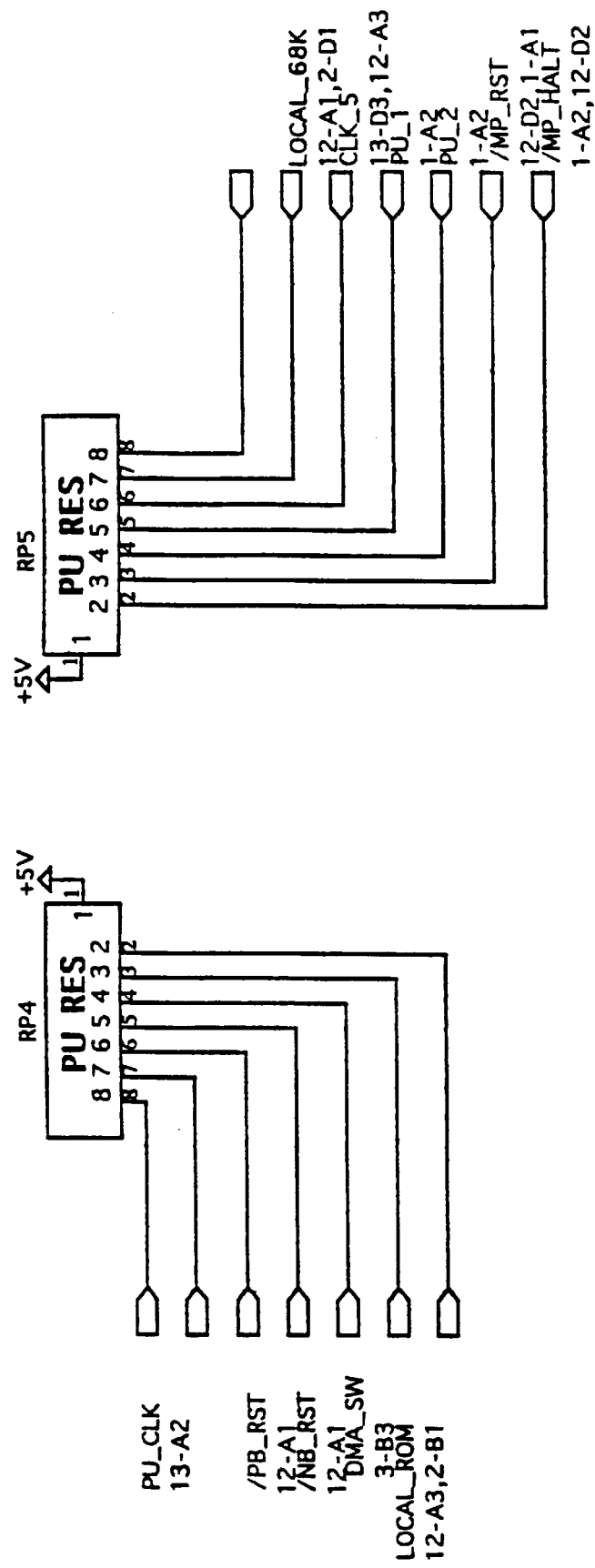
Figure 47:
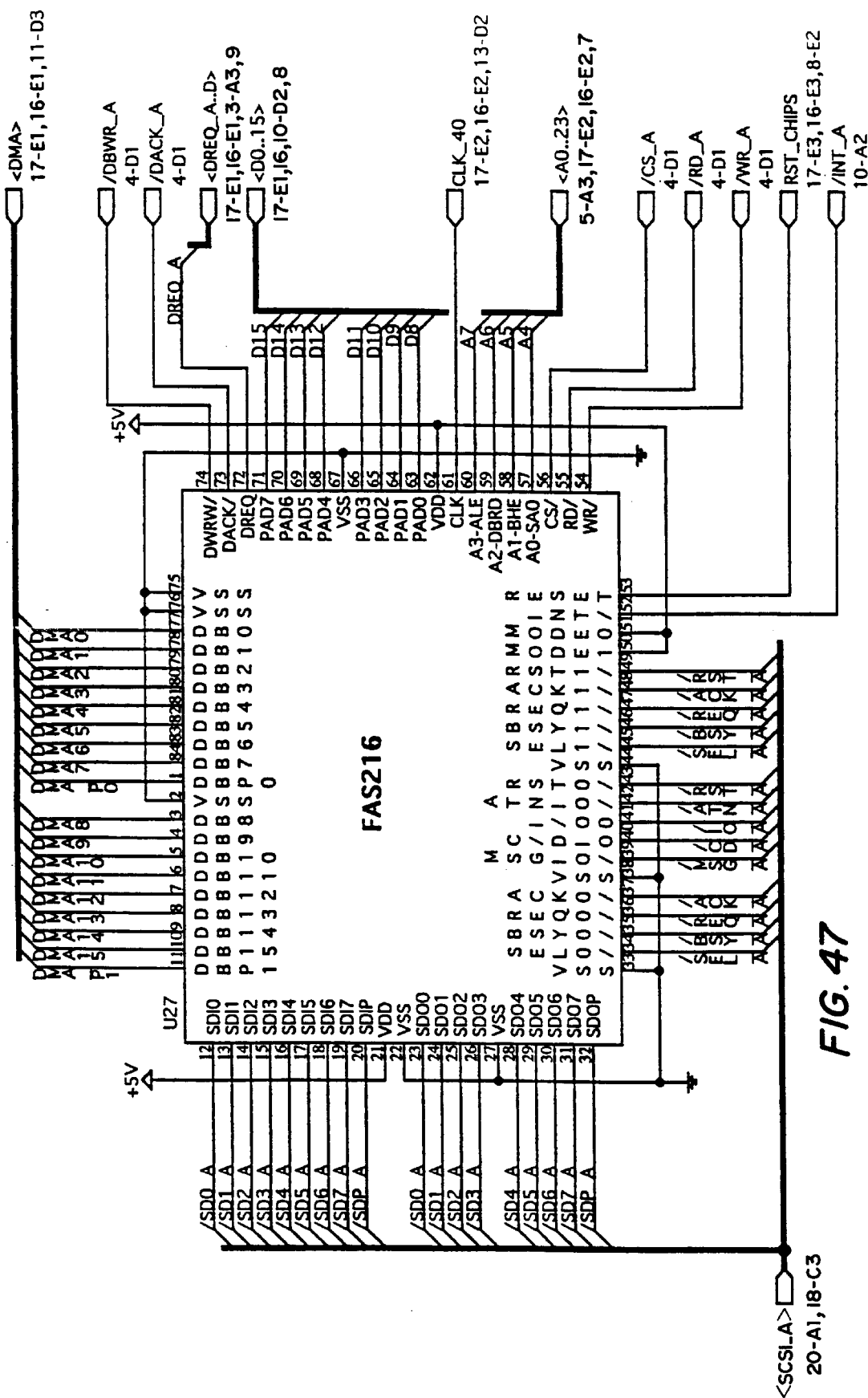
Figure 48:
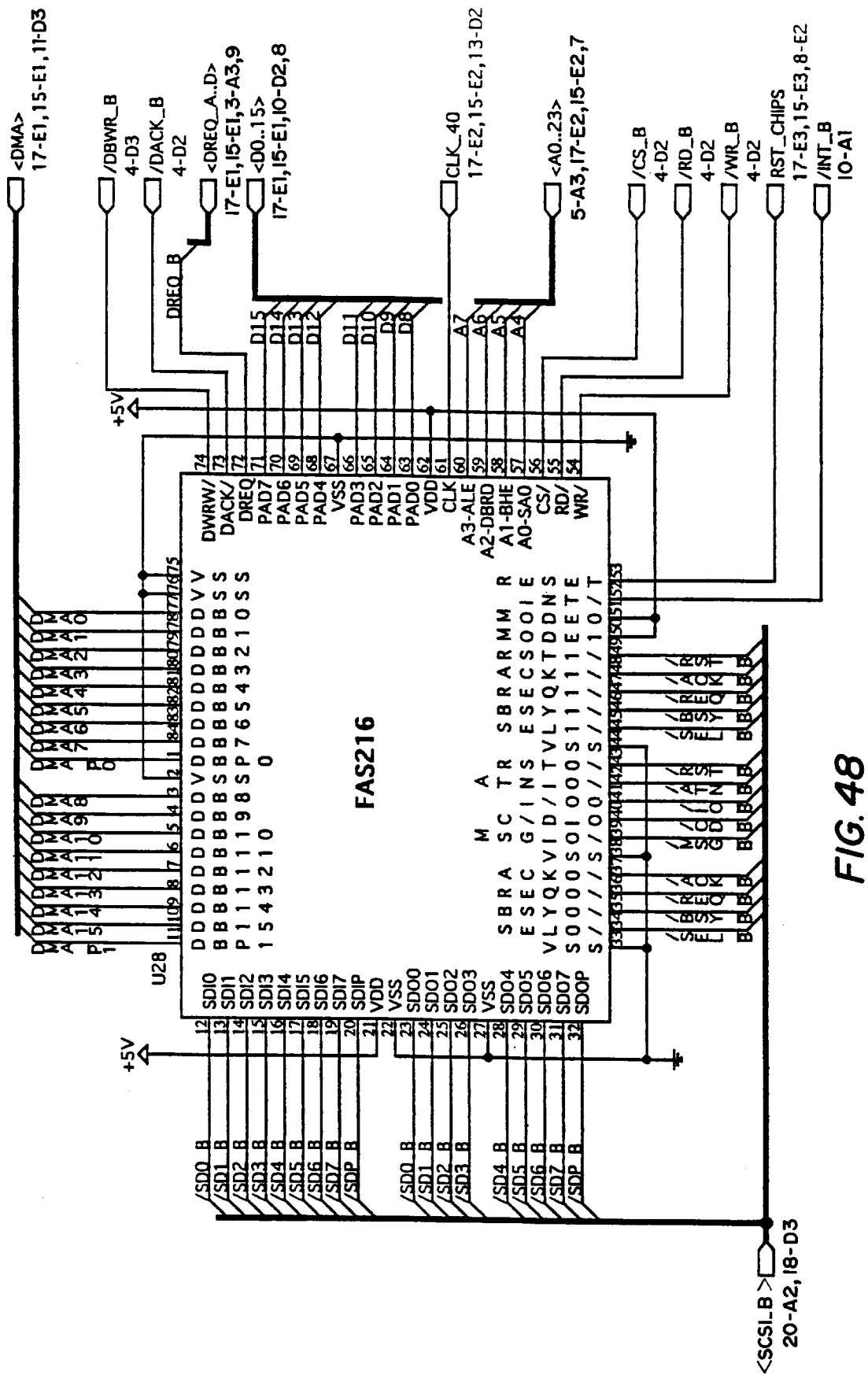
Figure 49:
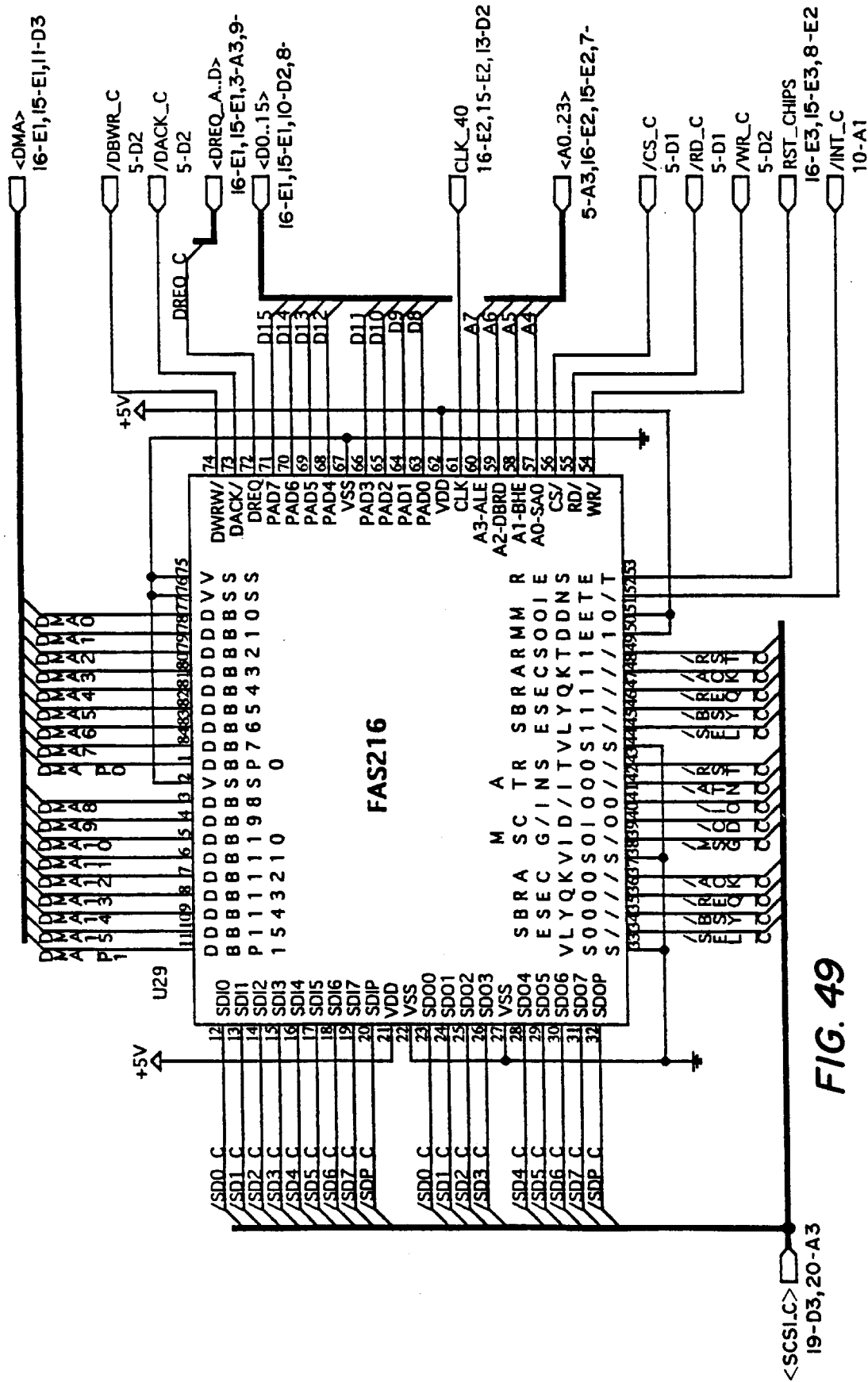
Figure 50:
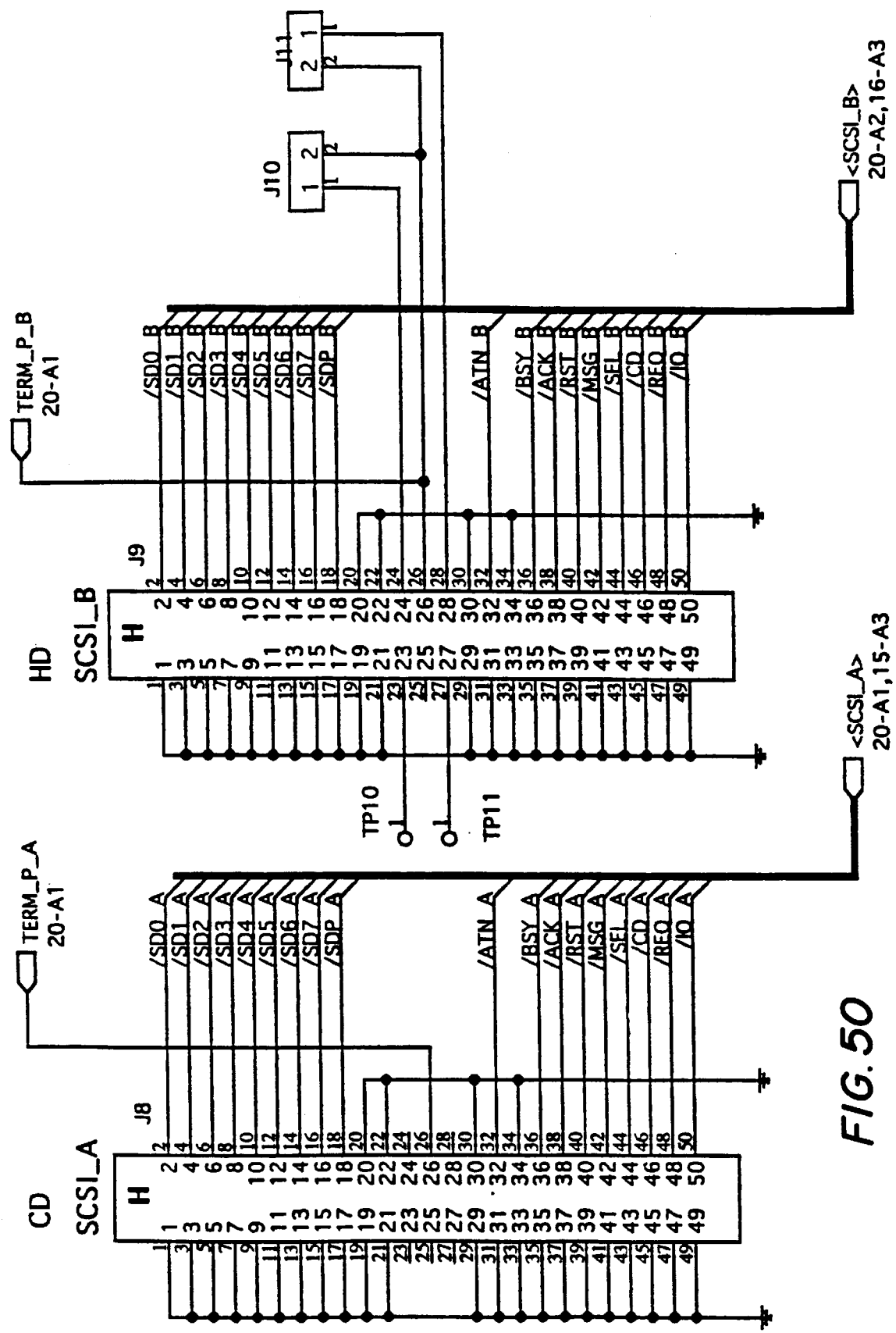
Figure 51:
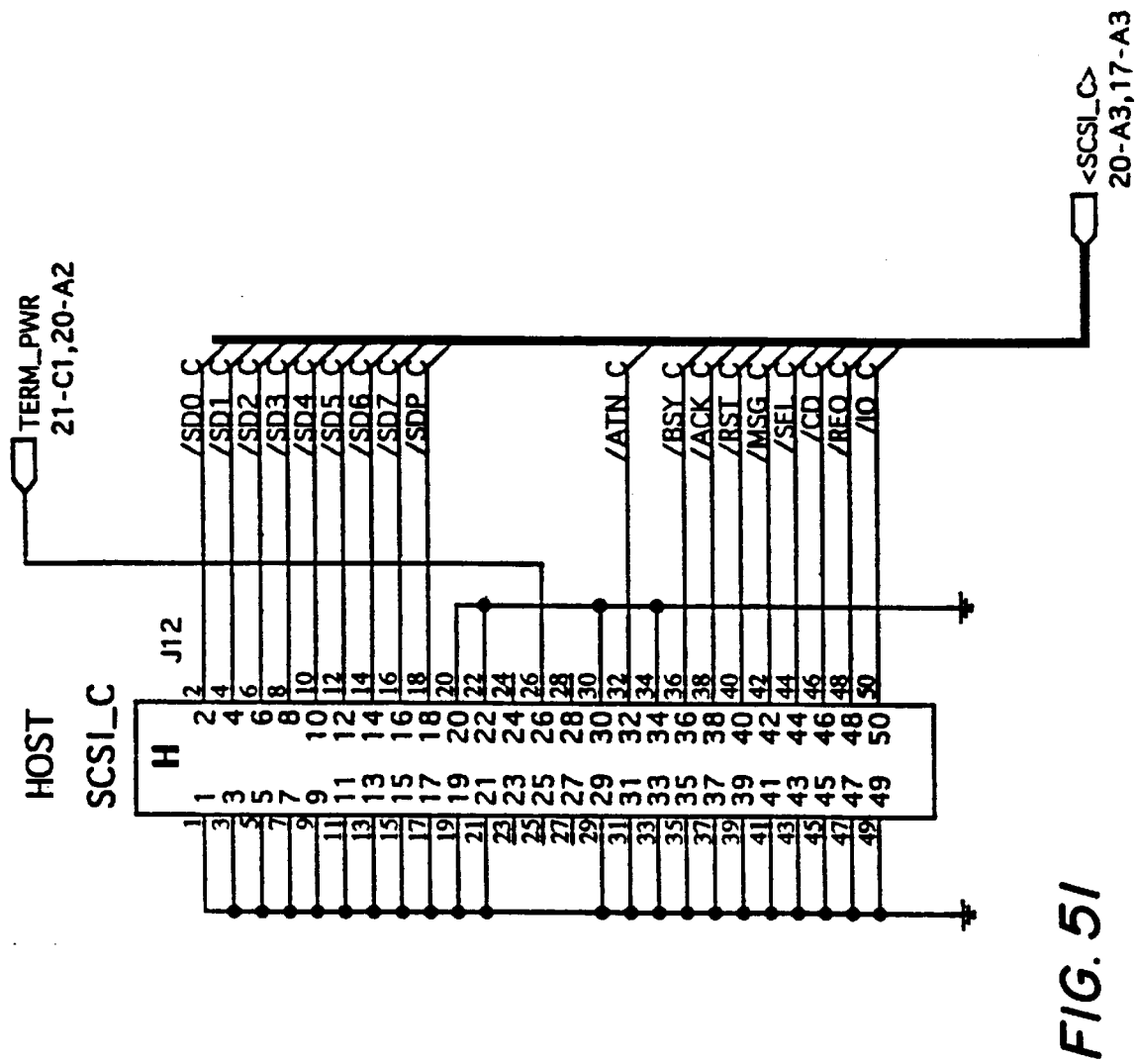
Figure 52:
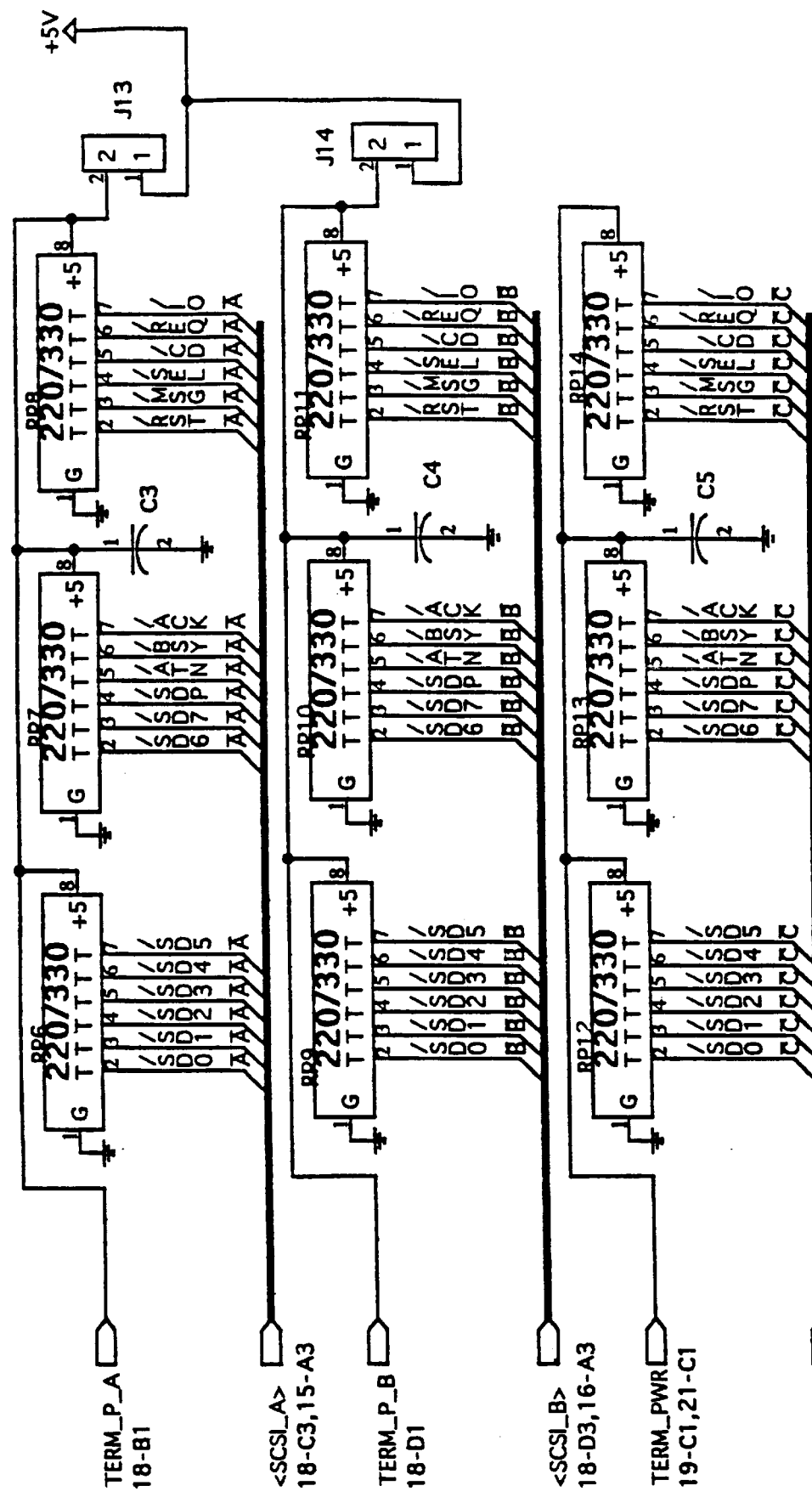

Referring to FIGS. 31-1 and 31-2, there is shown an improved cache management process which uses a striped fill pattern for initial filling of the clone area and the cache area, and uses dead time between read requests after the initial filling process to complete the filling of the clone and cache areas. In the process of FIGS. 31-1 and 31-2, blocks with identical reference numbers to blocks in FIGS. 28-1 and 28-2 serve the same purpose in the combination, and the discussion above regarding those blocks is incorporated by reference herein. After the tests 162 and 168 in the process of FIG. 31-1 conclude that the clone and cache areas have been "filled" upon completion of the striped initial filling process, path 169 is taken which transfers processing to test 400 of FIG. 32.

Test 400 determines if the host is requesting data. If so, then processing is vectored to point B on FIG. 31-2 to perform the process of FIGS. 31-2 and FIGS. 30A and 30B in fulfilling the read request in a pipelined fashion. If the host is not requesting data, test 402 is performed to consult the clone area map and determine if there are any skipped blocks in the area of the CD-ROM to be cloned that were skipped during the initial striped fill process. If there are, the identity of the skipped block which is stored only on the CD-ROM is determined, and is sent in the process of block 404 to the hard disk controller. If there are no remaining skipped blocks in the area of the CD-ROM to be cloned, processing vectors to test 408 to be described below.

Next, the process of block 404 is performed wherein the cache controller microprocessor 30 sends a command to the controller for the CD-ROM to access the skipped block determined in the process of block 402 and to send the data so accessed by DMA channel to the controller 26 for the dedicated hard disk for storage on the appropriate block of the hard disk. The dedicated hard disk then stores the data received from the CD-ROM in the appropriate block on the hard disk. Because the clone area is currently being completed, the received data is stored in a block on the dedicated hard disk which is in the same sequence relative to the neighboring data as the data block sequence on the CD-ROM.

Next, the process of block 406 is performed to update the clone area map. Then the test of block 408 is performed to determine if the clone area is completely full in all sectors and no data remains in the portion of the CD-ROM to be cloned which is currently stored only on the CD-ROM. If no, processing vectors back to test 400 where the presence of read requests is determined. Thereafter the process repeats itself for the next skipped block.

If the test of block 408 determines that the clone area of the dedicated hard disk is completely full in all sectors, processing vectors to block 410 wherein it is determined if the host is requesting data. If so, processing is vectored to point B on FIG. 31-2 to fulfill the read request. If no read request has been entered by the host, processing vectors to test 412 where the cache controller microprocessor consults the cache area map as it existed at the time the striped initial filling process was first completed to determine if any blocks still remain skipped such that they are stored only on the CD-ROM. If there is such a block, the identity of the block is determined and it is sent to the CD-ROM controller with the command of the process of block 414. If there is no skipped block indicated in the copy of the cache area map as it existed at the end of the initial fill or as updated in block 416, processing vectors to test 420 described below.

Test 412 means that the cache controller microprocessor 30 must save a separate copy of the cache area map (hereafter sometimes called the shadow map whereas the original cache area map will be called the original cache area map) immediately upon completion of the initial striped fill process for use in step 412 since after the initial fill process, the cache area of the dedicated hard disk starts filling up on a more or less random basis according to the needs of the application program, and the original cache area map is constantly updated with data being stored on a recency of use basis instead of a sequential basis as in the initial fill process. The process of blocks 412 through 420 will act to completely fill up the dedicated hard disk's cache area after the initial fill, and to generate a shadow cache area map that initially shows the skipped blocks but is gradually updated until the cache area is completely filled. Thereafter, additions to the cache area occur on a random basis according to the process starting at point B on FIG. 31-2 and are placed in the cache area blocks previously occupied by the least recently used blocks of data.

If test 412 finds a skipped block, the process of block 414 is performed wherein the cache controller microprocessor sends a command to the CD-ROM controller 28 to access the block determined in the process of block 412 and send the data so accessed to the controller 26 for the hard disk for writing into the appropriate block on the hard disk. The dedicated hard disk then stores the data in the appropriate block. In the case of completion of the fill process immediately after the initial striped fill, the data is stored in the same sequence on the hard disk as it is stored on the CD-ROM. Once the filling in of the missing stripes is completed by the process of steps 412–420 is completely, no skipped blocks will be found and processing will vector directly past the process on path 413 to test, 420, find the cache area completely full and then pass to test 422 for vectoring to point B on FIG. 31-1 to fulfill a read request or back to block 150 on FIG. 31-1 to return to system functions and look for insertion of a new CD-ROM.

After completion of the process of block 414, the process of block 416 is performed to update both the copy of the cache area map used for steps 412 through 420 and the original cache area map updated by step 194 on FIG. 31-2. Then step 418 is performed to update the least recently used map. This is the same map updated by step 196 on FIG. 31-2.

Next, step 420 is performed to determine if the cache area of the dedicated hard disk is completely full in all sectors. If so, processing passes to test 422 to test for host read requests. If not, processing returns to block 412 on FIG. 32 to determine the next skipped block that is stored only on the CD-ROM according to the shadow cache area map used by steps 412 and 420. Thereafter, the process repeats itself until the cache area on the dedicated hard disk has been completely filled in sequence and is ready for updating on a most recently used basis.

After the cache area has been completely filled, the test 422 will vector processing to point B on FIG. 31-2 if a read request exists, or back to block 150 on FIG. 31-1.

Although the invention has been described in terms of the preferred and alternative embodiments disclosed herein, those skilled in the art will appreciate various substitutions which may be made for various elements in the disclosed embodiments which do not alter the basic functionality of each element and the functional interaction between the elements. In addition, certain other modifications may also be appreciated which do not alter the basic principle of operation and the interplay and functional interdependency of the combined elements. All such modifications and substitutions are within the scope of equivalents under the doctrine of equivalents and 35 U.S.C. Section 112, Paragraph 6 claim interpretation of means plus function claims appended hereto.

What is claimed is:

1. A controller for a rotating media bulk storage memory device for decreasing data access times thereto by a host computer and increasing data transfer rates from the storage device to the host computer, the controller comprising:

a first bus controller coupled to a rotating media bulk storage memory device by a first bus, the first bus controller managing data transfers to and from the storage device in a manner that the data transfers are normally accomplished over the first bus;

a second bus controller coupled to a rotating magnetic media type hard disk which is managed as a cache memory by a second bus, the second bus controller managing data transfers to and from the hard disk in a manner that the data transfers are normally accomplished over the second bus;

a third bus controller coupled to a host computer by a third bus, the third bus controller managing data transfers to and from the computer over the third bus and implementing an interface between the host computer and the storage device of the type normally associated with the type of storage device coupled to the first bus controller;

memory means for storing data and program instructions; and microprocessor means coupled to the memory means and to the first, second, and third bus controllers by address and data buses, the microprocessor executing program instructions to independently control the first, second, and third bus controllers to manage the hard disk as a cache memory by copying at least some of the data from a rotating media in the storage device to the hard disk whenever a new rotating media is inserted into the storage device, the microprocessor also maintaining a record in the memory means of what blocks of data from the rotating media in the storage device have been stored in the hard disk and the address of the blocks of data, and intercepting read requests from the hoot computer, whereby if data requested by the computer is stored on the hard disk, the microprocessor retrieves the requested data from the hard disk and transmits the data to the computer, if the requested data is not stored on the hard disk, the microprocessor causes the requested data to be retrieved from the rotating media in the storage device and transmitted to computer and stored on the hard disk, the microprocessor further causing the record in the memory means to be updated to reflect the new data that has been stored on the hard disk and the address of the data; and wherein the storage device has a rotating media which can be ejected from the device and replaced with a new rotating media, and wherein the microprocessor determines when a rotating media has been ejected and replaced with a new rotating media, and upon determining that a new rotating media is placed in the device, the microprocessor determining whether the new rotating media is the same as the previous media by checking if at least some of its data is copied on the hard disk, if the new rotating media is a different media, the microprocessor copying at least some of the data stored thereon to the hard disk such that the data on the hard disk, acting as a cache memory, matches at least some of the data on the rotating media in the storage device.

2. The controller of claim 1 further comprising a direct-memory-access bus coupling said first, second and third bus controllers to each other for allowing any of said first, second or third controllers to transfer data directly to another one of said first, second or third bus controllers without the involvement of said microprocessor, and a data transceiver coupling said data bus to said direct-memory-access bus thereby providing a data path by which said first, second or third bus controllers can transmit data on said data bus and said microprocessor can transmit data on said direct-memory-access bus, whereby if it is desired to copy data from a rotating media in said storage device to implement said hard disk as a cache memory, said microprocessor addresses said first controller to cause said storage device to read requested data from said rotating media, said microprocessor then addressing said second controller to cause said first controller to transmit the requested data to said second controller over said direct memory access bus, said microprocessor causing said second controller to store the requested data on said hard disk at an address indicative of the address of the requested data on said rotating media, thereby rendering said hard disk transparent to said computer.

3. The controller of claim 1 wherein the microprocessor causes the storage device to store data in blocks on the hard disk on a plurality of tracks, and wherein the microprocessor further comprises means for copying requested data, when the requested data is not stored on the hard disk, from the entire track on which the requested data is stored and updating the record in the memory to reflect the blocks of data from the track on the hard disk where the data is stored, and the addresses of the data.

4. The controller of claim 1 wherein the rotating media bulk storage device is a compact disc-read only memory (CD-ROM).

5. The controller of claim 1 wherein the rotating media bulk storage device is a magneto-optical read/write device.

6. A controller for a rotating media bulk storage memory device for decreasing data access times thereof by a host computer and increasing data transfer rates from the storage device to the host computer, the controller comprising:

a first bus controller coupled to a rotating media bulk storage memory device by a first bus, the first bus controller managing data transfers to and from the storage device in a manner that the data transfers are normally accomplished over the first bus;

a second bus controller coupled to a rotating magnetic media type hard disk which is managed as a cache memory by a second bus, the second bus controller managing data transfers to and from the hard disk in a manner that the data transfers are normally accomplished over the second bus;

a third bus controller coupled to a host computer by a third bus, the third bus controller managing data transfers to and from the computer over the third bus and implementing an interface between the host computer and the storage device of the type normally associated with the type of storage device coupled to the first bus controller;

memory means for storing data and program instructions;

microprocessor means coupled to the memory means and to the first, second, and third bus controllers by address and data buses, the microprocessor executing program instructions to independently control the first, second, and third bus controllers to manage the hard disk as a cache memory by copying at least some of the data from a rotating media in the storage device to the hard disk whenever a new rotating media is inserted into the storage device, the microprocessor also maintaining a record in the memory means of what blocks of data from the rotating media in the storage device have been stored in the hard disk and the address of the blocks of data, and intercepting read requests from the host computer, whereby if data requested by the computer is stored on the hard disk and transmits the data to the computer, the microprocessor retrieves the requested data from the hard disk, the microprocessor causes the requested data to be retrieved from the rotating media in the storage device and transmitted to the computer and stored on the hard disk, the microprocessor further causing the record in the memory means to be updated to reflect the new data that has been stored on the hard disk and the address of the data;

a direct access bus coupling the first, second, and third independent bus controllers to each other to allow any one of the controllers to transfer data directly to at least one of the controllers without the involvement of the microprocessor; and a data transceiver coupling the data bus to the direct memory access bus to provide a data path so that the controllers can transmit data on the data bus and the microprocessor can transmit data on the direct memory access bus, whereby if it is desired to copy data from a rotating media in the storage device to implement the hard disk as a cache memory, the microprocessor addresses the first controller to cause the storage device to read requested data from the rotating media, the microprocessor then addressing the second controller to cause the first controller to transmit the requested data to the second controller over the direct memory access bus, the microprocessor then causing the second controller to store the requested data on the hard disk at an address indicative of the address of the requested data on the rotating media, thereby rendering the hard disk transparent to the computer; and wherein said first, second and third independent bus controllers and said microprocessor means combine to operate such that up to 100% of the data from the rotating media bulk storage memory device is independently cached to the hard disk without a single read request from the host.

7. The controller of claim 6 wherein the rotating media bulk storage device is a compact disc-read only memory (CD-ROM).

8. The controller of claim 6 wherein the rotating media bulk storage device is a magneto-optical read/write device.

9. A controller for a rotating media bulk storage memory device for decreasing data access times thereto by a host computer and increasing data transfer rates from the storage device to the host computer, the controller comprising;

a first bus controller coupled to a rotating media bulk storage memory device by a first bus, the first bus controller managing data transfers to and from the storage device in a manner that the data transfers are normally accomplished over the first bus;

a second bus controller coupled to a rotating magnetic media type hard disk which is managed as a cache memory by a second bus, the second bus controller managing data transfers to and from the hard disk in a manner that the data transfers are normally accomplished over the second bus;

a third bus controller coupled to a host computer by a third bus, the third bus controller managing data transfers to and from the computer over the third bus and implementing an interface between the host computer and the storage device of the type normally associated with the type of storage device coupled to the first bus controller;

memory means for storing data and program instructions; and microprocessor means coupled to the memory means and to the first, second, and third bus controllers by address and data buses, the microprocessor executing program instructions to independently control the first, second, and third bus controllers to manage the hard disk as a cache memory by copying at least some of the data from a rotating media in the storage device to the hard disk whenever a new rotating media is inserted into the storage device, the microprocessor also maintaining a record in the memory means of what blocks of data from the rotating media in the storage device have been stored in the hard disk and the address of the blocks of data, and intercepting read requests from the host computer, whereby if data requested by the computer is stored on the hard disk, the microprocessor retrieves the requested data from the hard disk and transmits the data to the computer, if the requested data is not stored on the hard disk, the microprocessor causes the requested data to be retrieved from the rotating media in the storage device and transmitted to computer and stored on the hard disk, the microprocessor further causing the record in the memory means to be updated to reflect the new data that has been stored on the hard disk and the address of the data; and wherein said first, second and third independent bus controllers and said micro-processor means combine to operate such that up to 100% of the data from the rotating media bulk storage memory device is independently cached to the hard disk without a single read request from the host.

10. The controller of claim 9 wherein the rotating media bulk storage device is a compact disc-read only memory (CD-ROM).

11. The controller of claim 9 wherein the rotating media bulk storage device is a magneto-optical read/write device.

* * * * *